(12) United States Patent
Uehara

(10) Patent No.: US 8,008,567 B2
(45) Date of Patent: Aug. 30, 2011

(54) MUSIC REPRODUCING SYSTEM FOR COLLABORATION, PROGRAM REPRODUCER, MUSIC DATA DISTRIBUTOR AND PROGRAM PRODUCER

(75) Inventor: Haruki Uehara, Hamamatsu (JP)

(73) Assignee: Yamaha Corporation, Shizuoka-Ken (JP)

( * ) Notice: Subject to any disclaimer, the term of this patent is extended or adjusted under 35 U.S.C. 154(b) by 129 days.

(21) Appl. No.: 12/620,058

(22) Filed: Nov. 17, 2009

(65) Prior Publication Data

US 2010/0058920 A1 Mar. 11, 2010

Related U.S. Application Data

(62) Division of application No. 11/959,969, filed on Dec. 19, 2007, now Pat. No. 7,649,136.

(30) Foreign Application Priority Data

| Feb. 26, 2007 | (JP) | ................................. | 2007-045271 |
| Mar. 16, 2007 | (JP) | ................................. | 2007-069323 |
| Mar. 23, 2007 | (JP) | ................................. | 2007-077104 |

(51) Int. Cl.
*G10H 1/36* (2006.01)

(52) U.S. Cl. ................ 84/610; 84/601; 84/602; 84/609; 84/634; 84/649; 84/650; 84/666

(58) Field of Classification Search ........................ None
See application file for complete search history.

(56) References Cited

U.S. PATENT DOCUMENTS

| 6,800,799 B2 | 10/2004 | Fujiwara et al. | |
| 6,956,162 B2* | 10/2005 | Koseki et al. | .................... 84/609 |
| 7,194,686 B1* | 3/2007 | Suzuki et al. | ................. 715/716 |
| 7,297,858 B2* | 11/2007 | Paepcke | ........................... 84/609 |
| 7,649,136 B2* | 1/2010 | Uehara | ........................... 84/610 |
| 2005/0056141 A1* | 3/2005 | Uehara | ........................... 84/645 |
| 2008/0163747 A1* | 7/2008 | Uehara et al. | ................... 84/645 |
| 2009/0100979 A1* | 4/2009 | Furukawa et al. | ................. 84/13 |

FOREIGN PATENT DOCUMENTS

JP 2003-271138 9/2003

* cited by examiner

*Primary Examiner* — Marlo Fletcher
(74) *Attorney, Agent, or Firm* — Harness, Dickey & Pierce, PLC

(57) ABSTRACT

A music reproducing system includes a musical instrument for reproducing a music tune on the basis of the MIDI music data, a sound reproducer for reproducing a music tune and/or narration from audio data codes and a server computer for distributing programs, MIDI files and audio files to the musical instrument and sound reproducer, and a program contains plural music tunes and narration; while a program is being reproduced in collaboration between the musical instrument and the sound reproducer, the audio data codes are converted to an audio signal expressing the narration through the sound reproducer, and the music tunes are reproduced on the basis of the MIDI files through the musical instrument; and the duration data codes of audio file are supplied to the musical instrument so as to make the musical instrument and the sound reproducer synchronized with each other.

8 Claims, 32 Drawing Sheets

| FILE IDENTIFIER ||| PROGRAM IDENTIFIER |
|---|---|---|---|
| AUDIO FILE NAME | FILE SIZE | CREATION DATE | |
| piano-fan.wab | 41.5mb | 2006/1/25 | CID001 |
| piano-melody1.wab | 82.5mb | 2006/1/31 | CID002 |
| piano-melody2.wab | 106.3mb | 2006/5/25 | CID003 |
| ⋮ | ⋮ | ⋮ | ⋮ |

| PROGRAM | PLAYBACK SCHEDULE || URL OF MIDI FILE | FILE NAME OF MIDI FILE |
|---|---|---|---|---|
| | START TIME | TERMINATION TIME | | |
| CID001 | 1′ 16″ | 5′ 48″ | http://www.abc.co.jp/CID001/piano-fan001.mid | piano-fan001.mid |
| | 6′ 29″ | 14′ 00″ | http://www.abc.co.jp/CID001/piano-fan002.mid | piano-fan002.mid |
| | 14′ 13″ | 24′ 13″ | http://www.abc.co.jp/CID001/piano-fan003.mid | piano-fan003.mid |
| | 25′ 20″ | 31′ 23″ | http://www.abc.co.jp/CID001/piano-fan004.mid | piano-fan004.mid |

|  | FILE IDENTIFIER | | PROGRAM IDENTIFIER |
|---|---|---|---|
| AUDIO FILE NAME | FILE SIZE | CREATION DATE | |
| piano-fan.wab | 41.5mb | 2006/1/25 | CID001 |
| piano-melody1.wab | 82.5mb | 2006/1/31 | CID002 |
| piano-melody2.wab | 106.3mb | 2006/5/25 | CID003 |
| ⋮ | ⋮ | ⋮ | ⋮ |

| PROGRAM | PLAYBACK SCHEDULE | | URL OF MIDI FILE | FILE NAME OF MIDI FILE |
|---|---|---|---|---|
| | START TIME | TERMINATION TIME | | |
| CID001 | 1′ 16″ | 5′ 48″ | http://www.abc.co.jp/CID001/piano-fan001.mid | piano-fan001.mid |
| | 6′ 29″ | 14′ 00″ | http://www.abc.co.jp/CID001/piano-fan002.mid | piano-fan002.mid |
| | 14′ 13″ | 24′ 13″ | http://www.abc.co.jp/CID001/piano-fan003.mid | piano-fan003.mid |
| | 25′ 20″ | 31′ 23″ | VACANCY | VACANCY |

| FILE IDENTIFIER | | | PROGRAM IDENTIFIER |
|---|---|---|---|
| AUDIO FILE NAME | FILE SIZE | CREATION DATE | |
| piano-fan.wab | 41.5mb | 2006/1/25 | CID001 |
| piano-melody1.wab | 82.5mb | 2006/1/31 | CID002 |
| piano-melody2.wab | 106.3mb | 2006/5/25 | CID003 |
| ... | ... | ... | ... |

| PROGRAM | PLAYBACK SCHEDULE | | URL OF MIDI FILE | FILE NAME OF MIDI FILE |
|---|---|---|---|---|
| | START TIME | TERMINATION TIME | | |
| CID001 | 1' 16" | 5' 48" | http://www.abc.co.jp/CID001/piano-fan001.mid | piano-fan001.mid |
| | 6' 29" | 14' 00" | http://www.abc.co.jp/CID001/piano-fan002.mid | piano-fan002.mid |
| | 14' 13" | 24' 13" | http://www.abc.co.jp/CID001/piano-fan003.mid | piano-fan003.mid |
| | 25' 20" | 31' 23" | http://www.abc.co.jp/CID001/piano-fan004.mid | piano-fan004.mid |

| ORDER OF PLAYBACK | FILE NAME | PLAYBACK TIME | START TIME | TERMINATION TIME |
|---|---|---|---|---|
| 1 | narration1.wav | 1' 16" | 0' 0" | 1' 16" |
| 2 | pianofan001.mid | 4' 32" | 1' 16" | 5' 48" |
| 3 | narration2.wav | 41" | 5' 48" | 6' 29" |
| 4 | pianofan002.mid | 7' 31" | 6' 29" | 14' 0" |
| 5 | pianofan003.mid | 10' 13" | 14' 0" | 24' 13" |
| 6 | narration3.wav | 1' 7" | 24' 13" | 25' 20" |
| 7 | pianofan004.mid | 6' 3" | 25' 20" | 31' 23" |

MUSIC REPRODUCING SYSTEM FOR COLLABORATION, PROGRAM REPRODUCER, MUSIC DATA DISTRIBUTOR AND PROGRAM PRODUCER

CROSS-REFERENCE TO RELATED APPLICATIONS

This application is a divisional of U.S. patent application Ser. No. 11/959,969 filed on Dec. 19, 2007. This application also claims the benefit of Japanese Patent Application No. 2007-045271 filed Feb. 26, 2007, Japanese Patent Application No. 2007-069323 filed Mar. 16, 2007 and Japanese Patent Application No. 2007-077104 filed Mar. 23, 2007. The disclosure of the above applications is incorporated herein by reference.

FIELD OF THE INVENTION

This invention relates to a music reproducing system and, more particularly, to a music reproducing system for producing a program in collaboration between sound reproducing apparatus reproducing tones on the basis of different sorts of music data codes, a program reproducer incorporated in the program reproducer, a music data distributor for distributing music data to the program reproducer and a program producer.

DESCRIPTION OF THE RELATED ART

Various sorts of sound reproducing system have been proposed for music fans. A compact disc player is an example of the sound reproducing system. A set of audio data codes, which expresses the discrete values on the waveform of an analog audio signal, is stored in a compact disc. While the compact disc is rotating in the compact disc player, the audio data codes are sequentially read out from the compact disc, and are converted back to the analog audio signal. The analog audio signal is transferred to a sound system, and the tones are reproduced from the analog audio signal along the music tune.

An automatic player musical instrument such as, for example, an automatic player piano is another sort of the sound reproducing system. The automatic player piano is a combination of an acoustic piano and an automatic playing system, and the automatic playing system includes an information processing system and solenoid-operated key actuators respectively assigned to the keys of acoustic piano. A set of music data codes, which expresses the note numbers assigned to the keys to be depressed and released, the key velocity or the loudness of the tones and the time intervals between the depressed/released keys and so forth, is supplied to the information processing system. The event in which a key is depressed is referred to as a "note-on key event", and the event in which a key is released is referred to as a "note-off key event", and term "key event" is used for both of the note-on key event and note-off key event. The music data codes are sequentially processed in the information processing system, and the keys to be depressed, keys to be released and the velocity to be imparted to the keys are determined on the basis of the music data codes. When the time comes, the solenoid-operated key actuators associated with the depressed keys are energized with driving signals, and the driving signals are removed from the solenoid-operated key actuators associated with the released keys. Thus, the keys of acoustic piano are sequentially driven to produce the tones along the music tune.

Since the audio data codes and music data codes express the discrete values on the waveform of analog audio signal and the key events, respectively, the audio data codes and music data codes are not compatible with one another. In other words, the automatic playing system can not drive the keys of acoustic piano on the basis of the audio data codes, and the compact disc player does not produce the tones from the music data codes along the music tune. In this situation, it is difficult to reproduce a music tune in collaboration between the compact disc player and the automatic player piano.

A prior art synchronization technique between the compact disc player and the automatic player piano is proposed in Japan Patent Application laid-open No. 2003-271138. The prior art synchronization technique makes the compact disc player synchronized with the automatic player piano by using time management data codes expressing the time at which the analog audio signal exceeds a threshold. The time management data codes are contained in the set of music data codes, and the prior art synchronization system monitors the audio signal to see whether or not the audio signal exceeds the threshold at the time specified by the time management data codes. If a time lag takes place, the prior art synchronization system changes the time at which the key event takes place.

However, the part assigned to the compact disc player is not reproduced through the automatic player piano, and the part assigned to the automatic player piano is not reproduced by means of the compact disc player. In other words, it is difficult to make the compact disc player and automatic player piano collaborate with one another in reproduction of a program.

SUMMARY OF THE INVENTION

It is therefore an important object of the present invention to provide a music reproducing system, which makes it possible to reproduce a program through plural playback apparatus in collaboration with one another.

It is another important object of the present invention to provide a program reproducer, which is incorporated in the music reproducing system.

It is yet another important object of the present invention to provide a music data distributor, which also form a part of the music reproducing system.

It is still another important object of the present invention to provide a program producer, which is added to the music reproducing system.

It is yet another important object of the present invention to provide an information storage medium, in which a computer program is stored for the program producer.

In accordance with one aspect of the present invention, there is provided a music reproducing system for reproducing a music program, comprising: a communication network; a music data distributor including a first data storage for storing the music program containing at least one musical content and at least one non-musical content, a data file containing pieces of audio data and pieces of a sort of time data expressing a time from a first view-point and another data file containing pieces of music data and pieces of another sort of time data expressing a time from a second view point different from the first viewpoint, a first communication module connected to the communication network for receiving requests and delivering the music program, the data file and the aforesaid another data file to the communication network, and a first information processing apparatus connected to the first data storage and the first communication module and having an information processing capability so as to manage the first data storage, interpret the requests and transfer the music program, the data file and the aforesaid another data file between the first data storage and the first communication module; and a program reproducer connected to the communication network, and including a first data-to-sound converter following the music program for reproducing the non-musical content from the pieces of audio data on a schedule defined by the pieces of the sort of time data, a second data-to-sound converter following the music program for reproducing the musical content on the basis of the pieces of music data on another schedule defined by the pieces of the aforesaid another sort of time data, a second data storage storing the music program, the data file and the aforesaid another data file, a second communication module connected to the communication network, a second information processing apparatus connected to the first data-to-sound converter, the second data-to-sound converter, the second data storage and the second communication module and having an information processing capability so as to manage the second data storage, transmit the requests, receive at least the music program, make the first data-to-sound re-producer and the second data-to-sound reproducer synchronized on the basis of the pieces of the sort of time data and the pieces of the aforesaid another sort of time data and interpret the music program for selectively transferring the pieces of audio data and the pieces of music data to the first data-to-sound converter and the second data-to-sound converter.

In accordance with another aspect of the present invention, there is provided a program reproducer for reproducing a music program containing a musical content and a non-musical content, comprising: a first data-to-sound converter following the music program for reproducing the non-musical content from pieces of audio data stored in a data file on a schedule defined by pieces of a sort of time data stored in the data file and expressing a time from a first viewpoint; a second data-to-sound converter following the music program for reproducing the musical content on the basis of pieces of music data stored in another data file on another schedule defined by pieces of the aforesaid another sort of time data stored in the aforesaid another data file and expressing a time from a second viewpoint different from the first view-point; a data storage storing the music program, the data file and the aforesaid another data file; a communication module connected to a communication network so as to receive at least the music program from a music data distributor; and an information processing apparatus connected to the first data-to-sound converter, the second data-to-sound converter, the data storage and the communication module and having an information processing capability so as to manage the data storage, receive the music program, make the first data-to-sound converter and the second data-to-sound converter synchronized on the basis of the pieces of the sort of time data and the pieces of the aforesaid another sort of time data and interpret said music program for selectively transferring said pieces of audio data and said pieces of music data to said first data-to-sound converter and said second data-to-sound converter.

In accordance with yet another aspect of the present invention, there is provided a music data distributor connected to a communication network, comprising: a data storage for storing a music program containing at least one musical content and at least one non-musical content, a data file containing pieces of audio data expressing the aforesaid at least one non-musical content and pieces of a sort of time data expressing a time from a first viewpoint and another data file containing pieces of music data expressing the aforesaid at least one musical content and pieces of another sort of time data expressing a time from a second view point different from the first viewpoint; a communication module connected to the communication network for receiving requests of user and delivering the music program, the data file and the aforesaid another data file to the communication network; and an information processing apparatus connected to the data storage and the communication module, and having an information processing capability so as to manage the data storage, interpret the requests user and transfer at least one of the music program, the data file and the aforesaid another data file between the data storage and the communication module in response to the request of user for transmitting the aforesaid at least one of the program, sand data file and the aforesaid another data file to the user.

In accordance with still another aspect of the present invention, there is provided a program producer for producing a music program containing at least one musical content and at least one non-musical content, comprising: a first data storage for storing an audio data list where plural non-musical contents are found; a second data storage for storing a music data list where plural musical contents are found; an editor selecting the aforesaid at least one musical content and the aforesaid at least one non-musical content from the music data list and the audio list; a scheduler determining a playback schedule on which the aforesaid at least one non-musical content and the aforesaid at least one musical content are to be reproduced; and a program manager labeling the music program with a program identifier and put the program identifier on a program management table together with other program identifier of other music programs.

In accordance with yet another aspect of the present invention, there is provided an information storage medium storing a computer program, and the computer program expresses a method of preparing a music program comprising the steps of: a) designating at least one musical content expressed by pieces of music data and at least one non-musical content expressing pieces of audio data; b) arranging the aforesaid at least one musical content and the aforesaid at least one non-musical content in the order of playback so as to determine a music program; c) determining a playback schedule where at least a start time is defined for each of the contents of the music program; d) forming a composite audio file wherein the pieces of audio data expressing the non-musical content are put together with other pieces of audio data expressing another non-musical content replaceable with the pieces of music data expressing the musical content; e) labeling the music program with a program identifier; and f) registering the program identifier together with a file identifier in a program management table.

BRIEF DESCRIPTION OF THE DRAWINGS

The features and advantages of music reproducing system, program re-producer, music data distributor, program producer and information storage medium will be more clearly understood from the following description taken in conjunction with the accompanying drawings, in which FIG. 5 is a view showing contents of a program management table, FIG. 6 is a view showing the contents of a program, FIG. 13 is a view showing a picture produced on the display panel in order to ask for permission of playback, FIG. 14 is a flowchart showing a job sequence for the controller of automatic player musical instrument, FIG. 21 is a view showing contents of a program management table, FIG. 22 is a view showing the contents of a program, FIG. 26 is a view showing a picture produced on a display of the sound reproducer for download, FIG. 27 is a view showing a picture produced on the display panel for playback, FIG. 36 is a view showing contents of a program management table, FIG. 37 is a view showing the contents of a program.

DESCRIPTION OF THE PREFERRED EMBODIMENTS

Figure 1:
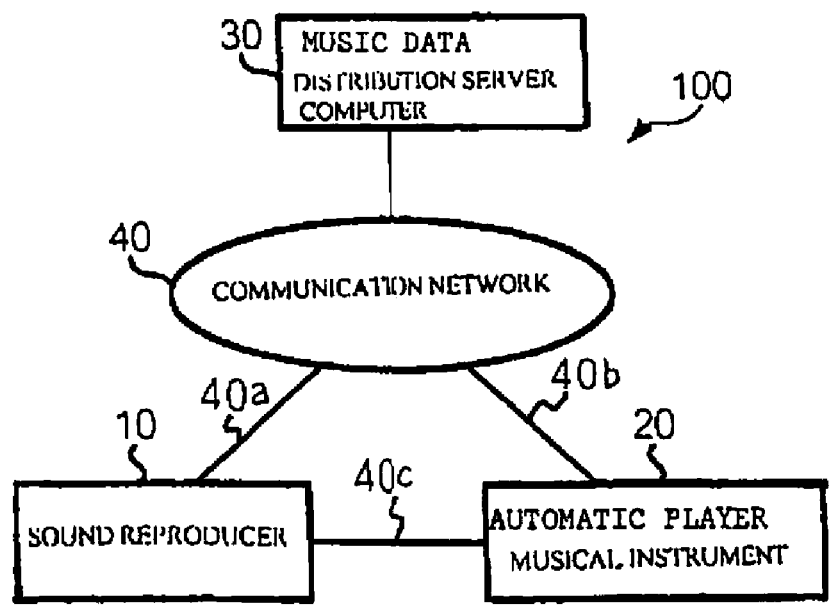
FIG. 1 is a block diagram showing the system configuration of a music reproducing system of the present invention.

A music reproducing system embodying the present invention aims at re-producing a music program, which contains at least one musical content and at least one non-musical content.

Pieces of audio data express the at least one non-musical content such as, for example, narration on a music tune, and are stored in a data file together with pieces of a sort of time data. The pieces of the sort of time data express a time from a first viewpoint such as, for example, measurement of the lapse of time from the initiation of reproduction, and define a schedule for the reproduction of non-musical content. On the other hand, pieces of music data express at least one musical content such as, for example, the music tune, and are stored in another data file together with pieces of another sort of time data. The pieces of another sort of time data express a time from a second viewpoint such as, for example, a time interval between a production/decay of a tone and the next production/decay of a tone, and defines a schedule for the reproduction of the musical content.

It is possible to express the music tune by other pieces of audio data. However, the reproduction on the basis of the pieces of music data gives listeners good impression closer to the live performance than the reproduction on the basis of the pieces of audio data.

The music performance system comprises a communication network, a music data distributor and a program reproducer, and the music data distributor and program reproducer are connected to the communication network. Although other program reproducers are further connected to the communication network, the other program reproducers are ignored for the sake of simplicity.

The music data distributor includes a first data storage, a first communication module and a first information processing apparatus. The first information processing apparatus is connected to the first data storage and first communication module so as to manage the first data storage and the communication through the first communication module.

The music program, data file and the aforesaid another data file are stored in the first data storage. The first communication module is connected to the communication network so as to receive requests of users and deliver the music program, the data file and the aforesaid another data file to the communication network. The first information processing apparatus has an information processing capability so as further to interpret the requests and transfer the music program, the data file and the aforesaid another data file between the data storage and the first communication module.

The program reproducer includes a first data-to-sound converter, a second data-to-sound converter, a second data storage, a second communication module and a second information processing apparatus. The second information processing apparatus is connected to the first data-to-sound converter, second data-to-sound converter, second data storage and second communication module so as to manage the second data storage, communication through the second communication module and conversion from the data to sound through the first data-to-sound converter and second data-to-sound converter.

The pieces of audio data are converted to sound for the non-musical content by means of the first data-to-sound converter, and the pieces of music data are converted to sound or tones for the musical content by means of the second data-to-sound converter. The second information processing apparatus makes the conversion of first data-to-sound converter synchronized the conversion of second data-to-sound converter on the basis of the pieces of the sort of time data and the pieces of the aforesaid another sort of time data so that the first data-to-sound converter and second data-to-sound converter follow the music program.

The music program, data file and the aforesaid another data file are stored in the second data storage for reproduction of the music program. The second communication module is connected to the communication network. The second communication module transmits the requests of users to the music data distributor through the communication network, and receives the music program, data file and aforesaid another data file from the music data distributor through the communication module. The transmission and reception are controlled by the second information processing apparatus as described hereinbefore.

The second information processing apparatus has an information processing capability so as further to interpret the music program so as selectively to transfer the pieces of audio data and the pieces of music data to the first data-to-sound converter and the second data-to-sound converter in accordance with the schedules for the reproduction of non-musical content and musical content.

As will be appreciated from the foregoing description, although the pieces of audio data and pieces of music data are reproduced through the different data-to-sound converters, the second information processing apparatus makes both of the first and second data-to-sound converters follow the music program in synchronism between the conversion to sound for the non-musical content and the conversion to sound for the musical content, and the listeners feels the reproduction of music program natural. Moreover, the listeners feel the music tune close to the live performance by virtue of the pieces of music data.

The music reproducing system may further comprise a program producer. Users can produce their new music programs by means of the music producer.

The program producer comprises a first data storage, a second data storage, an editor, a scheduler and a program manager. The first data storage stores an audio data list, and plural non-musical contents are found in the audio data file. The second data storage stores a music data list, and plural musical contents are found in the music data list. The editor selects at least one musical content from the music data list and at least one non-musical content from the audio list. The aforesaid at least one musical content and aforesaid at least one non-musical content form parts of a music program. The scheduler determines a playback schedule on which the aforesaid at least one non-musical content and aforesaid at least one musical content are to be reproduced. The program manager labels the music program with a program identifier, and puts the program identifier on a program management table together with other program identifier of other music programs. When the program identifier is registered in the program management table, the user and other authorized users can download the music program from the music data distributor. If the data file and/or another data file in the music program are required for the playback, the user transmits the request for transmitting the data file and/or another data file to the music reproducer for reproducing the music program.

The behavior of program producer may be expressed as a method expressed by a computer program. The method may comprise the steps of: a) designating at least one musical content expressed by pieces of music data and at least one non-musical content expressing pieces of audio data; b) arranging the aforesaid at least one musical content and the aforesaid at least one non-musical content in the order of playback so as to determine a music program; c) determining a playback schedule where at least a start time is defined for each of the contents of the music program; d) forming a composite audio file wherein the pieces of audio data expressing the non-musical content are put together with other pieces of audio data expressing another non-musical content replaceable with the pieces of music data expressing the musical content; e) labeling the music program with a program identifier; and f) registering the program identifier together with a file identifier in a program management table.

First Embodiment

Referring first to FIG. 1 of the drawings, a music reproducing system 100 embodying the present invention largely comprises a sound reproducer 10, an automatic player musical instrument 20, a music data distribution server computer 30 and a communication network 40. The sound reproducer 10, automatic player musical instrument 20 and music data distribution server computer 30 are connected to the communication network 40 through a wire communication channel or a radio communication channel 40a/40b, and communicate with one another through the communication network 40. The sound reproducer 10 is further connected to the automatic player musical instrument 20 through a wire communication channel or a radio communication channel 40c so that the sound reproducer 10 and automatic player musical instrument 20 are directly communicable with one another through the wire communication channel/radio communication channel 40c.

Although the single sound reproducer 10 and single automatic player musical instrument 20 are illustrated in FIG. 1, other sound reproducer 10 and other automatic player musical instruments 20 may be further incorporated in the music reproducing system 100.

The sound reproducer 10 is, by way of example, implemented by a personal computer system, and an audio playback computer program is installed in the personal computer system so as to convert pieces of audio data or audio data codes to tones and/or sound. The audio data codes express discrete values on the waveform of an audio signal representative of the tones and/or sound.

The automatic player musical instrument 20 is a combination of an acoustic piano, an automatic playing system and an electronic tone producer, and the automatic playing system performs a music tune on the acoustic piano without any fingering of a human player. A set of music data codes expresses the music tune, and the formats of music data codes are defined in the MIDI (Musical Instrument Digital Interface) protocols.

A set of music data codes includes key event data codes, effect data codes and duration data codes. Pieces of music data stored in the key event data code express a note-on event or a note-off event, a note number indicative of the pitch of tone to be produced or decayed and a key velocity indicative of the loudness of the tone. The note-on key event and note-off key event are simply referred to as "key events". In other words, term "key event" means any one of the note-on key event and note-off key event. Pieces of effect data are stored in the effect data codes, and artificial expressions are imparted to the tones on the basis of the pieces of effect data. A piece of duration data is stored in each of the duration data codes, and expresses a lapse of time between a key event and the next key event. Term "Δtime" and term "duration" are synonyms of the term "lapse of time". Thus, the music data codes are a sort of music data different from the audio data codes.

The music data distribution server computer 30 is put on the WWW (World Wide Web) together with the sound reproducer 10 and automatic player musical instrument 20. Thus, the music data distribution server computer 30, sound reproducer 10 and automatic player musical instrument 20 form a client-server system through the communication network 40.

A set of music data codes and a set of audio data codes form a MIDI file and an audio file, respectively, and plural MIDI files and plural audio files are stored in the music data distribution server computer 30. The MIDI files are assigned addresses expressed in accordance with the URL (Uniform Resource Locator). These addresses are hereinafter referred to as "URL addresses". Although the service provider can specify the MIDI files in the data storage 14 by using only the MIDI files names, the URL addresses are useful in case where plural server computers bear the MIDI files.

The communication network 40 includes various sorts of networks such as the internet, telephone networks and so forth. The MIDI files, programs and audio files are distributed from the music data distribution server computer 30 to the sound reproducer 10 and automatic player musical instrument 20 through the communication network 40.

The programs are prepared for reproduction through the sound reproducer 10 and automatic player musical instrument 20 in collaboration with one another. At least one music tune is contained in the program together with narration and/or talk. When a user wishes to reproduce a program, the user gives the instruction to reproduce the music tune together with the narration and/or talk, and the MIDI file, which expresses the music tune, is downloaded to the automatic player musical instrument in the absence of the MIDI file in the automatic player musical instrument 20. When the sound reproducer 10 and automatic player musical instrument 20 get ready to reproduce the music tune and narration and/or talk, the user instructs the sound reproducer 10 and automatic player musical instrument 20 to reproduce the music tune and narration and/or talk.

The sound reproducer 10 starts to produce an audio signal from the audio data codes expressing the narration/talk and music tune, and the automatic player musical instrument 20 starts to measure the lapse of time by means of an internal clock. The audio signal and duration data codes are supplied from the sound reproducer 10 to the automatic player musical instrument 20. While the audio signal is expressing the narration and/or talk, the audio signal is converted to electric voice through a built-in sound system of the automatic player musical instrument. When the time to reproduce the music tune comes, the automatic player musical instrument 20 starts to playback the music tune on the basis of the music data codes, and blocks the built-in sound system from the audio signal. The automatic player musical instrument performs the music tune. The time interval between the key events is measured with reference to the internal clock so that the key event data codes are processed in synchronism with the conversion from the audio data codes to the audio signal. When the playback of music tune is terminated, the built-in sound system produces the electric voice for the next narration and/or talk. Thus, the sound reproducer 10 and automatic player musical instrument collaborate with one another for reproducing the music tune and narration/talk.

The music data distribution server computer 30 is hereinafter described with reference to FIG. 2A. The automatic player musical instrument 20 will be described with reference to FIG. 2A, and the sound producer 10 will be described in detail after the description on the automatic player musical instrument 20.

Music Data Distribution Server Computer

Figure 2:
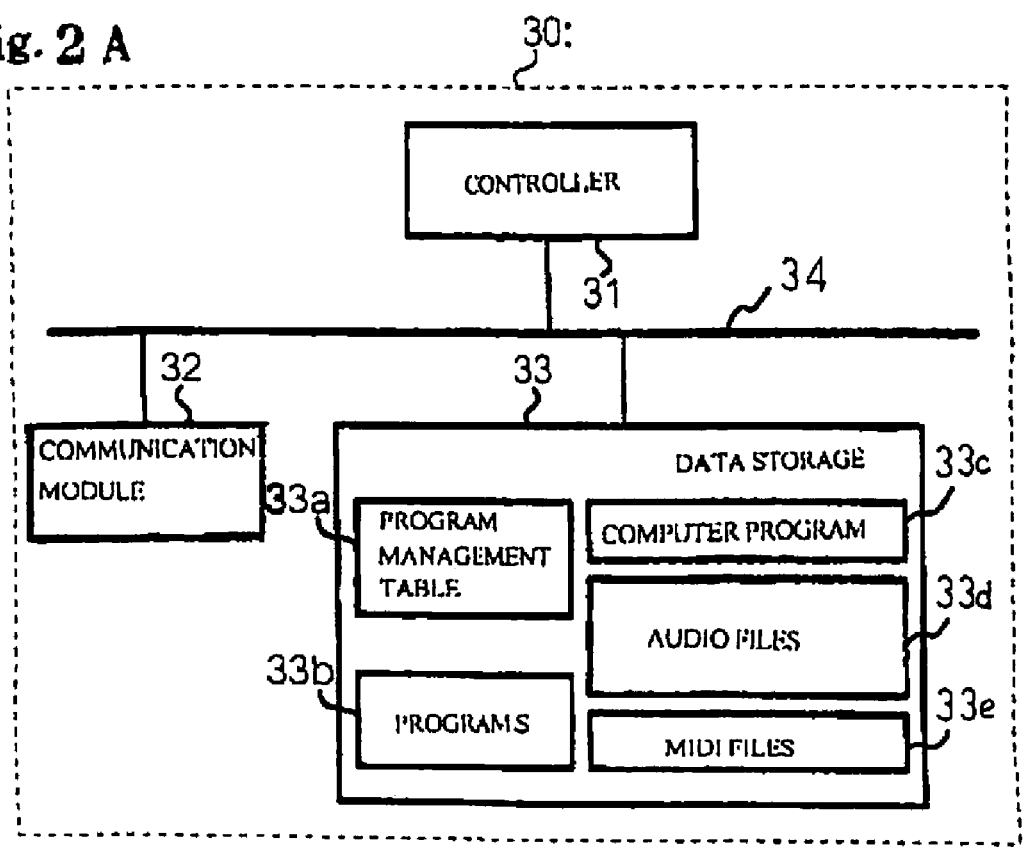
FIG. 2A is a block diagram showing the circuit configuration of a music data distribution server computer incorporated in the music reproducing system.
FIG. 2B is a schematic cross sectional side view showing the structure of an automatic player musical instrument incorporated in the music reproducing system, FIG. 3 a view showing an audio file and MIDI files to be reproduced in a program.

FIG. 2A illustrates the circuit configuration of the data distribution server computer 30. The data distribution server computer 30 includes a controller 31, a communication module 32 and a data storage 33, and the controller 31, communication module 32 and data storage 33 are connected to one another through an internal bus system 34.

Though not shown in the drawings, the controller 31 includes a central processing unit, peripheral processors, a program memory and a working memory, and a computer program 33c runs on the controller 31 so as to achieve various tasks such as a data management, analysis of requests of clients, a file transmission and so forth. The communication module 32 is connected to the communication network 40. The client requests are received at the communication module 32, and programs, audio files and MIDI files are transmitted from the communication module 32 to the sound reproducer 10 and automatic player musical instrument 20. The data storage 33 is, by way of example, implemented by a hard disk unit or hard disk units, and the storage space in the hard disk or disks are assigned to a program management table 33a, programs 33b, a computer program 33c, audio files 33d and MIDI files 33e.

A job sequence is expressed by the computer program for distributing the audio files 33d and MIDI files 33e to clients, and pieces of visual image data are further stored in the memory subspace assigned to the computer program. Various pictures to be produced in client's display panels are expressed by the pieces of visual image data. File identifiers for the audio files are correlated with programs in the program management table 33a, and the MIDI files and URL addresses are correlated with the program identifiers in the program 33b.

Figure 3:
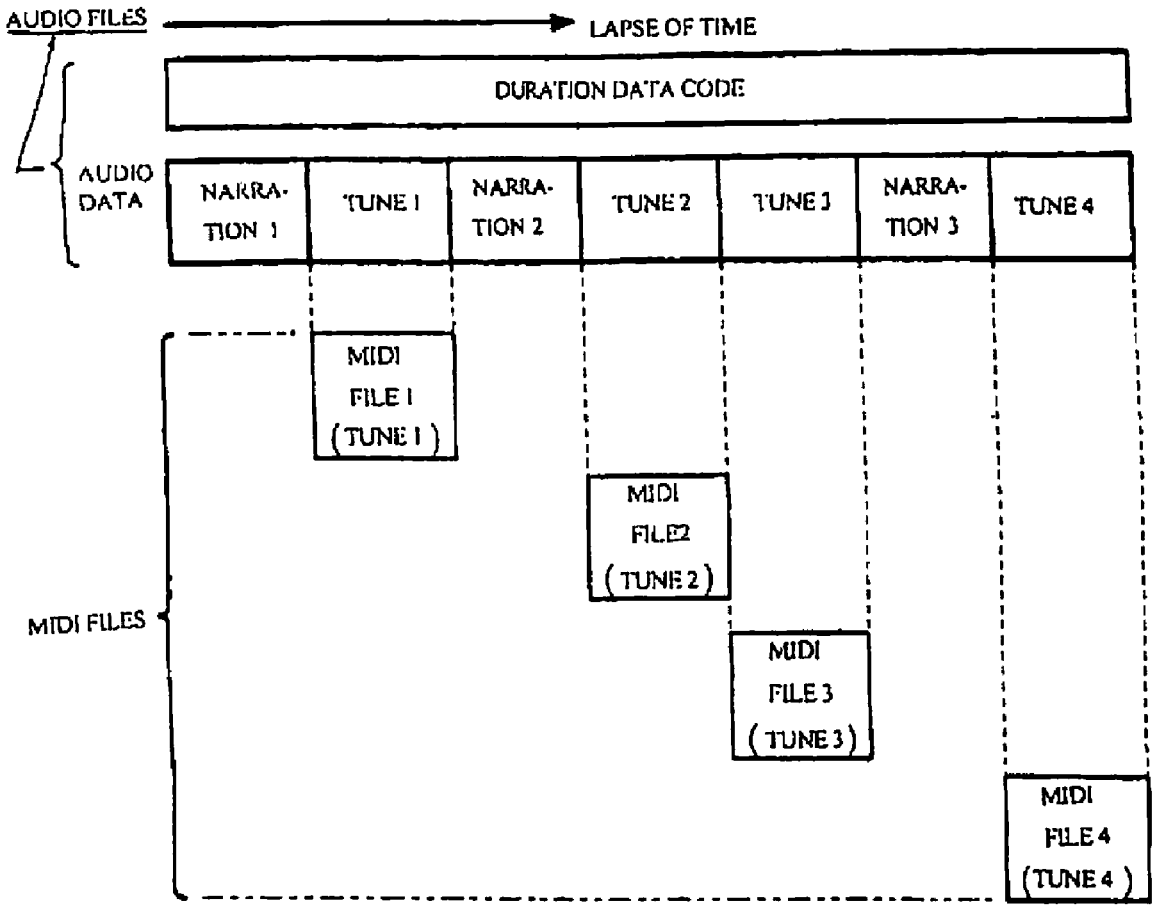

FIG. 3 shows the data structure of an audio file and MIDI files to be reproduced in a program. The audio file contains the audio data codes and duration data codes. The duration data codes express a lapse of time from the first audio data code at the head of the audio file. On the other hand, discrete values are sampled from the waveform of an analog audio signal at 44.1 kilo-hertz, and are stored in the audio data codes.

The series of audio data codes in the audio file expresses plural contents such as, for example, narration and tunes. The tune 1 is explained in the narration 1, the tunes 2 and 3 are explained in the narration 2, and the tune 3 is explained in the narration 3. While the program is being reproduced, the audio data codes for the narration 1 are firstly converted to voice, the audio data codes for the tune 1 are converted to tones, subsequently, the audio data codes for the narration 2 are converted to voice, and is followed by the conversion of audio data codes for the tones of tunes 2 and 3, thereafter, the audio data codes for the narration 3 are converted to voice, and, finally, the audio data codes for the tune 4 are converted to tones. The narration 1, 2 and 3 and tunes 1, 2, 3 and 4 form a program.

Plural MIDI files are correlated with the audio file. Tones are reproduced on the basis of the music data codes in the MIDI file 1 instead of the playback of the tune 1 recorded in the audio file, the tones are reproduced on the basis of the music data codes in the MIDI files 2 and 3 in synchronism with the playback of the tunes 2 and 3, and the tones are reproduced on the basis of the music data codes in the MIDI file 4 in synchronism with the playback of the tune 4. While the program is being reproduced in collaboration between the sound reproducer 10 and automatic player musical instrument 20, the narration 1, 2 and 3 is reproduced from the audio signal produced in the sound reproducer 10, and the music tunes 1 to 4 are reproduced through the automatic player musical instrument 20A on the basis of the music data codes. Thus, the program is reproduced in collaboration between the sound reproducer 10 and the automatic player musical instrument 20. As will be hereinlater described in detail, the conversion of audio data is well synchronized with the data processing on the music data codes, and the electric tones for the music tunes 1, 2, 3 and 4 are muted in the playback through the automatic player musical instrument 20.

The narration may be replaced with dialogue, talk, silence or natural sound such as, for example the sound of waves.

Figure 4:
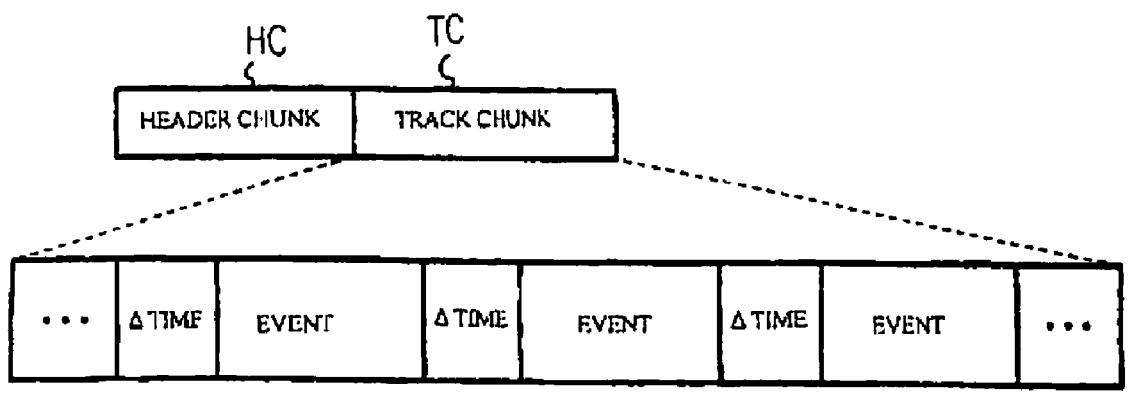
FIG. 4 is a view showing the data structure of a MIDI file.

Turning to FIG. 4, a MIDI file is called as an "SMF (Standard MIDI File)", and is broken down into a header chunk HC and a track chunk TC. Pieces of attribute data are stored in the header chunk for the MIDI file, and the event data codes and duration data codes are stored in the track chunk TC. Although the duration data codes of audio file express a lapse of time from the audio data code at the head of audio file, each of the duration data codes of MIDI file expresses a lapse of time between a key event and the next key event.

FIG. 5 illustrates the contents of the file identifier together with the program management table 33a. The file identifier is broken down into an audio file name, a file size and a creation date. The audio file is identified with the audio file name. The file size expresses the number of bytes occupied by the audio file, and the creation date is indicative of the year, month and day at which the audio file is created. For example, an audio file is labeled with the audio file name "piano-fan.wab". 41.5 mega-bytes are required for the audio file named as "piano-fan.wab", and the audio file is created in Jan. 25, 2006. The audio file named as "piano-fan.wab" is correlated with the program labeled with the program identifier "CID 001".

When a program is revised, the revised date is written as the creation date. One of the file size and creation date may be omitted from the file identifier. The file identifiers shown in FIG. 5 do not set any limit to the technical scope of the present invention. Any format is available for the file identifier in so far as the audio file is designable with the file identifier. For example, numerals may be simply assigned to the audio files.

The controller searches the program management table 33a for the audio file by using the fine identifier as a key, and determines the program identifier correlated with the file identifier.

FIG. 6 illustrates the contents of the program labeled with the program identifier "CID 001". The program identifier "CID 001" is correlated with a playback schedule, URL addresses of MIDI files and MIDI file names in the program. Start time at which the playback starts and termination time at which the playback is completed are written in the playback schedule for each of the MIDI files. For example, the playback of a tune in the MIDI file "piano-fan001.mid" starts at 1 min. and 16 sec, and the playback is completed at 5 min. and 48 sec, and the MIDI file is stored at the memory location assigned the URL address "http://www.abc.Co.jp/CID001/piano-fan001.mid".

Automatic Player Musical Instrument

Turning back to FIG. 2B of the drawing, the automatic player musical instrument 20 largely comprises an acoustic piano 20a, a code generating system 20b, an automatic playing system 20c, communication modules 20d and an electronic tone producer 26. While a human player is playing a music tune on the acoustic piano 20a, the music data codes, which express the tones in accordance with the MIDI protocols, i.e., MIDI data codes, are produced by means of the code generating system 20b. On the other hand, the automatic playing system 20c is responsive to MIDI data codes so as to perform a music tune on the acoustic piano 20a without any fingering of the human player. The electronic tone producer 26 is also responsive to the music data codes and an audio signal supplied from the outside thereof so as to produce electric tones along the music passage expressed by the music data codes and electric voice expressed by the audio signal.

The acoustic piano 20a includes a keyboard 20e, i.e., an array of black keys 20f and white keys 20h, action units 20j, hammers 20k, strings 20m, dampers 20n, a pedal mechanism 20p and a piano cabinet 20q. The keyboard 20a is mounted on a key bed, which forms a bottom part of the piano cabinet 20q, and the black keys 20f and white keys 20h are linked with the action units 20j at the intermediate portions thereof and dampers 20n at the rear portions thereof. The action units 20j are further linked with the hammers 20k, and the hammers 20k are opposed to the strings 20m. The dampers 20n are spaced from and brought into contact with the strings 20m depending upon the key positions on loci of keys 20f/20h. The pedal mechanism 20p is linked with the keyboard 20e and dampers 20n, and the human player and automatic playing system 20c directly change the keyboard 20e and dampers 20n for artificial expressions.

Figure 2B:
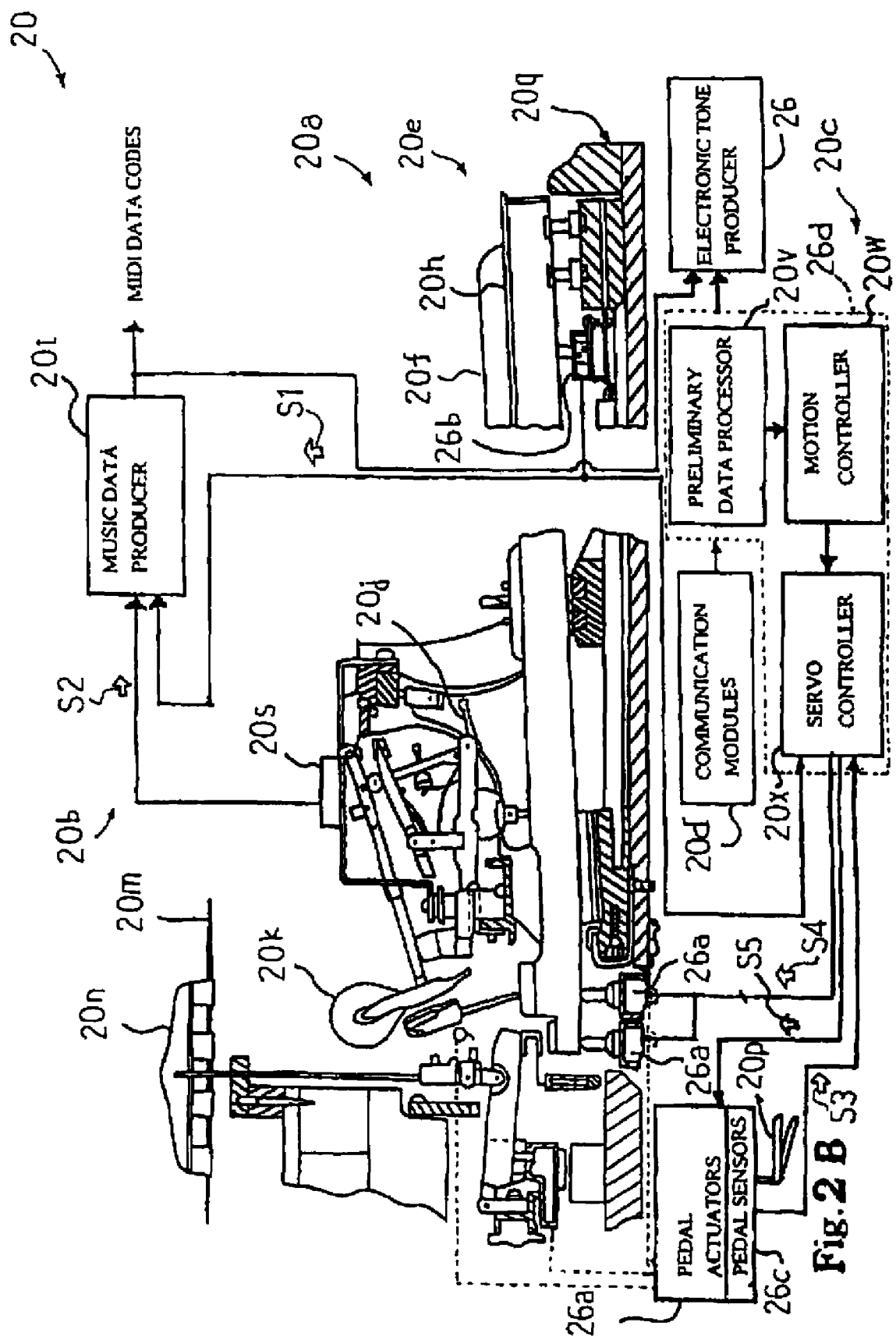

While all of the black and white keys 20f/20h are staying at rest positions, the hammers 20k are spaced from the strings 20m, and the dampers 20n are held in contact with the strings 20m as shown in FIG. 2B.

When the human player depresses one of the black and white keys 20f/20h, the depressed key 20f/20h starts to travel on the locus. While the depressed key 20f/20h is traveling on the locus, the depressed key 20f/20h causes the dampers 20n to be spaced from the strings 20m, and actuates the associated action unit 20j. The actuated action unit 20j makes the hammer 20k driven for rotation toward the string 20m. The hammer 20k is brought into collision with the string 20m at the end of rotation, and gives rise to vibrations of the string 20m. The vibrating string 20m in turn gives rise to the vibrations of a sound board, which forms a part of the piano cabinet 20q, and an acoustic piano tone is radiated from the acoustic piano 20a. The hammer 20k rebounds on the string 20m, and is captured by the action unit 20j.

When the human player releases the depressed key 20f/20h, the released key 20f/20h starts backwardly to travel on the locus. The released key 20f/20h permits the damper 20n to move toward the string 20m, and is brought into contact with the string 20m so as to decay the vibrations of string 20m. The released key 20f/20h permits the action unit 20j to return to the rest position shown in FIG. 2B.

When the human player gives the artificial expression to the tones, the human player steps on the pedal of the pedal mechanism 20p, and makes the acoustic piano tone prolonged or lessened in loudness.

The code generating system 20b includes key sensors 26b, hammer sensors 20s and a music data producer 20t. The key sensors 26b monitor the associated black and white keys 20f/20h, and supply key position signals S1 indicative of current key positions to the music data producer 20t. The hammer sensors 20s monitors the associated hammers 20k, and supply hammer position signals S2 indicative of current hammer positions to the music data producer 20t. The key position signals S1 and hammer position signals S2 are analyzed in the music data producer 20t, and the music data codes are output from the music data producer 20t. The music data codes are supplied from the music data producer 20t to the electronic tone producer 26, and electronic tones are produced through the electronic tone producer 26 on the basis of the music data codes. Otherwise, the music data codes form a MIDI file, and the MIDI file is stored in a data storage of the code generating system 20b.

The automatic playing system 20c includes solenoid-operated actuators 26a, the key sensors 26b, pedal sensors 26c and an electronic system 26d. The solenoid-operated actuators 26a are provided for the black keys 20f, white keys 20h and pedal mechanism 20p, and are selectively energized by the electronic system 26d so as to give rise to the movements of the black keys 20f, white keys 20h and pedal mechanism 20p.

The electronic system 26d is connected to the communication modules 20d and electronic tone producer 26. A MIDI file and an audio file are supplied from the communication modules 20d to the electronic system 26d, and the audio file is transferred from the electronic system 26d to the electronic tone producer 26. The electronic system 26d selectively drives the black keys 20f, white key 20h and pedal mechanism 20p on the basis of the music data codes stored in the received MIDI file.

The electronic system 26d includes an information processor and current driving circuits (not shown) such as, for example, pulse width modulators. A computer program for an automatic playing runs on the information processor so as to realize functions referred to as a "preliminary data processor 20v", a "motion controller 20w" and a "servo controller 20x". Since the key event data codes and effect data codes are produced on the assumption that they are applied to an ideal MIDI musical instrument, the pieces of event data and pieces of effect data are to be individualized to the automatic player musical instrument 20. The preliminary data processor 20v makes the music data codes in the received MIDI file individualized to the automatic player musical instrument 20.

While the computer program is running on the information processor, preliminary data processor 20v measures the lapse of time from the previous key event and previous pedal event on the basis of the duration data codes. The time to process a note-on event data code is assumed to come. The motion controller 20w analyzes the piece of event data, and determines a reference forward key trajectory. The reference forward key trajectory is a series of values of target key position varied together with time. If the black key 20f or white key 20h travels on the reference forward key trajectory, the hammer 20k is brought into collision with the string 20m at a target time at which the acoustic piano tone is to be produced, and the acoustic piano tone is generated through the vibrations of string 20m at a target value of loudness. The values of target key position are periodically supplied from the motion controller 20w to the servo controller 20x.

The key sensors 26b supply the key position signals S1 indicative of the actual key position to the servo controller 20x. The servo controller 20x calculates a value of target key velocity from a series of values of target key velocity and a value of actual key velocity from a series of values of actual key position, and compares the value of target key position and value of target key velocity with a value of actual key position and a value of actual key velocity so as to determine the difference between the target key position and the actual key position and the difference between the target key velocity and the actual key velocity. The servo controller 20x increases or decreases a target value of mean current of a driving signal S4 in such a manner as to minimize the different of key position and difference of key velocity, and the current driving circuit (not shown) adjusts the driving signal S4 to the target value of means current. The above-described jobs are periodically repeated for the black/white key 20f/20h. Thus, the solenoid-operated actuators 26a for the black and white keys 20f/20h, key sensors 26b, servo controller 20x and current driving circuits (not shown) form a servo control loop, and the black keys 20f and white keys 20h are forced to travel on the reference forward key trajectories through the servo control loop.

The time to process a note-off event data code is assumed to come. The motion controller 20w determines a reference backward key trajectory on the basis of the piece of note-off event data. The reference backward key trajectory is a series of values of target key position toward the rest position. If the black key 20f or white key 20h travels on the reference backward key trajectory, the released key 20f/20h permits the damper 20n to be brought into contact with the vibrating string 20m at the time to make the note-off event occur, and the acoustic piano tone is decayed. The values of target key position are periodically supplied from the motion controller 20w to the servo controller 20x, and the servo controller 20x forces the released key 20f/20h to travel on the reference backward key trajectory.

The time to process an effect data code is assumed to come. The motion controller 20w determines a reference pedal trajectory on the basis of the piece of effect data. The reference pedal trajectory is a series of values of target pedal position, and the values of target pedal position are periodically supplied from the motion controller 20w to the servo controller 20x. The pedal sensors 26c monitor the pedals of the pedal mechanism 20p, and supply a pedal position signal S3 indicative of an actual pedal position to the servo controller 20x. The servo controller 20x calculates a target pedal velocity and an actual pedal velocity, and determines the mean current of a driving signal S5 in such a manner as to minimize the difference between the target pedal position and the actual pedal position and the difference between the target pedal velocity and the actual pedal velocity. The current driving circuit (not shown) adjusts the driving signal S5 to the value of mean current, and the driving signal S5 is supplied from the current driving circuit (not shown) to the solenoid-operated actuator 26a provided for the pedal. The above-described jobs are periodically repeated, and the pedal is forced to travel on the reference pedal trajectory.

While the music tune is being reproduced on the basis of the music data codes of the received MIDI file, the above-described control sequences are repeated for all of the black and white keys 20f/20h to be depressed and released and all the pedals to be depressed and released. This results in the playback of the music tune.

Figure 7:
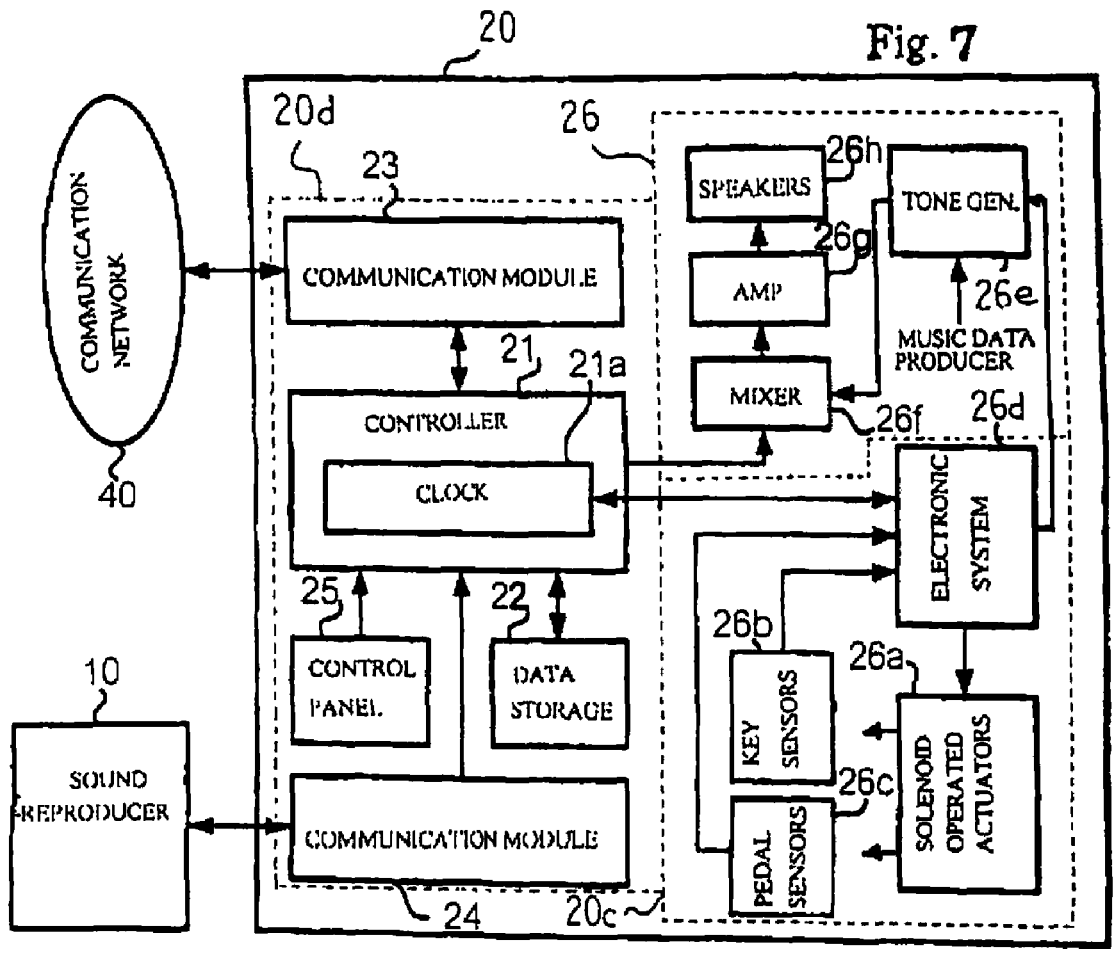
FIG. 7 is a block diagram showing the system configurations of electric and electronic systems incorporated in the automatic player musical instrument.

Description is hereinafter made on the communication modules 20d and electronic tone producer 26 with reference to FIG. 7. The communication modules 20d include a controller 21, a clock 21a, a data storage 22, a communication module 23, a communication module 24 and a control panel 25. The communication network 40 is connected to the communication module 23, and the automatic player musical instrument 20 communicates with the music data distribution server computer 30 through the communication module 23 under the supervision of the controller 21. The other communication module 24 is implemented by an USB (Universal Serial Bus) interface or a radio transmitter and receiver, and is used for communication with the sound reproducer 10.

The controller 21 is implemented by an information processor, and a central processing unit, peripheral processors, a program memory and a working memory are incorporated in the information processing system. In this instance, the information processor is shared between the controller 21 and the electronic system 26d. A computer program for the communication with external apparatus is stored in the program memory, and runs on the central processing unit so as to achieve the communication with the music data distribution server computer 30, reception of MIDI files from the music data distribution server computer 30, communication with the sound reproducer 10 and reception of duration data codes and audio signal from the sound reproducer 10 as will be hereinlater described in detail.

The clock 21a has an oscillator, which is implemented by a quartz oscillator and an amplifier, and a frequency demultiplier connected to the oscillator for producing various clock signals, and counts the clock signal so as to measure a lapse of time. The controller 21 periodically sets the clock 21a with the duration data codes of an audio file so that the lapse of time on the clock 21a is equal to the lapse of time from the audio data code at the head of the audio file. The duration data codes of audio file are supplied from the sound reproducer 10 to the communication module 24, and are transferred from the communication module 24 to the controller 21.

The data storage 22 is, by way of example, implemented by a hard disk unit. When the program and MIDI files arrive at the communication module 23, the controller 21 transfers the program and MIDI files to the data storage 22, and the program and MIDI files are stored in the data storage 22.

While the automatic playing system 20c is performing a music tune on the acoustic piano 20a on the basis of the MIDI file already stored in the data storage 22, the controller 21 periodically checks the clock 21a to see whether or not the time period expressed by the duration data code is expired. When the controller 21 finds that the time period is expired, the controller 21 supplies the next event data code or codes to the electronic system 26d, and the electronic system 26d selectively supplies the driving signals S4 and S5 to the solenoid-operated actuators 26a so as to depress and release the black keys 20f, white keys 20h and pedal mechanism 20p. Thus, the time intervals are measured with reference to the clock 21a so as to drive the acoustic piano 20a well in synchronism with the conversion from the audio data codes in the audio file to the audio signal.

The electronic tone producer 26 includes an electronic tone generator 26e, a mixer 26f, an amplifier 26g and loud speakers 26h. As described hereinbefore, while a human player is playing a tune on the acoustic piano 20a, the code generating system 20b produces the music data codes expressing the acoustic piano tones in a real time fashion, and supplies the music data codes to the electronic tone producer 26. An audio signal is produced in the electronic tone generator 26e on the basis of the music data codes, and is supplied from the electronic tone generator 26e to the mixer 26f. If another audio signal is supplied from the controller 21 to the mixer 21, the audio signals are mixed with one another, and are amplified through the amplifier 26g. If any audio signal is not supplied from the controller 21, the audio signal passes through the mixer 26f, and is amplified through the amplifier 26g. After the amplification, the audio signal is supplied to the loud speakers 26h, and is converted to the electronic tones through the loud speakers 26h.

Sound Reproducer

Figure 8:
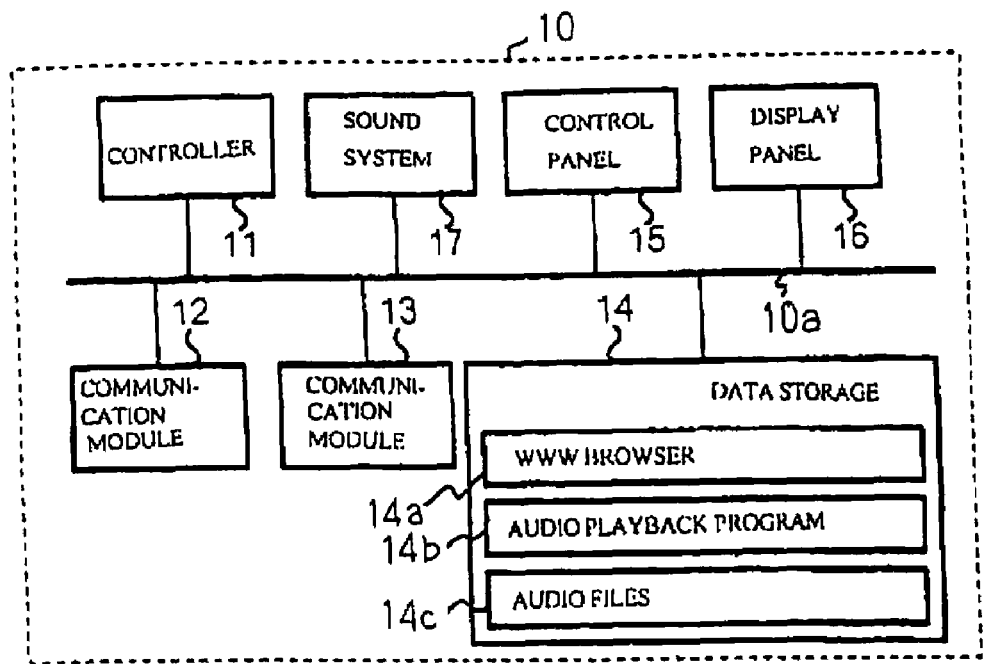
FIG. 8 is a block diagram showing the system configuration of a sound reproducer incorporated in the music reproducing system.

FIG. 8 shows the system configuration of sound reproducer 10. The sound reproducer includes a controller 11, communication modules 12 and 13, a data storage 14, a control panel 15, a display panel 16 and a sound system 17. The controller 11, communication modules 12 and 13, data storage 14, control panel 15, display panel 16 and sound system 17 are connected to an internal bus system 10a so that the controller 11 is communicable with the other system components 12, 13, 14, 15, 16 and 17 through the internal bus system 10a.

The controller 11 is implemented by an information processor, and a central processing unit, peripheral processors, a program memory and a working memory are incorporated in the information processor. Application programs such as www browser 14a and an audio playback program 14b are stored in the data storage together with audio files 14c and an FTA (File Allocation Table). The application programs selectively run on the central processing unit.

The communication module 12 is connected to the communication network 40. While the www browser is running on the central processing unit, the sound reproducer 10 communicates with the music data distribution server computer 30, and the audio files are downloaded to the data storage 14.

The other communication module 13 is implemented by an USB interface or a radio transmitter and receiver, and is connected to the communication interface 24 of the automatic player musical instrument 20 through a wired channel or a radio channel. The controller 11 transfers the audio signal and duration data codes in an audio file through the communication module 13 to the communication module 24.

The control panel 15 includes a computer keyboard and a mouse. A user gives his or her instruction to the sound reproducer 10 through the control panel 15. The display panel 16 is, by way of example, implemented by a liquid crystal display panel, and controller 11 produces visual images on the display panel 16. The user has dialogues with the controller 11 through the control panel 15 and display panel 16.

The sound system 17 includes amplifiers, loud speakers and a headphone. When a user wishes simply to playback a music tune, the audio data codes are transferred from the audio file in the data storage 14 to the sound system 17, and an audio signal is retrieved from the audio data codes. The audio signal is converted to the electric tones through the amplifiers and loud speakers.

On the other hand, when the user instructs the controller 11 to reproduce music tunes and narration/talk in a program through the automatic player musical instrument 20, the audio signal is transferred through the communication module 13 to the communication module 24 of automatic player musical instrument 20, and the duration data codes are further transferred to the communication module 24 of automatic player musical instrument 20 for the synchronization between playback and conversion from the audio data codes to the audio signal. The audio signal is relayed through the controller 21 to the mixer 26f, and the electric voice is produced through the loud speakers 26h.

Behavior of Music Reproducing System

Download

Figure 9:
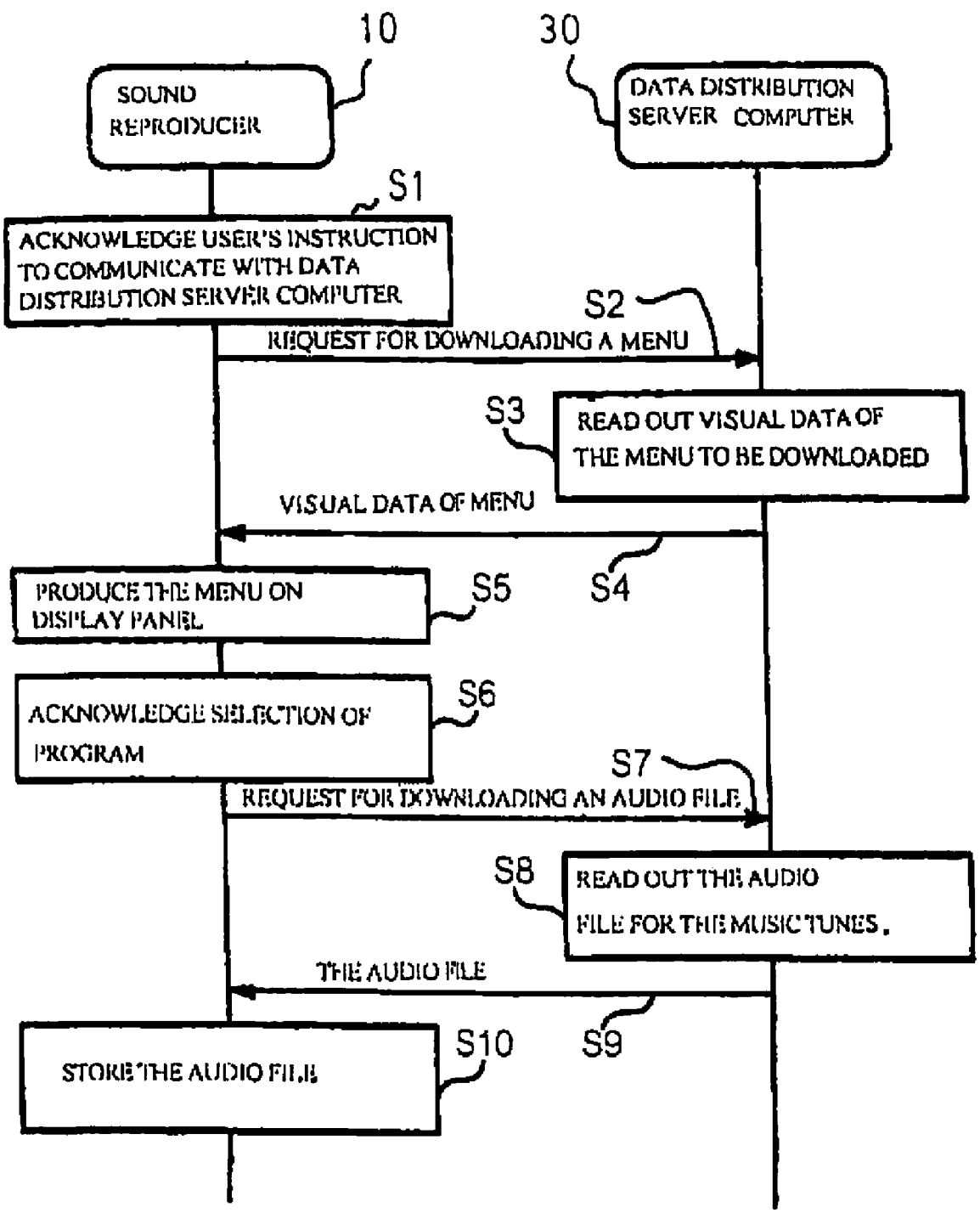
FIG. 9 is a block diagram showing a communication sequence between the sound reproducer and the music data distribution server computer.

First, the sound reproducer 10 behaves until storing an audio file as follows. FIG. 9 shows a communication sequence between the sound reproducer 10 and the music data distribution server computer 30. The computer program 33c for music data distribution has been already running on the controller 31 of the music data distribution server computer 30.

A user is assumed to wish to download an audio file for a program. The user gives an instruction to communicate with the data distribution server computer 30 to the sound reproducer 10 through the control panel 15. Then, the controller 11 acknowledges user's instruction as indicated by S1, and makes the www browser to run on the controller 11. The controller 11 designates the URL address indicative of the memory location assigned a menu or a list of programs, and sends a request for downloading the menu, i.e., an http request from the communication module 12 to the communication module 32 of the data distribution server computer 30 as indicated by S2.

Upon reception of the request, the music data distribution server computer 30 reads out the visual data expressing the menu from the data storage 33 as indicated by S3, and transmits the visual data as an http response to the sound reproducer 10 as indicated by S4.

Figure 10:
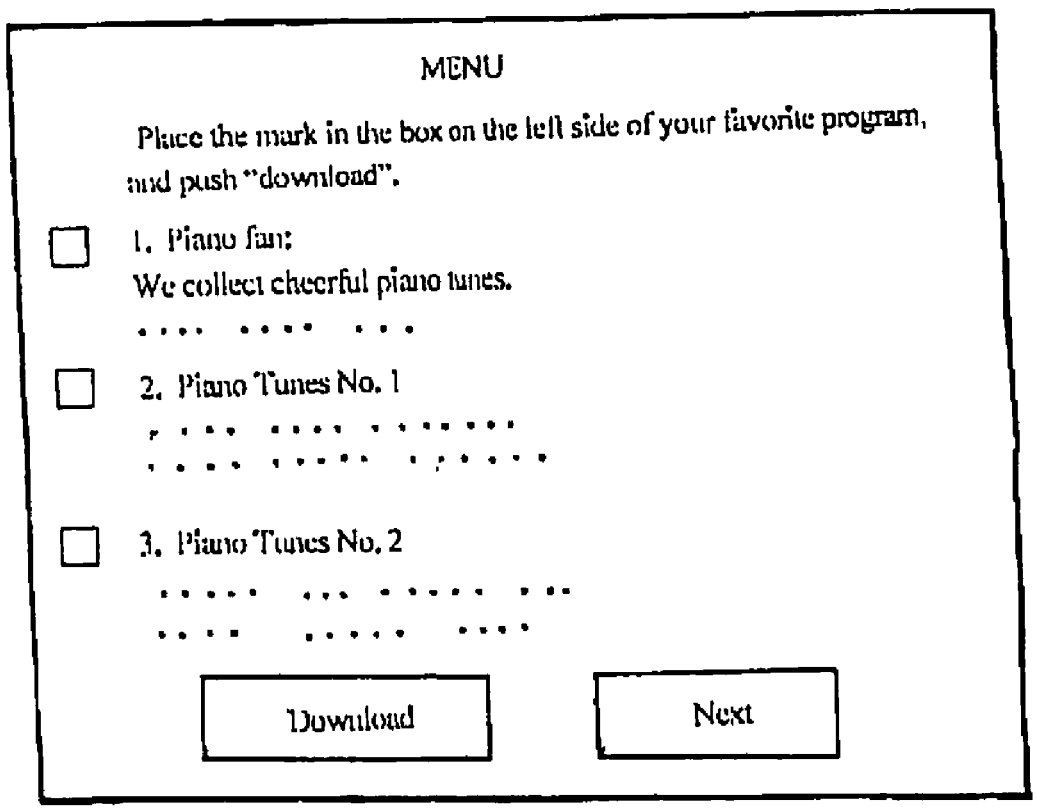
FIG. 10 is a view showing a picture produced on a display of the sound reproducer for download.

The visual data expressing the menu arrives at the communication module 12. Then, the controller 11 produces the visual image of menu on the display panel 16 as indicated by S5. FIG. 10 shows the visual image of menu produced on the display panel 16. Program names "Piano fan", "Piano tunes No. 1" and "Piano tunes No. 2" take place under a prompt message "Place the mark in the box on the left side of your favorite program, and push "download"". The programs are followed by recommendation to users. Though not shown in the display panel, the URL addresses are added to the program names by means of the anchor tag of HTML (Hyper Text Markup Language).

The user selects a program from the menu, and places the mark in the box on the left side of the program name by means of a pointer. When the user clicks the image of button "Download", the controller 11 acknowledges the user's selection of program as indicated by S6, and transmits the request, which contains the URL address, from the communication module 12 to the communication module 32 of the music data distribution server computer 30 as by S7. When the user does not find any favorite program, he or she clicks the image of button "Next". Then, other programs are displayed.

Upon reception of the request, the controller 31 accesses the audio file at the URL address, and reads out the audio file corresponding to the program name from the data storage 33 as indicated by S8. The controller 31 transmits the audio file from the communication module 32 to the communication module 12 as indicated by S8.

The audio file arrives at the communication module 12. Then, the controller 11 transfers the audio file to the data storage 14, and stores the audio file in the data storage 14 as indicated by S10. Thus, the download is accomplished.

Playback only Through the Sound Reproducer

Figure 11:
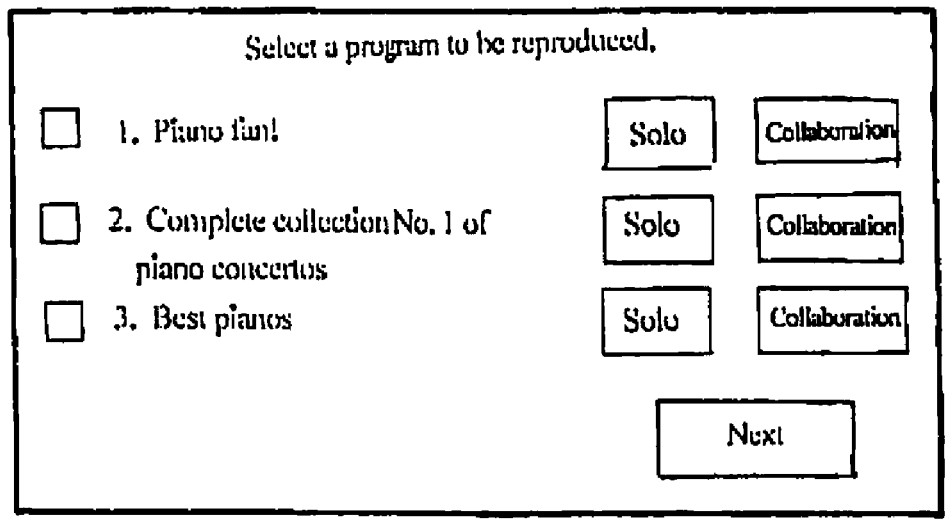
FIG. 11 is a view showing a picture produced on the display panel for playback.

The user is assumed to instruct the controller 11 the playback through the sound system 17. In other words, any collaboration is not requested. The audio playback program starts to run on the controller 11. The controller 11 reads out the program names of audio files already stored in the data storage 14, and produces a list of program name on the display panel 16 together with a prompt message "Select a program to be reproduced" as shown in FIG. 11.

Since three audio files "Piano fan!", "Complete collection No. 1 of piano concertos" and "Best pianos" are stored in the data storage 14, the program names of audio files are produced on the display panel 16. Each of the program names is followed by box "Solo" and box "Collaboration". The user moves the cursor into the box "Solo" or "Collaboration", and clicks it. The user is assumed to select the program "Piano fan!", and clicks the box "Solo". The controller starts to transfer the audio data codes in the audio file "Piano fan!" to the sound system 17, and are converted to the audio signal. As shown in FIG. 5, the audio file "Piano fan!" is labeled with the program identifier "CID 001", and contains "narration 1", "music tune 1", "narration 2", "music tune 2, "music tune 3", "narration 3" and "music tune 4" as shown in FIG. 3. Therefore, the audio signal is converted to the narration and music tunes in the order shown in FIG. 3.

Collaboration with Automatic Player Musical Instrument

Figure 12:
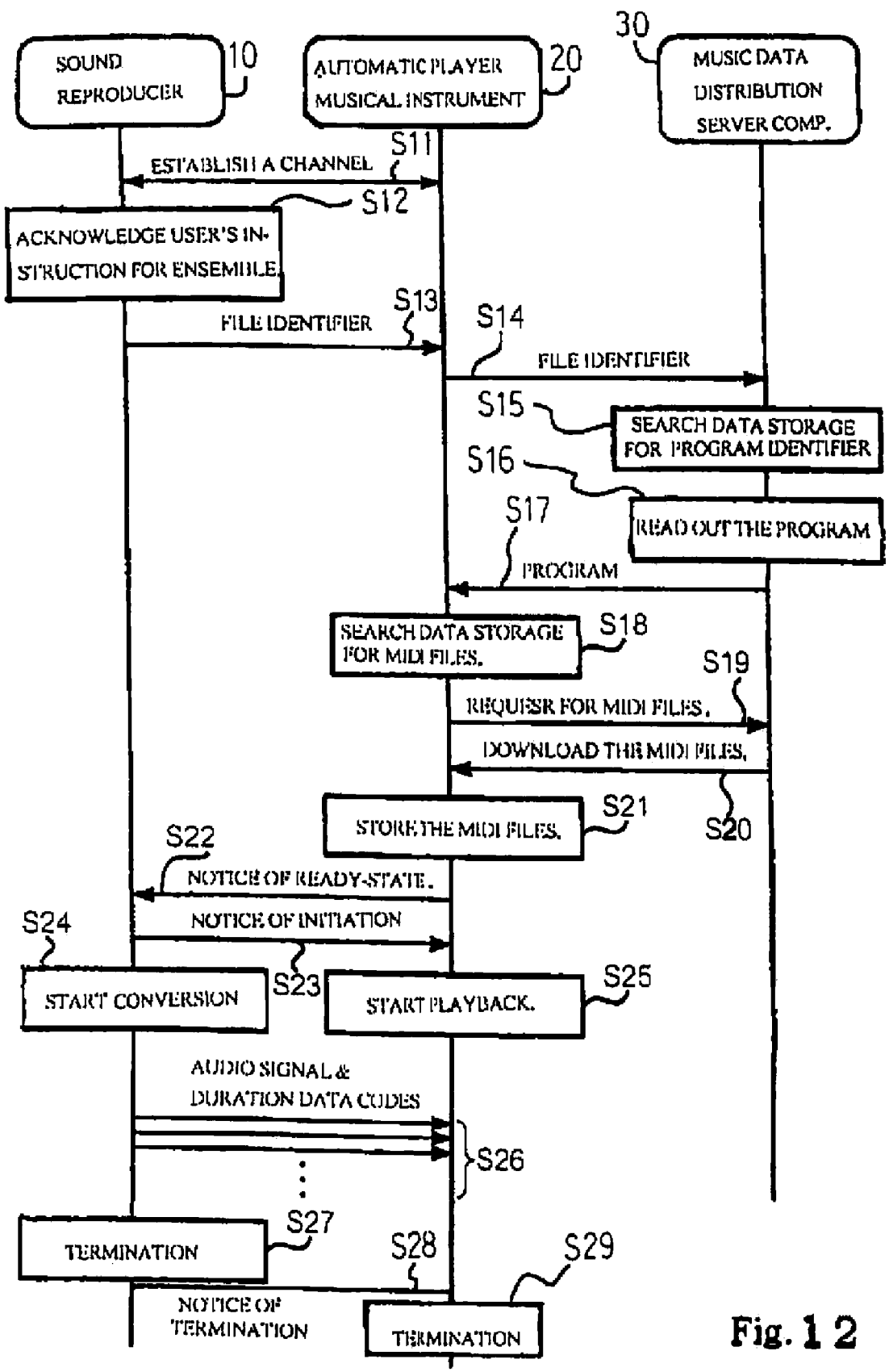
FIG. 12 is a block diagram showing a communication sequence among the sound reproducer, automatic player musical instrument and music data distribution server computer.
Figure 1:
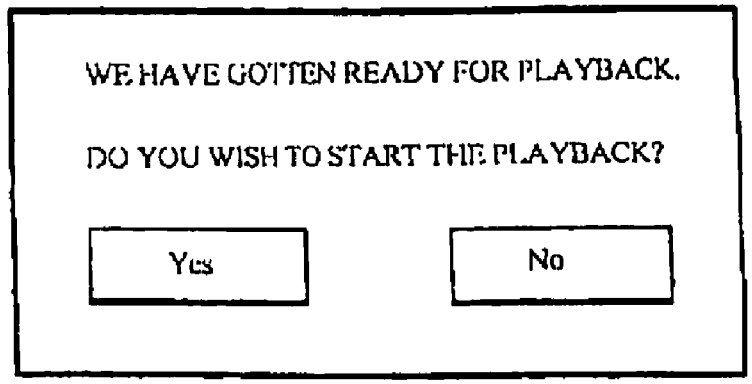
Figure 1:
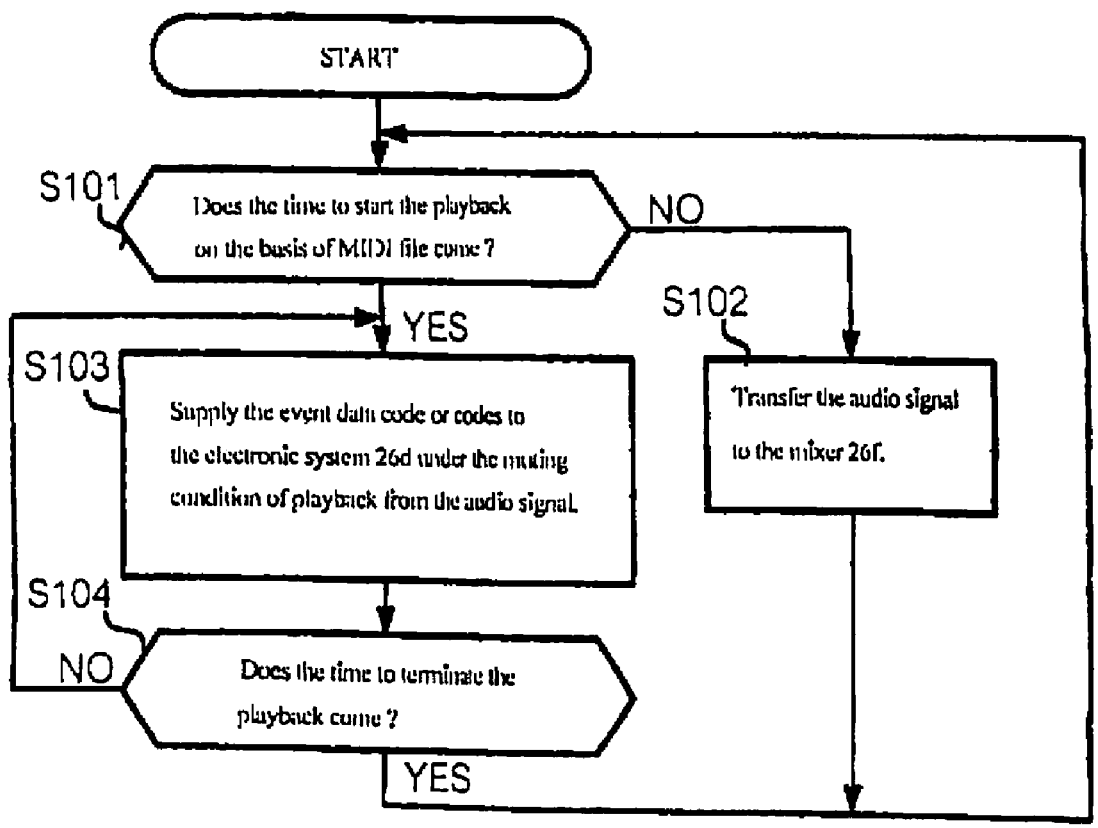

FIG. 12 shows a communication sequence among the sound reproducer 10, automatic player musical instrument 20 and music data distribution server computer 30. The user establishes a communication channel between the communication module 13 of sound reproducer 10 and the communication module 24 of automatic player musical instrument as indicated by S11, and gives the sound reproducer 10 an instruction for playback. The audio playback program starts to run on the controller 11, and produces the picture shown in FIG. 11 on the display panel 16.

The user is assumed to click the box "Piano fan!" and box "Collaboration". Then, the controller 11 acknowledges the user's instruction for playback as indicated by S12. The controller 11 accesses the FAT, and reads out the file identifier, which includes the pieces of data information expressing the file name "piano-fan.wab", file size "41.5 mega-bytes" and creation date "2006/1/25" from the FAT. The controller 11 transmits the file identifier from the communication module 13 to the communication module 24 of the automatic player musical instrument 20 as indicated by S13.

Upon reception of the file identifier, the controller 21 transmits the file identifier from the communication module 23 to the music data distribution sever computer 30 as indicated by S14.

When the file identifier arrives at the communication module 32, the controller 31 accesses the program management table 33a shown in FIG. 5, and determines the program identifier "CID001" as indicated by S15. The controller 31 searches the data storage 33 for the program labeled with the program identifier "CID001", and reads out the program from the data storage 33 as indicated by S16. The controller 31 transmits the read-out program from the communication module 32 to the communication module 23 of the automatic player musical instrument 20 as indicated by S17.

The program arrives at the communication module 23. Then, the controller 21 searches the data storage 22 for the program labeled with the program name to see whether or not the MIDI files of the program have been already stored in the data storage 22 as indicated by S18. As shown in FIG. 6, the program contains the MIDI files "piano-fan001.mid", "piano-fan002.mid", "piano-fan003.mid" and "piano-fan004.mid". Only the MIDI files "piano-fan002.mid" and "piano-fan003.mid" are assumed to be stored in the data storage 22. In other words, the MIDI files "piano-fan001.mid" and "piano-fan004.mid" are not found in the data storage 22. The controller 21 transmits a http request, which contains the URL addresses "http://www.abc.co.jp/CID001/piano-fan001.mid" and "http://www.abc.co.jp/CID001/piano-fan004.mid", from the communication module 23 to the communication module 32 as indicated by S19.

The hppt request is received by the communication module 32. Then, the controller 31 reads out the MIDI file "piano-fan001.mid", which is labeled with the URL address "http://www.abc.co.jp/CID001/piano-fan001.mid", from the data storage 33, and transmits the MIDI file from the communication module 32 to the communication module 23 as an http response. The controller 31 further reads out the MIDI file, which is labeled with the URL address "http://www.abc.co.jp/CID001/piano-fan004.mid", from the data storage 33, and transmits the MIDI file from the communication module 32 to the communication module 23. Thus, the MIDI files are downloaded to the automatic player musical instrument 20 as indicated by S20.

The controller 21 transfers the MIDI files from the communication module 23 to the data storage 22, and stores the MIDI files in the data storage 22 as indicated by S21.

When the MIDI files are stored in the data storage 22, the controller 21 gets ready to perform the music tunes 1 to 4. The controller 21 sends a notice of ready-state from the communication module 24 to the communication module 13 of sound reproducer 10 as indicated by S22.

Upon reception of the notice of ready-state, the controller 11 produces a picture shown in FIG. 13 on the display panel 16 so as to inform the user of the ready-state and ask for permission. The user is assumed to click the box "Yes". Then, the controller 11 sends a notice of initiation from the communication module 13 to the communication module 24 as indicated by S23.

The sound reproducer 10 starts the conversion from the audio data codes to the audio signal as indicated by S24. The automatic player musical instrument 20 starts the playback on the basis of the music data codes of MIDI file as indicated by S25, and starts to measure the lapse of time with the clock 21a. The audio signal and duration data codes are transmitted from the communication module 13 to the communication module 24 as indicated by S26.

FIG. 14 shows a job sequence realized through execution of the computer program installed in the controller 21 and electronic system 26d. As shown in FIG. 6, the program contains the playback schedule. The first music tune starts at 1' 16", and is terminated at 5' 48", and the second music tune starts at 6' 29", and is terminated at 14' 00". "Narration 1" is to be reproduced until 1' 16", and "narration 2" is inserted between the first music tune and the second music tune as shown in FIG. 3.

The controller 21 checks the clock 21a to see whether or not the time to playback the first music tune comes as by step S101. The answer at step S101 is given negative "No" from the initiation of playback to 1' 16", and the controller 21 transfers the audio signal from the communication module 24 to the mixer 26f so as to reproduce the narration 1.

The answer at step S101 is changed to affirmative "Yes" at 1' 16". Then the controller 21 supplies the first key event data code or codes from the data storage 22 to the electronic system 26d, and mutes the electric tones to be produced from the audio signal as by step S103. Thus, the controller 21 blocks the mixer 26f from the audio signal converted from the audio data codes. Any electric tone is not reproduced from the audio signal.

The user has two options, i.e., the automatic playing system 20c and electronic tone producer 26. If the user selects the automatic playing system 20c, the black keys 20f, white keys 20h and pedal mechanism 20p are selectively driven by the solenoid-operated actuators 26a as described hereinbefore, and the acoustic piano tones are produced through the acoustic piano 20a. On the other hand, when the user selects the electronic tone producer 26, the music data code or codes are transferred to the electronic tone generator 26e. The audio signal is produced on the basis of the music data code or codes, and is supplied through the mixer 26f and amplifier 26g to the loudspeakers 26h. The audio signal is converted to the electric tones along the music passage of the first music tune.

Subsequently, the controller 21 checks the clock 21a to see whether or not the time to terminate the playback comes as by step S104. The answer at step S104 is given negative "No" until 5' 48", and the controller returns to step S103. The controller checks the clock 21a to see whether or not the time period between the key event and the next key event is expired. While the answer is being given negative "No", the controller 21 continuously sets the clock 21a with the duration data codes of the audio file. When the time period is expired, the controller 21 transfers the next event data code or codes to the electronic system 26d for producing the acoustic piano tone or electronic tone.

The controller 21 reiterates the loop consisting of steps S101 to step S104 until 5' 48". When the answer at step S104 is changed to affirmative "Yes", the controller 21 restarts to supply the audio signal to the mixer 26f, and the narration 2 is reproduced. The audio signal is changed to the event data codes at 6' 29", and the second music tune is reproduced through the automatic player musical instrument 20 until 14' 00". The third music tune starts at 14' 13" without any narration, and is terminated at 24' 13". The third music tune is followed by the narration 3 reproduced from the audio signal, and the fourth music tune is reproduced through the automatic player musical instrument 20 between 25' 20" to 31' 23". Thus, the program proceeds in the order shown in FIG. 6, and the narration and music tunes are selectively reproduced on the basis of the audio files and MIDI files.

When all the contents of program are reproduced, the sound reproducer 10 terminates the data processing as indicated by S27, and sends a notice of termination to the automatic playing musical instrument 20 as indicated by S28. Upon reception of the notice of termination, the automatic playing musical instrument 20 also terminates the data processing.

As will be understood from the foregoing description, the clock 21a, which is periodically set with the duration data codes of the audio file, makes the sound reproducer 10 synchronized with the automatic player musical instrument 20 in spite of the difference in format between the duration data codes in the audio file and the duration data codes in the MIDI file, and the program makes it possible to reproduce the music tunes and narration/talk in collaboration between the sound producer 10 and the automatic playing musical instrument 20. The automatic player musical instrument 30 is available for the playback of music tunes so that the music reproducing system gives the music tunes with convert-hall presence.

Modifications of First Embodiment

In the following description on the modifications, system components of the modifications are labeled with references designating the corresponding system components of music reproducing system 100 without detailed description for the sake of avoiding repetition.

The computer programs may be installed in the controllers 11, 21 and 31 from a magnetic tape cassette, a magnetic disk, a flexible disk, an optical disk, an opto-magnetic disk, a compact disc, a DVD (Digital Versatile Disk) or a RAM stick.

First Modification

The first modification of the music reproducing system is different from the first embodiment in the communication from S14 to S21. In the first embodiment, only the MIDI files not found in the data storage 22 are downloaded from the music data distribution server computer 30. This feature is desirable from the viewpoint of reduction of load in downloading work. On the contrary, when the automatic player musical instrument 20 transmits the file identifier to the music data distribution server computer 30, all of the MIDI music data files and program are concurrently downloaded from the music data distribution server computer 30 to the automatic player musical instrument 20. Thus, the communication is made simplified rather than the communication in the first embodiment.

Second Modification

Figure 15:
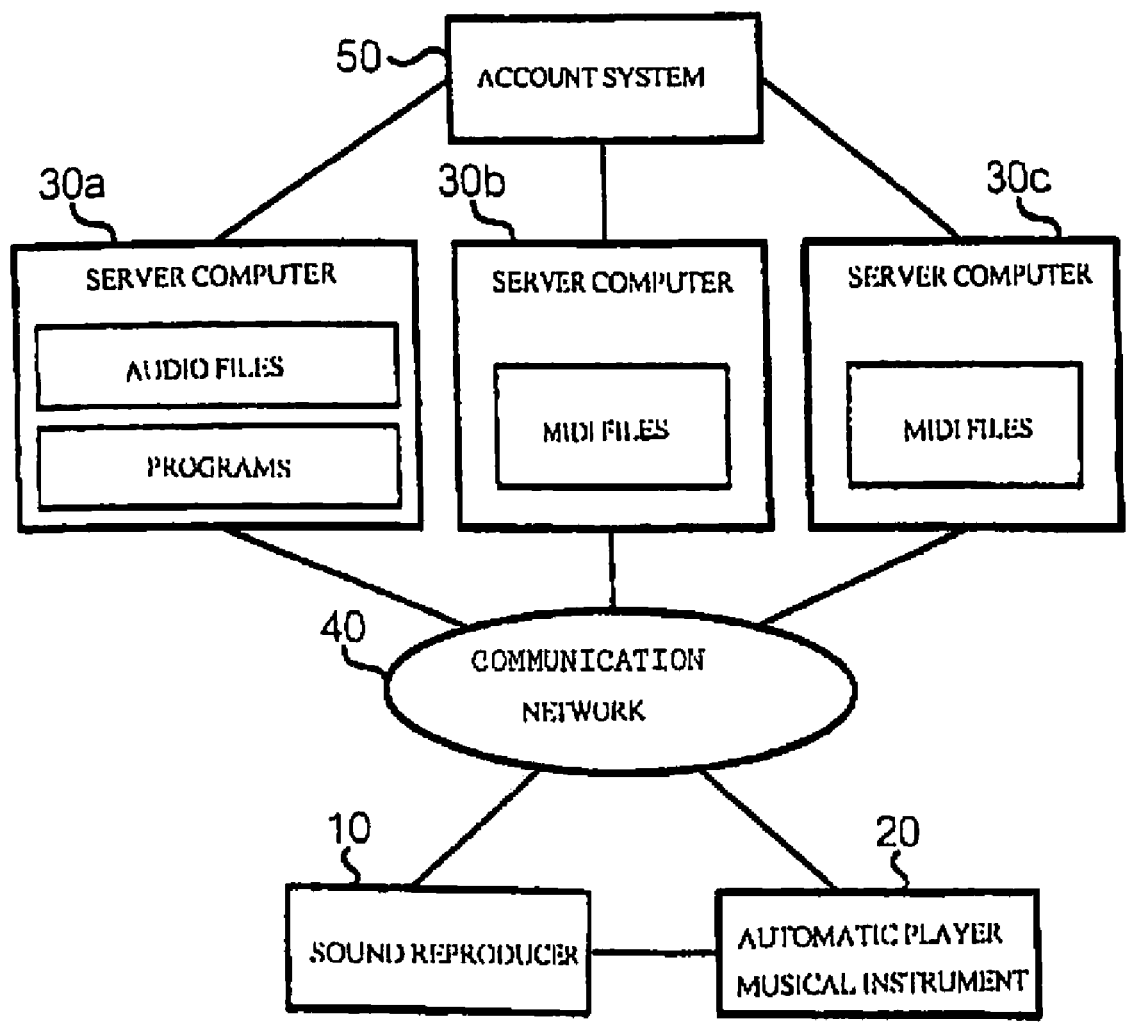
FIG. 15 is a block diagram showing the system configuration of a modification of the music reproducing system of the present invention.

FIG. 15 illustrates the system configuration of the second modification of the first embodiment. Although the audio files, programs and MIDI files are stored in the music data distribution server computer 30, the audio files and programs are stored in a server computer 30a different from the server computers 30b and 30c where the MIDI files are stored.

When a user instructs the sound producer 10 to reproduce a program in collaboration with the automatic player musical instrument 20, the program and audio files are firstly downloaded from the server computer 30a to the sound reproducer 10, and makes the automatic player musical instrument 20 to transmit a request for downloading the MIDI files at the URL addresses in the program from the server computer 30b and/or 30c to the automatic player musical instrument 20.

It is not easy for the service provider to prepare a huge number of audio files and a huge number of MIDI file in the server computer. In the second modification, plural service providers bear the huge number of files in the plural server computers 30a, 30b and 30c so that the music reproducing system is easily established in the network. Thus, the service providers can offer a large number of programs to users through the second modification of the music reproducing system.

Third Modification

Figure 16:
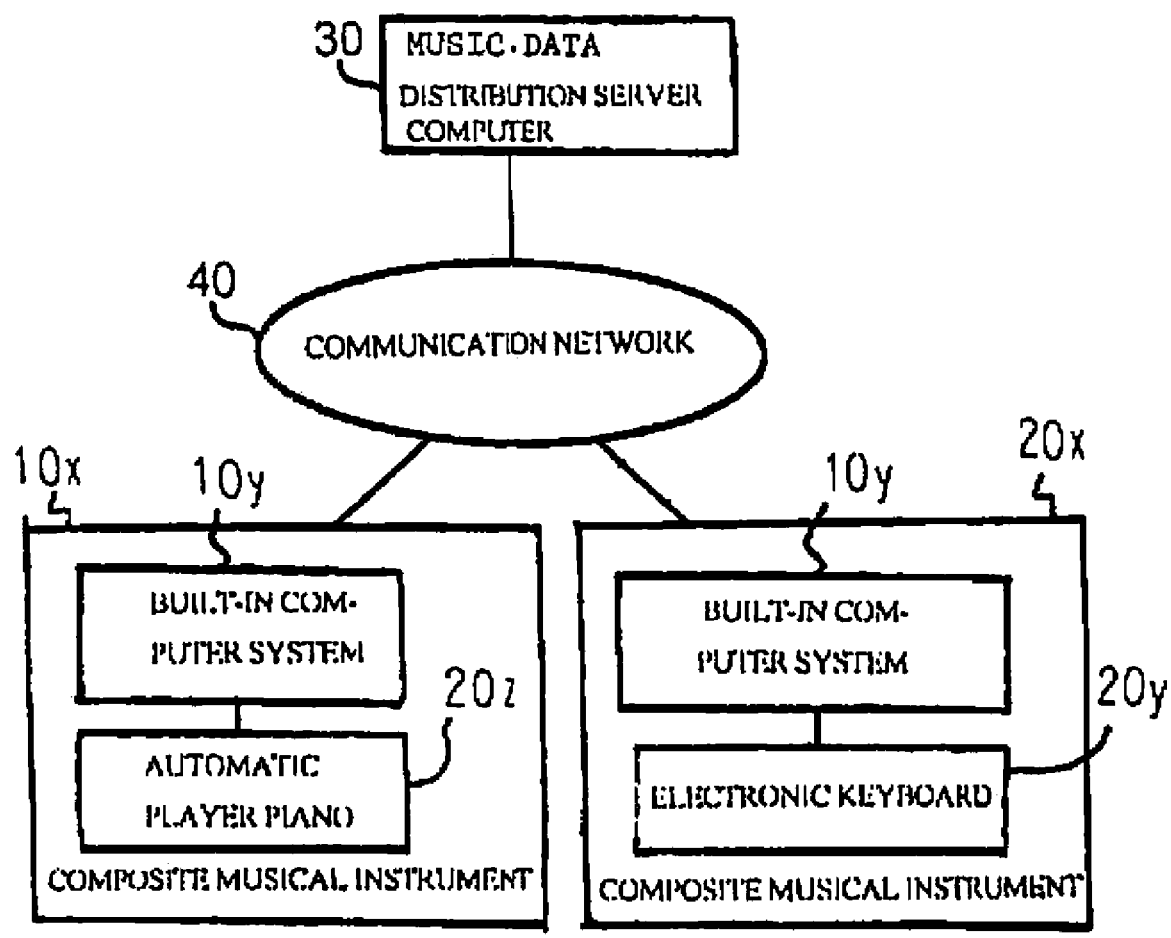
FIG. 16 is a block diagram showing the system configuration of another modification of the music reproducing system of the present invention.

Turning to FIG. 16, there is shown the third modification of the music reproducing system of the present invention. The third modification includes a composite musical instrument 10x, another composite musical instrument 20x, the music data distribution server computer 30 and the communication network 40. Although the sound reproducer 10 is physically separated from the automatic player musical instrument 20 in the first embodiment shown in FIG. 1, a built-in computer system 10y and an automatic player piano 20z have a unitary structure in the composite musical instrument 10x, and a built-in computer system 10y and an electronic keyboard 20y also have a unitary structure in the composite musical instrument 20x.

The built-in computer systems 10y are similar in system configuration to the personal computer system 10. In the composite musical instrument 10x, the audio signal, which is produced from audio data codes in an audio file, is converted to the electric voice and electric tones through the sound system 17, and the acoustic piano tones are produced through the acoustic piano on the basis of the music data codes in MIDI files. On the other hand, although the audio signal is also converted to the electric voice and electric tones through the sound system 17 in the composite musical instrument 20x, the electronic tones are produced through an electronic tone producer, which is similar to the electronic tone producer 26, of the electronic keyboard 20y on the basis of the music data codes in MIDI files. For this reason, the automatic player piano 20z is not equipped with the electronic tone producer 26, and the electronic keyboard 20y is much simpler than the automatic player musical instrument 20.

Fourth Modification

Turning back to FIG. 15, the fourth modification of the music reproducing system has an accounting system 50. The accounting system 50 is, by way of example, implemented by various accounting networks such as the Japan Bank Network and/or CAFIS (Credit And Finance Information System), and is connected to the server computers 30a, 30b and 30c. When a user downloads the programs, audio files and MIDI files, the service providers write out bills, and settle accounts with the users through the accounting system 50.

In detail, the audio files and MIDI files are priced, and are accompanied with price lists in the data storages 33 of the server computers 30a, 30b and 30c. A user list is further stored in the data storages 33, and the users have been registered in the user list. The name, address, birthday, user identifier, bank account number and credit card number are written in the user list for each of the registered users.

When a user requests the server computer 30a, 30b or 30c for the download of an audio file, a program or a MIDI file, the controller 31 requests the user to send the user identifier to the server computer 30a, 30b or 30c, and transmits the program or file to the sound reproducer or automatic player musical instrument 20 after the confirmation of the user.

Upon completion of the download, the controller 31 accesses the price list so as to write out a bill, and sends the bill to the account system 50 for the settlement. If the user requests the service providers to settle the accounts through the credit card system, the service providers put the bill in the credit account. Thus, the bills are automatically settled at the user's account number through the accounting system 50.

Fifth Modification

The fifth modification of music reproducing system is different from the music reproducing system 100 in that the automatic player musical instrument 20 can reproduce music tunes through in-stream playback on the basis of MIDI files. In the in-stream playback, the music data codes are transmitted from the music data distribution server computer 30 through the communication network 40, and the music tune is reproduced on the basis of the music data codes in a real time fashion. Otherwise, the MIDI file is stored in the random access memory, and is erased after the playback. For this reason, it is difficult to reuse the music data codes after the in-stream playback.

A user can choose the playback method between the standard playback after the download and the in-stream playback. If the user chooses the standard playback, the automatic player musical instrument 20 behaves as similar to that shown in FIG. 12. On the other hand, when the user chooses the in-stream playback, the music data codes are transmitted from the music data distribution server computer 30 to automatic player musical instrument 20, and are temporarily stored in the random access memory of the controller 21. The music data codes are timely transferred to the electronic system 26d so as to produce the acoustic piano tones or electronic tones on the basis of the event data codes.

In case where the fee-charging download is employed in the fifth modification, the in-stream playback is beneficial to users, because the price of MIDI files for the in-stream playback is lower than the price of MIDI files for the standard playback. Users may choose the standard playback for music tunes out of the copyright, and choose the in-stream playback for the copyrighted music tunes.

In order to respond to user's choice, the MIDI files are broken down into two groups, the copyrighted music tunes, i.e., the first group and the music tunes out of the copyright, i.e., the second group, and a tag indicative of the first group is added to the MIDI files in the first group, and another tag indicative of the second group is added to the MIDI files in the second group.

A user is assumed to reproduce the contents of a program. The program contains copyrighted music tunes and music tunes out of the copyright. In this situation, the MIDI files in the second group are downloaded into the data storage 22. However, the MIDI files in the first groups are not downloaded.

While the automatic player music instrument 20 is collaborating with the sound reproducer 10, the music tunes out of the copyright are reproduced on the basis of the music data codes in the MIDI files stored in the data storage 22 between the start time and the termination time designated in the program, and the controller 21 requests the music data distribution server computer 30 to transmit the music data codes expressing the copyrighted music tunes to the communication module 23 before the start time so as to permit the electronic system 26d to start the playback at the start time. Upon completion of the reproduction of contents of program, the music data codes in the random access memory are erased.

Thus, the service provider can restrict the reuse of the MIDI file through the in-stream playback, and offer the program contents at low price.

Sixth Modification

The sixth modification of music reproducing system is different from the music reproducing system 100 in that only one of the sound reproducer 10 and automatic player musical instrument 20 has the communication capability with the music data distribution server computer 30.

Only the sound reproducer 10 is assumed to have the communication capability. The automatic player musical instrument 20 acquires a program and MIDI files from the music data distribution server computer 30 through the sound reproducer 10.

In detail, the automatic player musical instrument 20 requests the sound reproducer 10 for the acquisition of program and MIDI files through the communication channel 40c, and the program and MIDI files are downloaded from the communication module 32 to the communication module 12. The controller 11 transfers the program and MIDI files from the communication module 13 to the communication module 24 through the communication channel 40c.

Thus, the automatic player musical instrument 20 or sound reproducer 10 of the sixth modification is simpler than that of the music reproducing system 100.

Seventh Modification

The seventh modification is different from the music reproducing system 100 in that the playback on the basis of the MIDI file is made synchronous with the conversion from the audio data codes to the audio signal through the synchronization technique disclosed in Japan Patent Application laid-open No. 2003-271138 or the synchronization technique disclosed in Japan Patent Application laid-open No. 2006-47761.

The synchronization technique disclosed in the former laid-open is that unique peaks of an audio signal are correlated with music data codes in a table. The controller checks the table to see whether or not the music data codes are processed concurrently with the unique peaks. When the answer is given negative, the controller advances the internal clock or puts the internal clock slow. Since the time intervals between the key events are measured with the internal clock, the two apparatus are synchronized with one another.

The synchronization technique disclosed in the latter laid-open is that the synchronization control is assigned to one of the plural channels between two apparatus. While the audio data codes are being converted to the audio signal, the controller of sound reproducer assigns the pieces of audio data to the channel L and LTC, which is a time code defined in the SMTPE (Society of Motion Picture and Television Engineers) and contains the pieces of time data and file identifier, to the channel R, and transmits the pieces of audio data and LTC to the automatic player musical instrument through the channels L and R. The controller of automatic player musical instrument makes the internal clock set with the pieces of time data contained in the LTC.

Eighth Modification

The eighth modification is different from the music reproducing system 100 in that the controller 21 does not block the mixer 26f from the audio signal, which is produced from the audio data codes in the sound reproducer 10. In this instance, the electric tones are produced from the audio signal concurrently with the acoustic piano tones or electronic tones.

The electric tones may be produced through the sound system 17 or both of the loudspeakers 26h and sound system 17. In case where the electric tones are produced through the sound system 17, the audio signal is not transmitted to the communication module 24, and only the duration data codes are supplied through the communication module 24 to the controller 21.

Ninth Modification

The ninth modification is different from the music reproducing system 100 in that either audio files, program or MIDI files are read out from a portable information storage medium such as, for example, a compact disc, a flexible disc, an MD, an audio cassette tape or a record disc. The other materials are downloaded from the music data distribution server computer 30 through the communication network 40.

Tenth Modification

The tenth modification is different from the music reproducing system 100 in that the MIDI file or files are downloaded after the initiation of reproduction of a program. Of course, each MIDI file is required before the start time.

Eleventh Modification

The eleventh modification is different from the music reproducing system 100 in that another sort of electronic device serves as the sound reproducer 10. The personal computer may be replaced with a mobile telephone, a PHS (Personal Handy phone System) terminal, a PDA (Personal Digital Assistants) or a portable music player.

Second Embodiment

Figure 17:
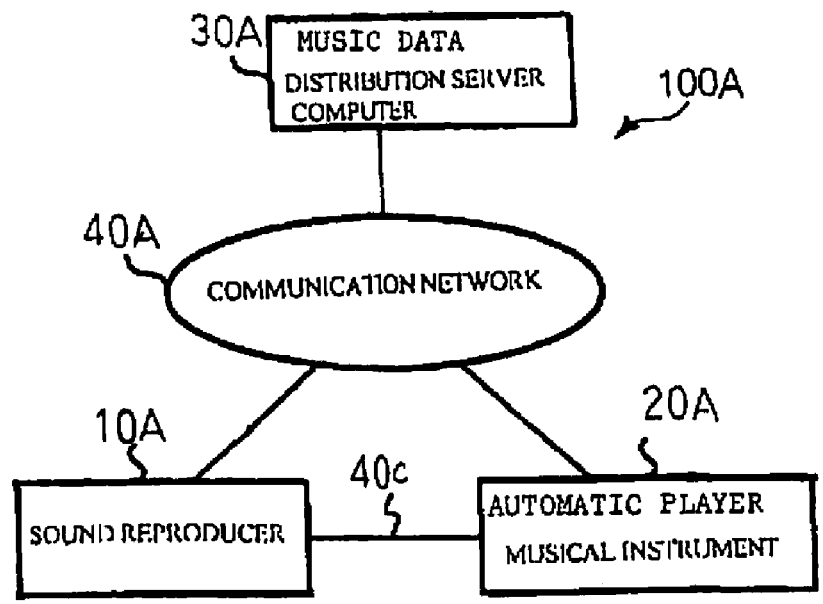
FIG. 17 is a block diagram showing the system configuration of another music reproducing system of the present invention.

FIG. 17 shows the system configuration of another music reproducing system 100A of the present invention. The music reproducing system 100A comprises a sound reproducer 10A, an automatic player musical instrument 20A, a music data distribution server computer 30A and a communication network 40A. The system configuration of music reproducing system 100A is analogous to the music reproducing system 100. However, the music reproducing system 100A is different from the music reproducing system in that the sound reproducer 10A and automatic player musical instrument 20A reproduce the contents of a program in collaboration therebetween in the absence of a MIDI file expressing a music tune contained in the program.

In detail, the sound reproducer 10A, automatic player musical instrument 20A and music data distribution server computer 30A are connected to the communication network 40A through a wire communication channel or a radio communication channel, and communicate with one another through the communication network 40A. The sound reproducer 10A is further connected to the automatic player musical instrument 20A through a wire communication channel or a radio communication channel 40c so that the sound reproducer 10A and automatic player musical instrument 20A are directly communicable with one another through the wire communication channel/radio communication channel 40c.

The sound reproducer 10A is, by way of example, implemented by a personal computer system, and an audio playback computer program is installed in the personal computer system so as to convert pieces of audio data or audio data codes to tones and/or sound. The audio data codes express discrete values on the waveform of an audio signal representative of the tones and/or sound.

The automatic player musical instrument 20A is a combination of an acoustic piano and an automatic playing system, and the automatic playing system performs a music tune on the acoustic piano without any fingering of a human player. As will be described hereinlater, the automatic player musical instrument 20A further includes an electronic tone producer, and electronic tones are produced on the basis of the music data codes by means of the electronic tone producer. Thus, users have a choice between the acoustic piano tones and the electronic tones.

The music data distribution server computer 30A is put on the WWW together with the sound reproducer 10A and automatic player musical instrument 20A. Thus, the music data distribution server computer 30A, sound reproducer 10A and automatic player musical instrument 20A form a client-server system through the communication network 40A.

The communication network 40A includes various sorts of networks such as the internet, telephone networks and so forth. The MIDI files, programs and audio files are distributed from the music data distribution server computer 30A to the sound reproducer 10A and automatic player musical instrument 20A through the communication network 40A.

Programs are prepared for reproduction through the sound reproducer 10A and automatic player musical instrument 20A in collaboration with one another. At least one music tune is contained in the program together with narration and/or talk, and is expressed by the audio data codes in an audio file as well as the music data codes in a MIDI file.

When a user wishes to reproduce the program, the user gives the instruction to reproduce the music tune and narration. The audio file and MIDI file are downloaded to the sound reproducer 10A and automatic player musical instrument 20A, respectively, and the narration and music tune are reproduced through the sound reproducer 10A and automatic player musical instrument 20A, respectively, as similar to the music reproducing system 100. However, all the MIDI files in a program are not always stored in the music data distribution server computer 30A. Although the MIDI files, which are stored in the music data distribution server computer 30A, are downloaded to the automatic player musical instrument 20A, the automatic player musical instrument 20A can not acquire the remaining MIDI file or files. In this situation, while the reproduction is proceeding along the program, the automatic player musical instrument 20A reproduces the music tunes on the basis of the acquired MIDI files, and the sound reproducer 10A reproduces the other music tune or tunes from the audio file or files instead of the MIDI file or files as well as the narration. Thus, the music reproducing system 100A can reproduce all the music tunes in the program in spite of the absence of MIDI file or files.

Music Data Distribution Server Computer

Figure 18:
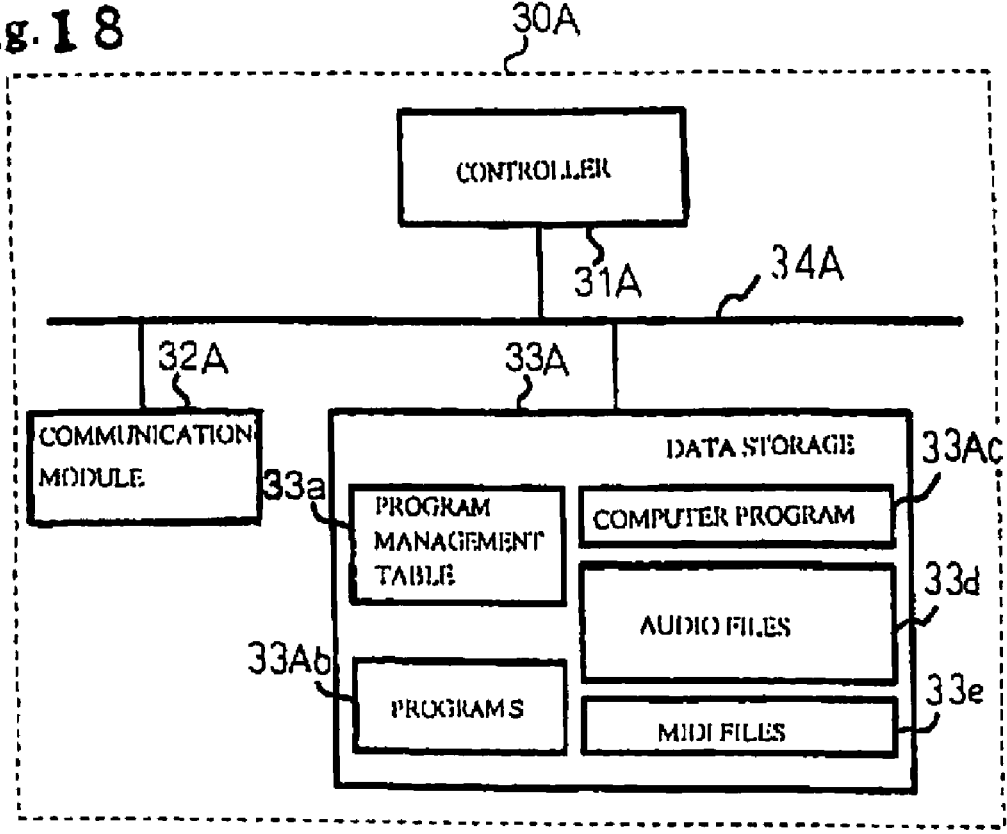
FIG. 18 is a block diagram showing the circuit configuration of a music data distribution server computer incorporated in the music reproducing system, FIG. 19 a view showing an audio file and MIDI files to be reproduced in a program.

FIG. 18 illustrates the circuit configuration of the data distribution server computer 30A. The data distribution server computer 30A includes a controller 31A, a communication module 32A and a data storage 33A, and the controller 31A, communication module 32A and data storage 33A are connected to one another through an internal bus system 34A.

Though not shown in the drawings, the controller 31A includes a central processing unit, peripheral processors, a program memory and a working memory, and a computer program 33Ac runs on the controller 31A so as to achieve various tasks such as a data management, analysis of requests of clients, a file transmission and so forth. The communication module 32A is connected to the communication network 40A. The client requests are received at the communication module 32A, and programs, audio files and MIDI files are transmitted from the communication module 32A to the sound reproducer 10A and automatic player musical instrument 20A. The data storage 33A is, by way of example, implemented by a hard disk unit or hard disk units, and the storage space in the hard disk or disks are assigned to a program management table 33a, programs 33Ab, a computer program 33Ac, audio files 33d and MIDI files 33e.

A job sequence is expressed by the computer program 33Ac for distributing the audio files 33d and MIDI files 33e to clients, and pieces of visual image data are further stored in the memory subspace assigned to the computer program 33Ac. Various pictures to be produced in client's display panels are expressed by the pieces of visual image data. File identifiers for the audio files are correlated with programs in the program management table 33a, and the MIDI files and URL addresses are correlated with the program identifiers in the programs 33Ab.

Figure 19:
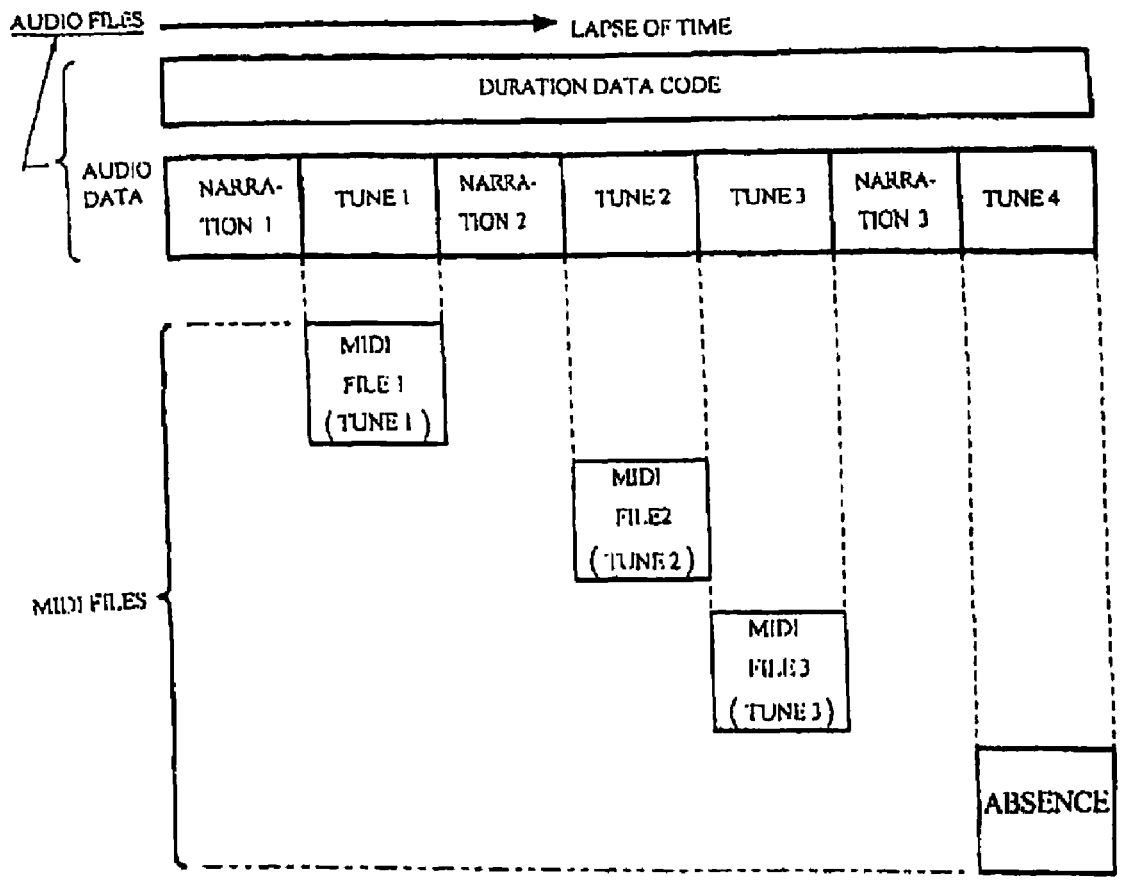

FIG. 19 shows the data structure of an audio file and MIDI files to be reproduced in a program. The audio file contains the audio data codes and duration data codes. The duration data codes express a lapse of time from the first audio data code at the head of the audio file. On the other hand, discrete values are sampled from the waveform of an analog audio signal at 44.1 kilo-hertz, and are stored in the audio data codes.

The series of audio data codes in the audio file expresses plural contents such as, for example, narration and tunes. The tune 1 is explained in the narration 1, the tunes 2 and 3 are explained in the narration 2, and the tune 3 is explained in the narration 3. While the contents in audio file are being reproduced, the audio data codes for the narration 1 are firstly converted to voice, the audio data codes for the tune 1 are converted to tones, subsequently, the audio data codes for the narration 2 are converted to voice, and is followed by the conversion of audio data codes for the tones of tunes 2 and 3, thereafter, the audio data codes for the narration 3 are converted to voice, and, finally, the audio data codes for the tune 4 are converted to tones. The narration 1, 2 and 3 and tunes 1, 2, 3 and 4 form a program. Thus, a single music tune or plural music tunes are to be reproduced in each program.

Plural MIDI files are correlated with the audio file. Tones are reproduced on the basis of the music data codes in the MIDI file 1 instead of the playback of the tune 1 recorded in the audio file, and the tones are reproduced on the basis of the music data codes in the MIDI files 2 and 3 instead of the playback of the tunes 2 and 3. However, any MIDI file, which expresses the tune 4, is not stored in the data storage 33A.

While the program is being reproduced, the music tunes 1, 2 and 3 are reproduced by means of the automatic player musical instrument 20A, and the narration 1, 2 and 3 and music tune 4 are reproduced from the audio signal produced in the sound reproducer 10A. Thus, the program is completely reproduced through the sound reproducer 10A and automatic player musical instrument 20A in spite of the absence of MIDI file for the music tune 4.

Figure 20:
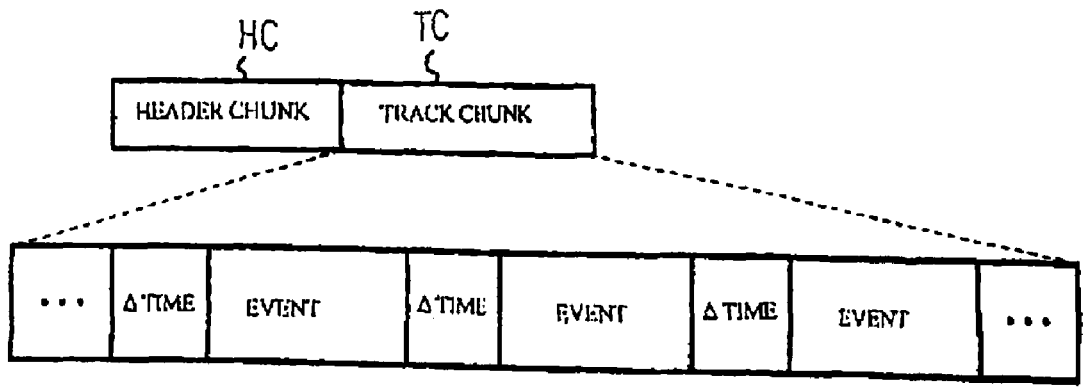
FIG. 20 is a view showing the data structure of a MIDI file.

Turning to FIG. 20, a MIDI file is broken down into a header chunk HC and a track chunk TC. Pieces of attribute data are stored in the header chunk for the MIDI file, and the event data codes and duration data codes are stored in the track chunk TC. Although the duration data codes of audio file express a lapse of time from the audio data code at the head of audio file, each of the duration data codes of MIDI file expresses a lapse of time between a key event and the next key event.

FIG. 21 illustrates the contents of the program management table 33a. The file identifier is broken down into an audio file name, a file size and a creation date. The audio file is identified with the audio file name. The file size expresses the number of bytes occupied by the audio file, and the creation date is indicative of the year, month and day at which the audio file is created. For example, an audio file is labeled with the audio file name "piano-fan.wab". 41.5 mega-bytes are required for the audio file named as "piano-fan.wab", and the audio file is created in Jan. 25, 2006. The audio file named as "piano-fan.wab" is correlated with the program labeled with the program identifier "CID 001".

When a program is revised, the revised date is written as the creation date. One of the file size and creation date may be omitted from the file identifier. The file identifiers shown in FIG. 21 do not set any limit to the technical scope of the present invention. Any format is available for the file identifier in so far as the audio file is designable with the file identifier. For example, numerals may be simply assigned to the audio files.

The controller searches the program management table 33a for the audio file by using the fine identifier as a key, and determines the program identifier correlated with the file identifier.

FIG. 22 illustrates the contents of the program labeled with the program identifier "CID 001". The program labeled with the program identifier "CID 001" is correlated with a playback schedule, URL addresses of MIDI files and MIDI file names in the program. Start time at which the playback starts and termination time at which the playback is completed are written in the playback schedule for each of the MIDI files. For example, the playback from the MIDI file "piano-fan001.mid" starts at 1 min. and 16 sec, and the playback is completed at 5 min. and 48 sec, and the MIDI file is stored at the memory location assigned the URL address "http://www.abc.Co.jp/CID001/piano-fan001.mid".

As described hereinbefore in conjunction with the correlation between the audio file and the MIDI files, the MIDI file for the music tune 4 is not stored in the music data distribution server computer 30A, neither URL address nor file name is written in the fourth row as shown.

Sound Reproducer

Figure 23:
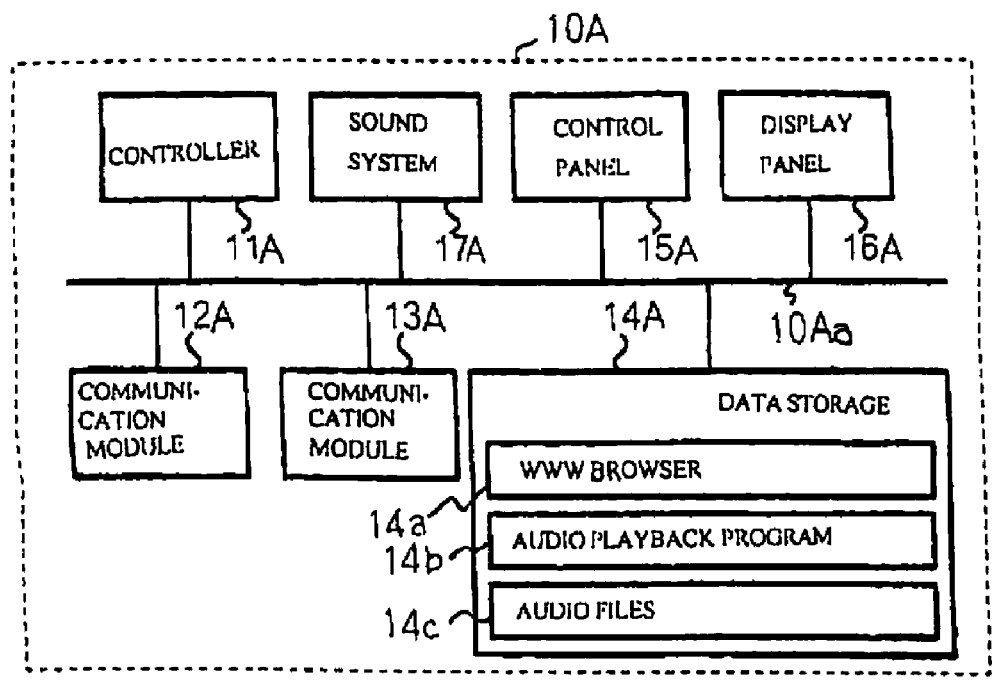
FIG. 23 is a block diagram showing the system configuration of a sound reproducer incorporated in the music reproducing system.

FIG. 23 shows the system configuration of sound reproducer 10A. The sound reproducer 10A includes a controller 11A, communication modules 12A and 13A, a data storage 14A, a control panel 15A, a display panel 16A and a sound system 17A. The controller 11A, communication modules 12A and 13A, data storage 14A, control panel 15A, display panel 16A and sound system 17A are connected to an internal bus system 10Aa so that the controller 11A is communicable with the other system components 12A, 13A, 14A, 15A, 16A and 17A through the internal bus system 10Aa.

The controller 11A is implemented by an information processor, and a central processing unit, peripheral processors, a program memory and a working memory are incorporated in the information processor. Application programs such as www browser 14a and an audio playback program 14b are stored in the data storage 14A together with audio files 14c and an FTA (File Allocation Table). The application programs selectively run on the central processing unit.

The communication module 12A is connected to the communication network 40A. While the www browser is running on the central processing unit, the sound reproducer 10A communicates with the music data distribution server computer 30A, and the audio files are downloaded to the data storage 14A.

The other communication module 13A is implemented by an USB interface or a radio transmitter and receiver, and is connected to the automatic player musical instrument 20A through a wired channel or a radio channel. The controller 11A transfers the audio signal and duration data codes in an audio file through the communication module 13A to the automatic player musical instrument 20A.

The control panel 15A includes a computer keyboard and a mouse. A user gives his or her instruction to the sound reproducer 10A through the control panel 15A. The display panel 16A is, by way of example, implemented by a liquid crystal display panel, and controller 11A produces visual images on the display panel 16A. The user has dialogues with the controller 11A through the control panel 15A and display panel 16A.

The sound system 17A includes amplifiers, loud speakers and a headphone. When a user wishes simply to playback a music tune, the audio data codes are transferred from the audio file in the data storage 14A to the sound system 17A, and an audio signal is retrieved from the audio data codes. The audio signal is converted to the electric tones through the amplifiers and loud speakers.

On the other hand, when the user instructs the controller 11A to reproduce music tunes and narration in a program through the automatic player musical instrument 20A, the audio signal is transferred through the communication module 13A to the automatic player musical instrument 20A, and the duration data codes are further transferred to the automatic player musical instrument 20A for the synchronization between playback and conversion from the audio data codes to the audio signal.

Automatic Player Musical Instrument

Figure 24:
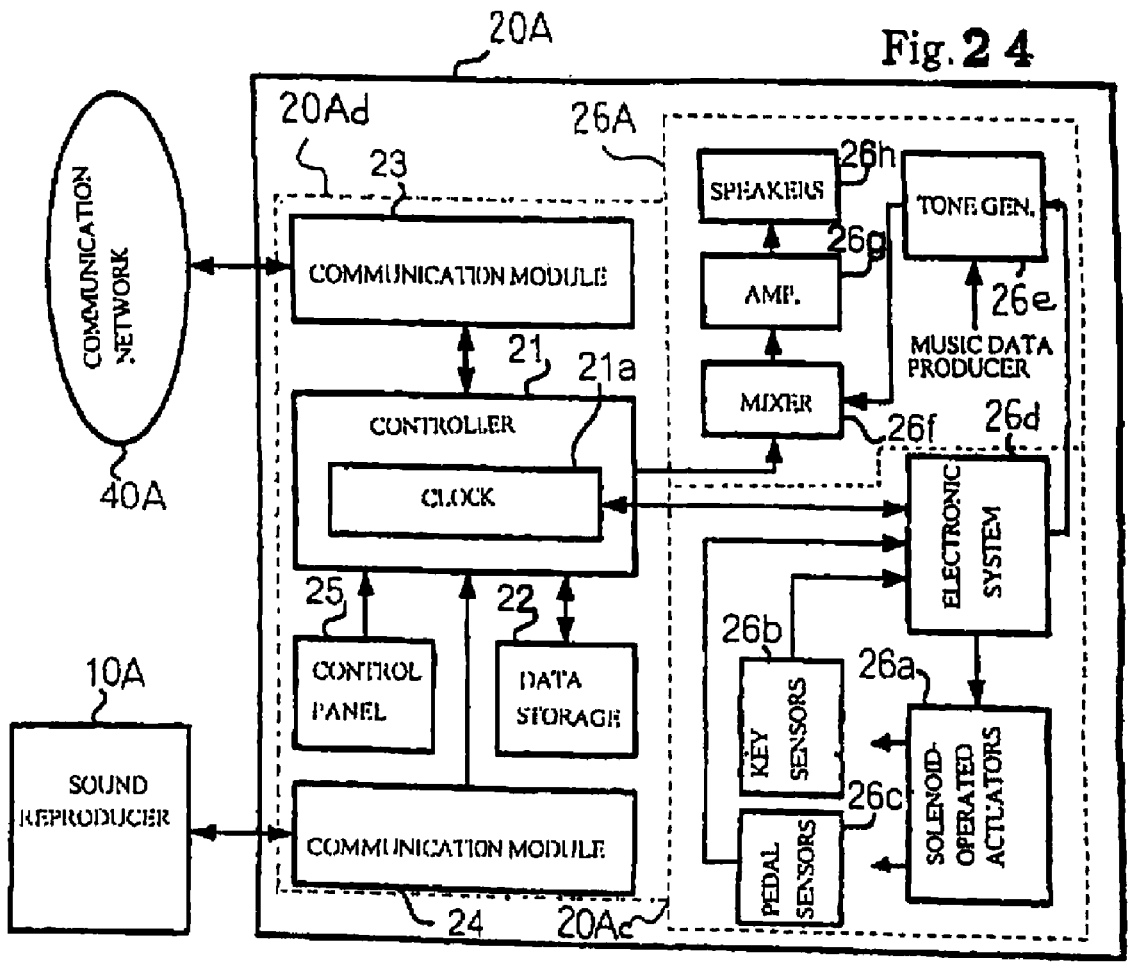
FIG. 24 is a block diagram showing the system configurations of electric and electronic systems incorporated in an automatic player musical instrument of the music reproducing system.

Turning to FIG. 24, the automatic player musical instrument 20A largely comprises an acoustic piano (not shown), a code generating system (not shown), an automatic playing system 20Ac, communication modules 20Ad and an electronic tone producer 26A. Although the acoustic piano and code generating system are omitted from FIG. 24, the structure of acoustic piano and the system configuration of code generating system are similar to those shown in FIG. 2B. The components of automatic playing system 20Ac are similar to those of the automatic playing system 20c. For this reason, the components of automatic playing system 20Ac are labeled with references designating the corresponding components of automatic playing system 20c without detailed description.

Description is hereinafter made on the communication modules 20Ad and electronic tone producer 26A. The communication modules 20Ad include a controller 21, a clock 21a, a data storage 22, a communication module 23, a communication module 24 and a control panel 25. The communication network 40A is connected to the communication module 23, and the automatic player musical instrument 20A communicates with the music data distribution server computer 30A through the communication module 23 under the supervision of the controller 21. The other communication module 24 is implemented by an USB interface or a radio transmitter and receiver, and is connected to the communication module 13A of sound reproducer 10A.

The controller 21 is implemented by an information processor, and a central processing unit, peripheral processors, a program memory and a working memory are incorporated in the information processing system. The information processor is shared between the controller 21 and the electronic system 26d. A computer program for the communication with external apparatus is stored in the program memory, and runs on the central processing unit so as to achieve the communication with the music data distribution server computer 30A, reception of MIDI files from the music data distribution server computer 30A, communication with the sound reproducer 10A and reception of duration data codes and audio signal from the sound reproducer 10A as will be hereinlater described in detail.

The clock 21a is similar in circuit configuration to that of the communication modules 20d, and a lapse of time is measured with the clock 21a. The controller 21 periodically sets the clock 21a with the duration data codes of an audio file so that the lapse of time on the clock 21a is equal to the lapse of time from the audio data code at the head of the audio file. The duration data codes of audio file are supplied from the communication module 13A of sound reproducer 10A to the communication module 24, and are transferred from the communication module 24 to the controller 21.

The data storage 22 is, by way of example, implemented by a hard disk unit. When the program and MIDI files arrive at the communication module 23, the controller 21 transfers the program and MIDI files to the data storage 22, and the program and MIDI files are stored in the data storage 22.

While the automatic playing system 20Ac is performing a music tune on the acoustic piano (not shown) on the basis of the MIDI file already stored in the data storage 22, the controller 21 periodically checks the clock 21a to see whether or not the time period expressed by the duration data code is expired. When the controller 21 finds that the time period is expired, the controller 21 supplies the next event data code or codes to the electronic system 26d, and the electronic system 26d selectively supplies the driving signals to the solenoid-operated actuators 26a so as to depress and release the black keys, white keys and pedal mechanism. Thus, the time intervals are measured with reference to the clock 21a so as to drive the acoustic piano (not shown) well in synchronism with the conversion from the audio data codes in the audio file to the audio signal.

The electronic tone producer 26A includes an electronic tone generator 26e, a mixer 26f, an amplifier 26g and loudspeakers 26h. The electronic tone generator 26e, mixer 26f, amplifier 26g and loudspeakers 26h are same as those of the electronic tone producer 26. For this reason, no further description on those components 26e, 26f, 26g and 26h is not incorporated for the sake of simplicity.

The controller 21 is connected to the mixer 26f, and the audio signal, which is produced from the audio data codes in an audio file, is transferred to the mixer 26f on the condition that neither audio signal nor driving signals is supplied from the tone generator 26e and electronic system 26d to the mixer 26f and solenoid-operated actuators 26a. Thus, the controller 21 interrupts the audio signal during the playback of a music tune on the basis of the music data codes in a MIDI file.

Behavior of Music Reproducing System

Acquisition of Audio File

Figure 25:
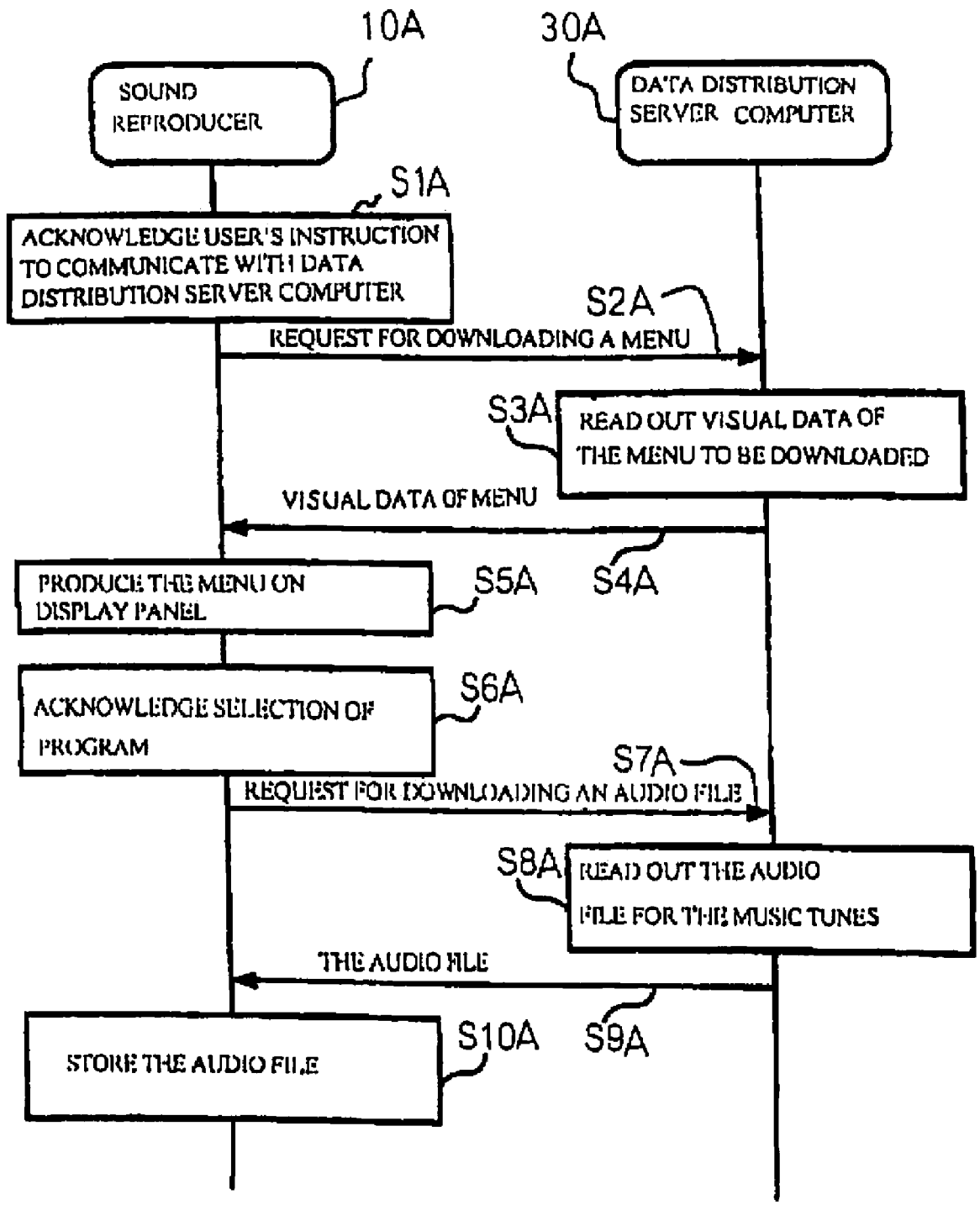
FIG. 25 is a block diagram showing a communication sequence between the sound reproducer and the music data distribution server computer.
Figure 2:
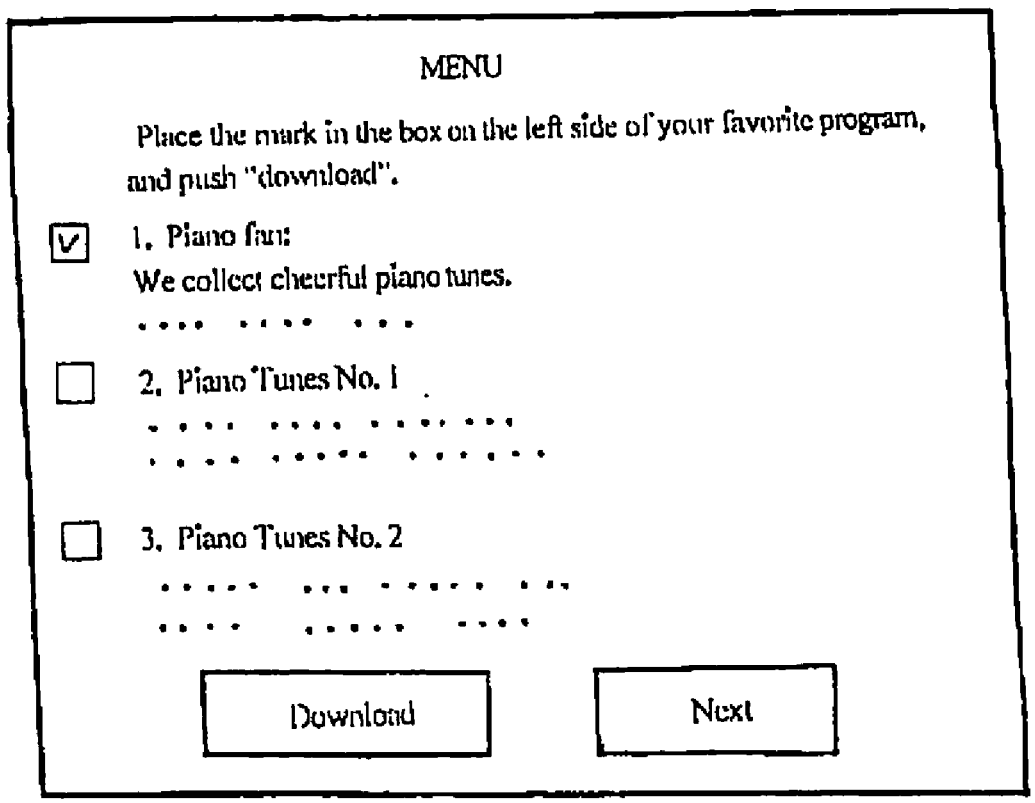
Figure 2:
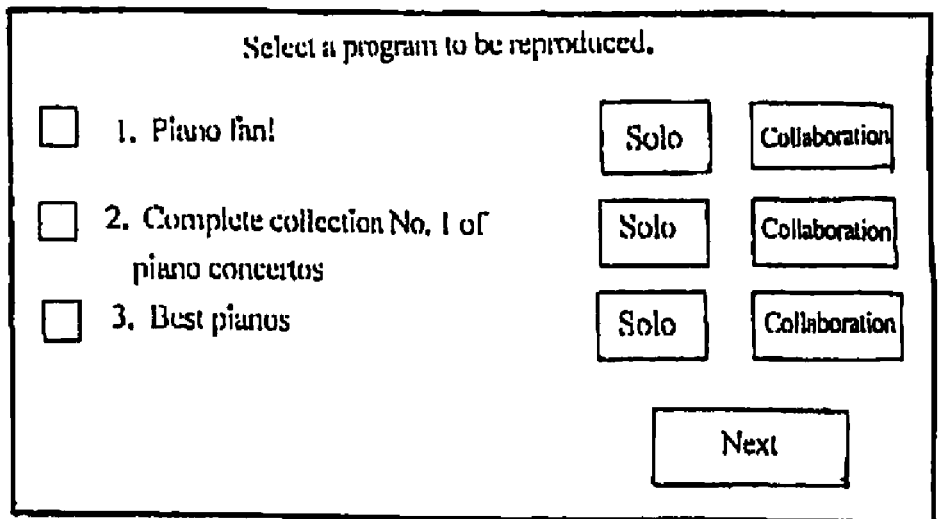

First, the sound reproducer 10A behaves until storing an audio file in the data storage 14A as follows. FIG. 25 shows a communication sequence between the sound reproducer 10A and the music data distribution server computer 30A. The computer program 33Ac for music data distribution has been already running on the controller 31A of the music data distribution server computer 30A.

A user is assumed to wish to download an audio file for a program. The user gives an instruction to communicate with the data distribution server computer 30A to the sound reproducer 10A through the control panel 15A. Then, the controller 11A acknowledges user's instruction as indicated by S1A, and makes the www browser to run on the controller 11A. The controller 11A designates the URL address indicative of the memory location assigned a menu, i.e., a list of programs, and sends a request for downloading the menu, i.e., an http request from the communication module 12A to the communication module 32A of the data distribution server computer 30A as indicated by S2A.

Upon reception of the request, the music data distribution server computer 30A reads out the visual data expressing the menu from the data storage 33A as indicated by S3A, and transmits the visual data as an http response to the sound reproducer 10A as indicated by S4A.

The visual data expressing the menu arrives at the communication module 12A. Then, the controller 11A produces the visual image of menu on the display panel 16A as indicated by S5A. FIG. 26 shows the visual image of menu produced on the display panel 16A. Program names "Piano fan", "Piano tunes No. 1" and "Piano tunes No. 2" take place under a prompt message "Place the mark in the box on the left side of your favorite program, and push "download"". The programs are followed by recommendation to users. Though not shown in the display panel 16A, the URL addresses are added to the program names by means of the anchor tag of HTML.

The user selects a program from the menu, and places the mark in the box on the left side of the program name by means of a pointer. When the user clicks the image of button "Download", the controller 11A acknowledges the user's selection of program as indicated by S6A, and transmits the request, which contains the URL address, from the communication module 12A to the communication module 32A of the music data distribution server computer 30A as by S7A. When the user does not find any favorite program, he or she clicks the image of button "Next". Then, other programs are displayed.

Upon reception of the request, the controller 31A accesses the audio file at the URL address, and reads out the audio file corresponding to the program name from the data storage 33A as indicated by S8A. The controller 31A transmits the audio file from the communication module 32A to the communication module 12A as indicated by S8A.

The audio file arrives at the communication module 12A. Then, the controller 11A transfers the audio file to the data storage 14A, and stores the audio file in the data storage 14A as indicated by S10A. Thus, the download is accomplished.

Playback Only Through the Sound Reproducer

The user is assumed to instruct the controller 11A the playback through the sound system 17A. In other words, any collaboration is not requested. The audio playback program starts to run on the controller 11A. The controller 11A reads out the program names of audio files already stored in the data storage 14A, and produces a list of program name on the display panel 16A together with a prompt message "Select a program to be reproduced" as shown in FIG. 27.

Since three audio files "Piano fan!", "Complete collection No. 1 of piano concertos" and "Best pianos" are stored in the data storage 14A, the program names of audio files are produced on the display panel 16A. Each of the program names is followed by box "Solo" and box "Collaboration". The user moves the cursor into the box "Solo" or "Collaboration", and clicks it. The user is assumed to select the program "Piano fan!", and clicks the box "Solo". The controller 11A starts to transfer the audio data codes in the audio file "Piano fan!" to the sound system 17A, and are converted to the audio signal. As shown in FIG. 21, the audio file "Piano fan!" is labeled with the program identifier "CID 001", and contains "narration 1", "music tune 1", "narration 2", "music tune 2, "music tune 3", "narration 3" and "music tune 4" as shown in FIG. 19. Therefore, the audio signal is converted to the narration and music tunes in the order shown in FIG. 19 regardless of the absence of MIDI file for the music tune 4.

Playback of Program in Collaboration

Figure 28:
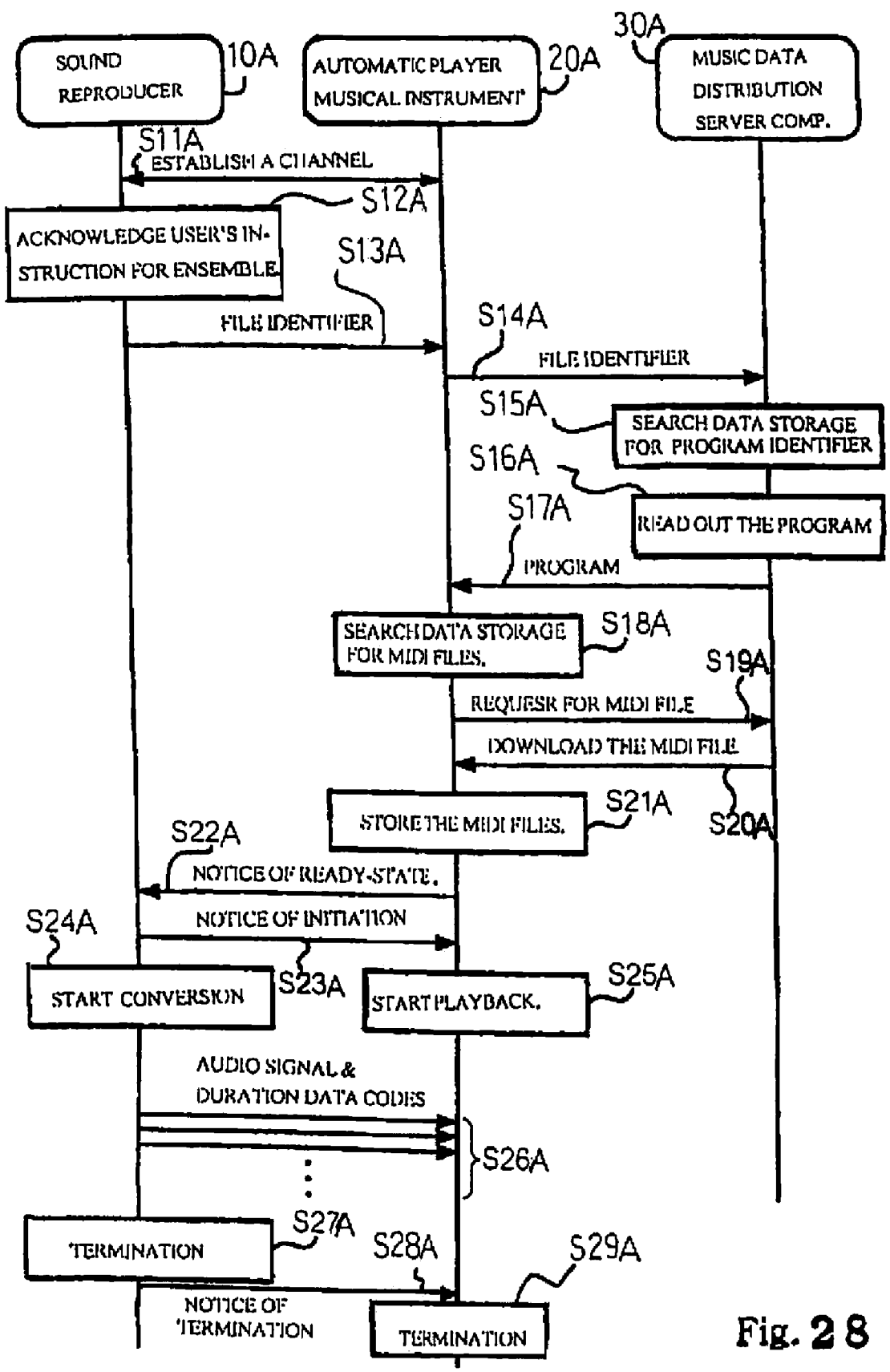
FIG. 28 is a block diagram showing a communication sequence among the sound reproducer, automatic player musical instrument and music data distribution server computer for reproducing a program.

FIG. 28 shows a communication sequence among the sound reproducer 10A, automatic player musical instrument 20A and music data distribution server computer 30A. The user establishes a communication channel between the communication module 13A of sound reproducer 10A and the communication module 24 of automatic player musical instrument 20A as indicated by S11A, and gives the sound reproducer 10A an instruction for playback. The audio playback program starts to run on the controller 11A, and produces the picture shown in FIG. 26 on the display panel 16A.

The user is assumed to click the button of mouse at the box on the left side of "Piano fan!" and the box labeled with "Collaboration". Then, the controller 11A acknowledges the user's instruction for playback as indicated by S12A. The controller 11A accesses the FAT, and reads out the file identifier, which includes the pieces of data information expressing the file name "piano-fan.wab", file size "41.5 megabytes" and creation date "2006/1/25" from the FAT. The controller 11A transmits the file identifier from the communication module 13A to the communication module 24 of the automatic player musical instrument 20A as indicated by S13A.

Upon reception of the file identifier, the controller 21 transmits the file identifier from the communication module 23 to the music data distribution sever computer 30A as indicated by S14A.

When the file identifier arrives at the communication module 32A, the controller 31A accesses the program management table 33a shown in FIG. 21, and determines the program identifier "CID001" as indicated by S15A. The controller 31A searches the data storage 33A for the program labeled with the program identifier "CID001", and reads out the program from the data storage 33A as indicated by S16A. The controller 31A transmits the read-out program 33b from the communication module 32A to the communication module 23 of the automatic player musical instrument 20A as indicated by S17A.

The program 33b arrives at the communication module 23. Then, the controller 21 searches the data storage 22 for the program labeled with the program name to see whether or not the MIDI files of the program 33b have been already stored in the data storage 22 as indicated by S18A. As shown in FIG. 22, the program contains the MIDI files "piano-fan001.mid", "piano-fan002.mid" and "piano-fan003.mid". Only the MIDI files "piano-fan002.mid" and "piano-fan003.mid" are assumed to be stored in the data storage 22. In other words, the MIDI file "piano-fan001.mid" is not found in the data storage 22. The controller 21 transmits a http request, which contains the URL address "http://www.abc.co.jp/CID001/piano-fan001.mid", from the communication module 23 to the communication module 32A as indicated by S19A.

The hppt request is received by the communication module 32A. Then, the controller 31A reads out the MIDI file "piano-fan001.mid", which is labeled with the URL address "http://www.abc.co.jp/CID001/piano-fan001.mid", from the data storage 33A, and transmits the MIDI file from the communication module 32A to the communication module 23 as an http response. Thus, the MIDI files are downloaded to the automatic player musical instrument 20A as indicated by S20A.

The controller 21 may ask the user whether or not the user wish to download the MIDI file "piano-fan001.mid" through the display panel 16A. In this instance, when the user instructs the controller 21 to download the MIDI file "piano-fan001.mid", the controller 21 requests the music data distribution server computer 30A to transmit the MIDI file "piano-fan001.mid". On the other hand, if the user gives the negative answer to the controller 21, the controller 21 does not transmits the request to the music data distribution server computer 30A, and transmits the notice of ready-state to the sound reproducer 10A as will be hereinlater described in conjunction with a job at S22A.

When the MIDI file "piano-fan001.mid" arrives at the communication module 23, the controller 21 transfers the MIDI file from the communication module 23 to the data storage 22, and stores the MIDI files in the data storage 22 as indicated by S21A.

When the MIDI files are prepared in the data storage 22, the controller 21 gets ready to perform the music tunes 1 to 3. The controller 21 sends a notice of ready-state from the communication module 24 to the communication module 13A of sound reproducer 10A as indicated by S22A.

Figure 29:
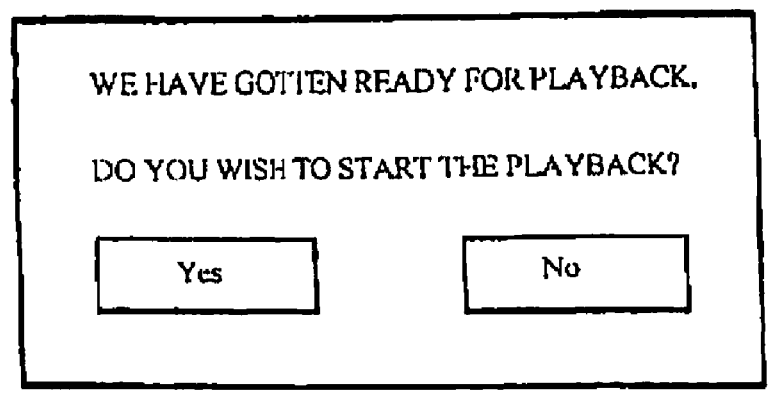
FIG. 29 is a view showing a picture produced on the display panel in order to ask for permission of playback.

Upon reception of the notice of ready-state, the controller 11A produces a picture shown in FIG. 29 on the display panel 16A so as to inform the user of the ready-state, and asks for permission. The user is assumed to click the button of mouse at box "Yes". Then, the controller 11A sends a notice of initiation from the communication module 13A to the communication module 24 as indicated by S23S.

The sound reproducer 10 starts the conversion from the audio data codes to the audio signal as indicated by S24A. The automatic player musical instrument 20A starts the playback on the basis of the music data codes of MIDI file as indicated by S25A, and starts to measure the lapse of time with the clock 21a. The audio signal and duration data codes are transmitted from the communication module 13A to the communication module 24 as indicated by S26A.

Figure 30:
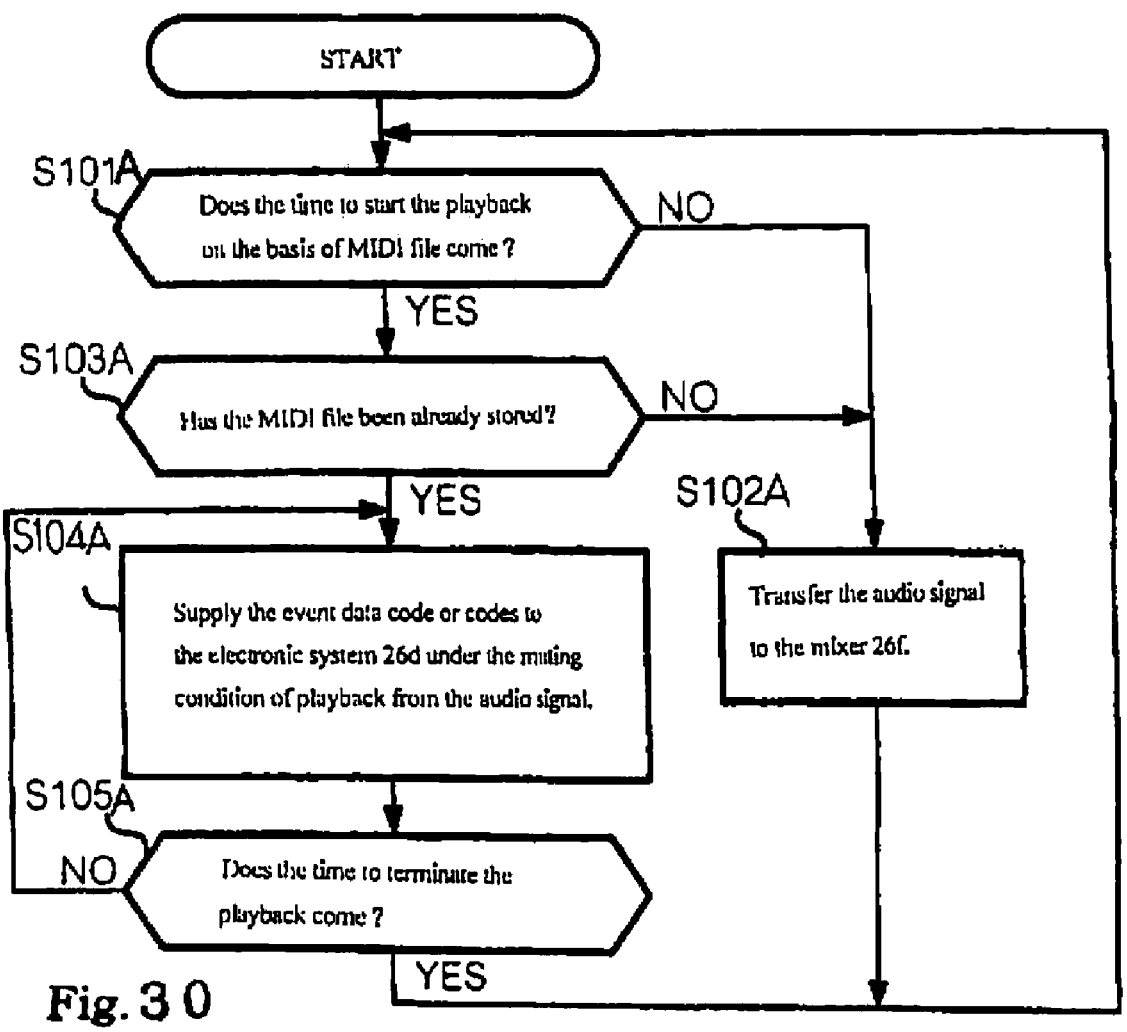
FIG. 30 is a flowchart showing a job sequence for the controller of automatic player musical instrument.

FIG. 30 shows a job sequence realized through execution of the computer program installed in the controller 21 and electronic system 26d. As shown in FIG. 22, the program contains the playback schedule. The first music tune starts at 1' 16", and is terminated at 5' 48". The second music tune starts at 6' 29", and is terminated at 14' 00". "Narration 1" is to be reproduced before the first music tune, and "narration 2" is inserted between the first music tune and the second music tune as shown in FIG. 19.

The controller 21 checks the clock 21a to see whether or not the time to playback the first music tune comes as by step S101A. The answer at step S101 is given negative "No" from the initiation of playback to 1' 16", and the controller 21 transfers the audio signal from the communication module 24 to the mixer 26f as by step S102A. For this reason, the narration 1 is reproduced.

The answer at step S101A is changed to affirmative "Yes" at 1' 16". Then, the controller 21 checks the data storage 22 to see whether or not the MIDI file has been prepared for the music tune to be reproduced as by step S103A. The MIDI file for the music tune 1 has bee downloaded from the music data distribution server computer 30A as indicated by S20A in FIG. 28. For this reason, the answer at step S103A is given affirmative "Yes". With the positive answer "Yes" at step S103A, the controller 21 supplies the first key event data code or codes from the data storage 22 to the electronic system 26d, and mutes the electric tones to be produced from the audio signal as by step S104A. Thus, the controller 21 blocks the mixer 26f from the audio signal converted from the audio data codes. Any electric tone is not reproduced from the audio signal.

The user has two options, i.e., the automatic playing system 20Ac and electronic tone producer 26A. If the user selects the automatic playing system 20Ac, the black keys, white keys and pedal mechanism are selectively driven by the solenoid-operated actuators 26a, and the acoustic piano tones are produced through the acoustic piano (not shown). On the other hand, when the user selects the electronic tone producer 26A, the music data code or codes are transferred to the electronic tone generator 26e. The audio signal is produced on the basis of the music data code or codes, and is supplied through the mixer 26f and amplifier 26g to the loudspeakers 26h. The audio signal is converted to the electric tones along the music passage of the first music tune.

Subsequently, the controller 21 checks the clock 21a to see whether or not the time to terminate the playback comes as by step S105A. The answer at step S105A is given negative "No" until 5' 48", and the controller returns to step S104A. The controller 21 checks the clock 21a to see whether or not the time period between the key event and the next key event is expired. While the answer is being given negative "No", the controller 21 continuously sets the clock 21a with the duration data codes of the audio file. When the time period is expired, the controller 21 transfers the next event data code or codes to the electronic system 26d for producing the acoustic piano tone or electronic tone.

The controller 21 reiterates the loop consisting of steps S104A to step S105A until 5' 48". When the answer at step S105A is changed to affirmative "Yes", the controller 21 restarts to supply the audio signal to the mixer 26f, and the narration 2 is reproduced. The audio signal is changed to the supply of event data codes at 6' 29", and the second music tune is reproduced through the automatic player musical instrument 20 until 14' 00". The third music tune starts at 14' 13" without any narration, and is terminated at 24' 13". The third music tune is followed by the narration 3 reproduced from the audio signal.

When the clock 21a is indicative of 25' 20", the controller 21 checks the data storage 22 to see whether or not the MIDI file has been prepared for the fourth music tune at S103A. As described hereinbefore, the music data distribution server computer 30A does not have the MIDI file "piano-fan004.mid" in the data storage 33A, and, accordingly, the MIDI file "piano-fan004.mid" is not prepared for the playback. In this situation, the answer at step S103A is given negative "No", and the controller 21 supplies the audio signal to the mixer 26f. As a result, the electric tones are reproduced from the audio signal as similar to the narration 1, 2 and 3.

When all the contents of program are reproduced, the sound reproducer 10A terminates the data processing as indicated by S27A, and sends a notice of termination to the automatic playing musical instrument 20A as indicated by S28A. Upon reception of the notice of termination, the automatic playing musical instrument 20A also terminates the data processing as indicated by S29A.

As will be understood from the foregoing description, the programs are reproduced in collaboration between the sound reproducer 10A and the automatic player musical instrument 20A as similar to those in the description on the first embodiment. The audience feels the reproduction of program in collaboration between the sound reproducer 10A and automatic player musical instrument 20A close to the performance in a live concert.

Moreover, even if a MIDI file or MIDI files in the program are not prepared for the playback through the automatic player musical instrument 20A, the music tune or tunes are reproduced from the audio data codes in the audio file instead of the music data codes in the MIDI file. Thus, all the contents of program are reproduced regardless of the absence of a MIDI file or files expressing a music tune or tunes in the program.

Modifications of Second Embodiment

In the following description on the modifications, system components of the modifications are labeled with references designating the corresponding system components of music reproducing system 100A without detailed description for the sake of avoiding repetition.

First Modification

The first modification of music reproducing system 100A is different from the second embodiment in that only the start time is specified in the program 33Ab. This is because of the fact that the time period for the playback, i.e., the amount of music data is defined in the MIDI file. In other words, the termination time is determinable through the addition of the playback time period to the start time.

Second Modification

The second modification of music reproducing system 100A is different from the second embodiment in that the electric voice and electric tones are produced through the sound system 17A. Although the audio signal is not supplied to the automatic player musical instrument 20A, the duration time codes in the audio file are transmitted from the communication module 13A to the communication module 24. The controller 21 makes the data transfer to the electronic system 26d synchronized with the conversion of audio data codes to the audio signal as described hereinbefore.

The audio signal may be converted to the electric tones and electric voice through both of the sound system 17A and electronic tone producer 26A.

Third Modification

The third modification of music reproducing system 100A is different from the second embodiment in that the music data codes of a MIDI file expresses tones in one of the plural parts of a piece of music tune expressed by the audio data codes in an audio file. In detail, the music tune is assumed to be constituted by a vocal part, a guitar part and a piano part. The audio data codes of the MIDI file express only the tones of piano part. While the piano part is being reproduced through the automatic player musical instrument 20A, the electric tones of piano part are muted, and the audio signal expresses the other parts, i.e., the vocal part and guitar part. The playback through the automatic player piano 20A is synchronized with the conversion from the audio data codes to the audio signal so that the music tune is reproduced in good ensemble between the sound reproducer 10A and the automatic player musical instrument 20A.

Fourth Modification

The fourth modification of music reproducing system 100A is different from the second embodiment in that the sound reproducer 10A stops the audio signal.

In detail, when controller 21 finds that the internal clock 21a points the start time to reproduce the music tune on the basis of the music data codes, the controller 21 starts to transmit the request for muting or minimizing the volume to zero from the communication module 24 to the communication module 13A, and starts to transfer the music data codes from the data storage 22 to the electronic system 26d. The controller 21 continuously transmits the request to the sound reproducer 10A during the playback on the basis of the music data codes, and the sound reproducer 10A does not permit the audio signal to arrive the communication module 13. Otherwise, the sound reproducer minimizes the volume to zero. As a result, the electric tones are not radiated from the loudspeakers 26h.

Otherwise, the controller 21 causes the program 33Ab to be transmitted from the communication module 24 to the communication module 13A, and the program 33Ab is stored in the data storage 14A. While the contents of program 33Ab are sequentially being reproduced, the controller 11A checks the playback schedule to see whether or not a music tune is to be reproduced through the automatic player musical instrument 20A. When the start time comes, the controller 11A blocks the communication module 13A from the audio signal, or minimizes the volume to zero. The controller 11A keeps the muting or minimization until the termination time.

Fifth Modification

The fifth modification of music reproducing system 100A is different from the second embodiment in that the controller 11A checks the device identification code to see whether or not the automatic player musical instrument 20A is connected to the communication module 13A. The device identification codes are exchanged between the sound reproducer 10A and the external device when the external device is connected to the communication module 13A. When the controller 11A confirms that the automatic player musical instrument 20A is connected to the communication module 13A, the controller 11A does not transmit the audio signal to the automatic player musical instrument 20A during the playback on the basis of the MIDI files. On the other hand, if another sort of device is connected to the communication module 13A, the controller 11A permits the audio signal to be transmitted to the external device.

Sixth Modification

The sixth modification of music reproducing system 100A is different from the second embodiment in that the controller 21 keeps the electronic tone producer 26A or sound system 17A silent prior to the playback on the basis of the MIDI files. For example, the controller 21 prohibits the electronic tone producer 26A or sound system 17A from conversion to the electric voice or electric sound in a short time period before entry into the playback on the basis of the MIDI files. The short time period may be 0.5 second. Even if the time period for reproducing the audio signal from the audio data codes is partially overlapped with the time period for the playback on the basis of the MIDI file, the electronic tones or acoustic piano tones are not produced concurrently with the electric voice or electric sound in so far as the overlapped time period is fallen within the short time period.

Seventh Modification

The seventh modification is different from the music reproducing system 100A in that the playback on the basis of the MIDI file is made synchronous with the conversion from the audio data codes to the audio signal through the synchronization technique disclosed in Japan Patent Application laid-open No. 2003-271138 or the synchronization technique disclosed in Japan Patent Application laid-open No. 2006-47761.

The synchronization technique disclosed in the former laid-open is that unique peaks of an audio signal are correlated with music data codes in a table. The controller checks the table to see whether or not the music data codes are processed concurrently with the unique peaks. When the answer is given negative, the controller advances the internal clock or puts the internal clock slow. Since the time intervals between the key events are measured with the internal clock, the two apparatus are synchronized with one another.

The synchronization technique disclosed in the latter laid-open is that the synchronization control is assigned to one of the plural channels between two apparatus. While the audio data codes are being converted to the audio signal, the controller of sound reproducer assigns the pieces of audio data to the channel L and LTC, which is a time code defined in the SMTPE (Society of Motion Picture and Television Engineers) and contains the pieces of time data and file identifier, to the channel R, and transmits the pieces of audio data and LTC to the automatic player musical instrument through the channels L and R. The controller of automatic player musical instrument makes the internal clock set with the pieces of time data contained in the LTC.

Eighth Modification

The eighth modification of the music reproducing system 100A is different from the second embodiment in the communication from S14 to S21. In the second embodiment, only the MIDI files not found in the data storage 22 are downloaded from the music data distribution server computer 30A. This feature is desirable from the viewpoint of reduction of load in downloading work. On the contrary, when the automatic player musical instrument 20A transmits the file identifier to the music data distribution server computer 30A, all of the MIDI music data files and program are concurrently downloaded from the music data distribution server computer 30A to the automatic player musical instrument 20A. Thus, the communication is made simplified rather than the communication in the first embodiment.

Ninth Modification

Figure 31:
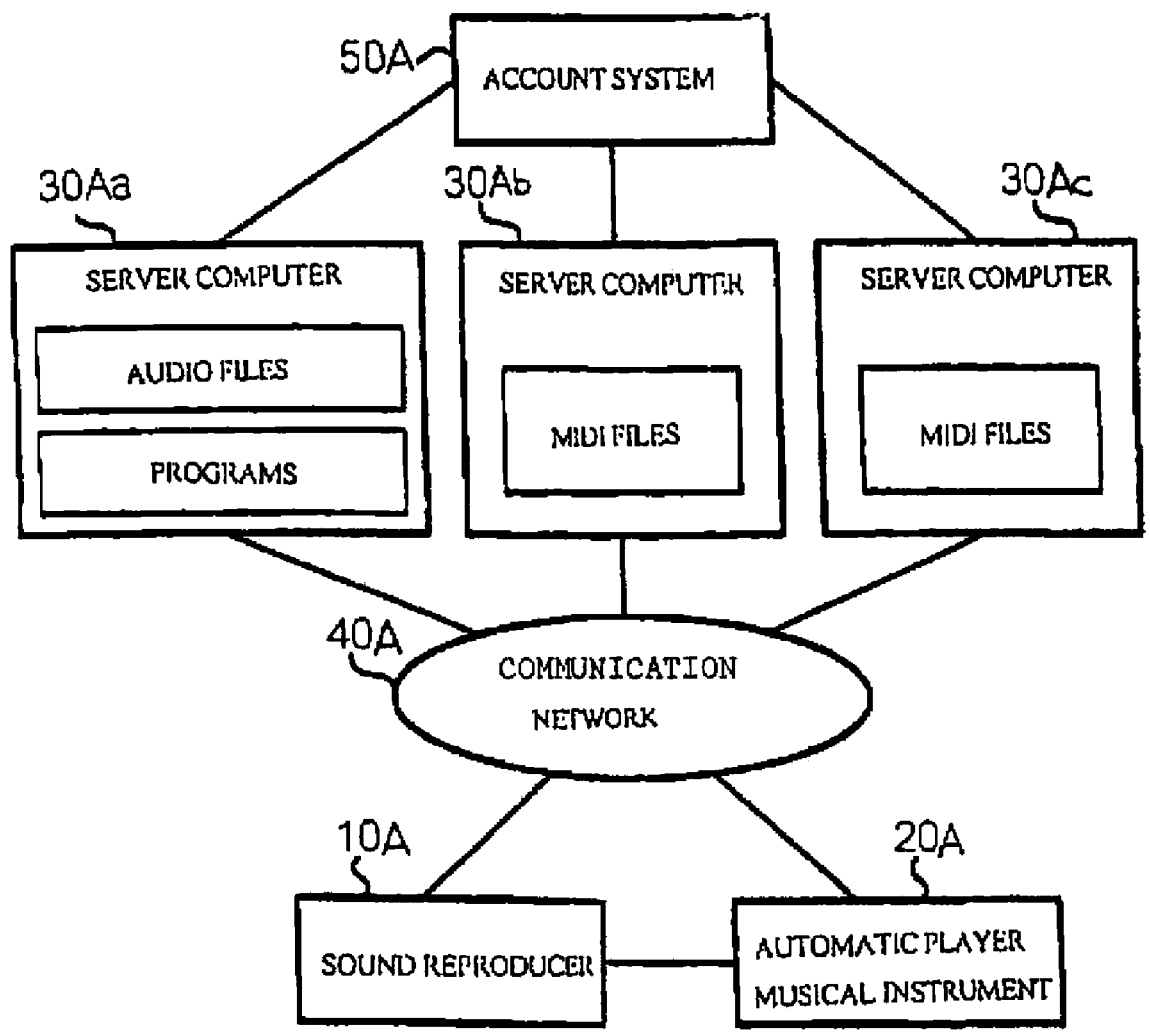
FIG. 31 is a block diagram showing the system configuration of a modification of the music reproducing system of the present invention.

FIG. 31 illustrates the system configuration of the ninth modification of the second embodiment. Although the audio files, programs and MIDI files are stored in the single music data distribution server computer 30A in the second embodiment, the audio files and programs are stored in a server computer 30Aa different from the server computers 30Ab and 30Ac where the MIDI files are stored.

When a user instructs the sound producer 10A to reproduce a program in collaboration with the automatic player musical instrument 20A, the program and audio files are firstly downloaded from the server computer 30Aa to the sound reproducer 10A, and makes the automatic player musical instrument 20A to transmit a request for downloading the MIDI files at the URL addresses in the program from the server computer 30Ab and/or 30Ac to the automatic player musical instrument 20A.

It is not easy for the service provider to prepare a huge number of audio files and a huge number of MIDI file in the server computer. In the ninth modification, plural service providers bear the huge number of files in the plural server computers 30Aa, 30Ab and 30Ac so that the music reproducing system is easily established in the network. Thus, the service providers can offer a large number of programs to users through the ninth modification of the music reproducing system.

The sound reproducer 10A and automatic player musical instrument 20A may have a unitary structure.

Tenth Modification

Tenth modification of the music reproducing system 100A has an accounting system 50A. The accounting system 50A is, by way of example, implemented by various accounting networks such as the Japan Bank Network and/or CAFIS (Credit And Finance Information System), and is connected to the server computers 30Aa, 30Ab and 30Ac. When a user downloads the programs, audio files and MIDI files, the service providers write out bills, and settle accounts with the users through the accounting system 50A.

In detail, the audio files and MIDI files are priced, and are accompanied with price lists in the data storages 33A of the server computers 30Aa, 30Ab and 30Ac. A user list is further stored in the data storages 33A, and the users have been registered in the user list. The name, address, birthday, user identifier, bank account number and credit card number are written in the user list for each of the registered users.

When a user requests the server computer 3OAa, 30Ab or 30Ac for the download of an audio file, a program or a MIDI file, the controller 31A requests the user to send the user identifier to the server computer 30Aa, 30Ab or 30Ac, and transmits the program or file to the sound reproducer or automatic player musical instrument 20A after the confirmation of the user.

Upon completion of the download, the controller 31A accesses the price list so as to write out a bill, and sends the bill to the account system 50A for the settlement. If the user requests the service providers to settle the accounts through the credit card system, the service providers put the bill in the credit account. Thus, the bills are automatically settled at the user's account number through the accounting system 50A.

Eleventh Modification

The eleventh modification of music reproducing system 100A is different from the second embodiment in that the automatic player musical instrument 20A can reproduce music tunes through in-stream playback on the basis of MIDI files. In the in-stream playback, the music data codes are transmitted from the music data distribution server computer 30A through the communication network 40A, and the music tune is reproduced on the basis of the music data codes in a real time fashion. Otherwise, the MIDI file is stored in the random access memory, and is erased after the playback. For this reason, it is difficult to reuse the music data codes after the in-stream playback.

A user can choose the playback method between the standard playback after the download and the in-stream playback. If the user chooses the standard playback, the automatic player musical instrument 20A behaves as similar to that shown in FIG. 28. On the other hand, when the user chooses the in-stream playback, the music data codes are transmitted from the music data distribution server computer 30A to automatic player musical instrument 20A, and are temporarily stored in the random access memory of the controller 21. The music data codes are timely transferred to the electronic system 26d so as to produce the acoustic piano tones or electronic tones on the basis of the event data codes.

In case where the fee-charging download is employed in the eleventh modification, the in-stream playback is beneficial to users, because the price of MIDI files for the in-stream playback is lower than the price of MIDI files for the standard playback. Users may choose the standard playback for music tunes out of the copyright, and choose the in-stream playback for the copyrighted music tunes.

In order to respond to user's choice, the MIDI files are broken down into two groups, the copyrighted music tunes, i.e., the first group and the music tunes out of the copyright, i.e., the second group, and a tag indicative of the first group is added to the MIDI files in the first group, and another tag indicative of the second group is added to the MIDI files in the second group.

A user is assumed to reproduce the contents of a program. The program contains copyrighted music tunes and music tunes out of the copyright. In this situation, the MIDI files in the second group are downloaded into the data storage 22. However, the MIDI files in the first groups are not downloaded.

While the automatic player music instrument 20A is collaborating with the sound reproducer 10A, the music tunes out of the copyright are reproduced on the basis of the music data codes in the MIDI files stored in the data storage 22 between the start time and the termination time designated in the program, and the controller 21 requests the music data distribution server computer 30A to transmit the music data codes expressing the copyrighted music tunes to the communication module 23 before the start time so as to permit the electronic system 26d to start the playback at the start time. Upon completion of the reproduction of contents of program, the music data codes in the random access memory are erased.

Thus, the service provider can restrict the reuse of the MIDI file through the in-stream playback, and offer the program contents at low price.

Twelfth Modification

The twelfth modification of music reproducing system 100A is different from the second embodiment in that only one of the sound reproducer 10A and automatic player musical instrument 20A has the communication capability with the music data distribution server computer 30A.

Only the sound reproducer 10A is assumed to have the communication capability. The automatic player musical instrument 20A acquires a program and MIDI files from the music data distribution server computer 30A through the sound reproducer 10A.

In detail, the automatic player musical instrument 20A requests the sound reproducer 10A for the acquisition of program and MIDI files through the communication channel 40c, and the program and MIDI files are downloaded from the communication module 32A to the communication module 12A. The controller 11A transfers the program and MIDI files from the communication module 13A to the communication module 24 through the communication channel 40c.

Thus, the automatic player musical instrument 20A or sound reproducer 10A of the twelfth modification is simpler than that of the music reproducing system 100A.

Thirteenth Modification

The thirteenth modification of music reproducing system 100A is different from the second embodiment in that either file size or creation date is omitted from the file identifier. The data structure of file identifier shown in FIG. 21 does not set any limit to the technical scope of the present invention. A serial number may serve as another file identifier.

Fourteenth Modification

The fourteenth modification of music reproducing system 100A is different from the second embodiment in that either audio files, program or MIDI files are read out from a portable information storage medium such as, for example, a compact disc, a flexible disc, an MD, an audio cassette tape or a record disc. The other materials are downloaded from the music data distribution server computer 30A through the communication network 40A.

Fifteenth Modification

The fifteenth modification of music reproducing system 100A is different from the second embodiment in that the MIDI file or files are downloaded after the initiation of reproduction of a program. Of course, each MIDI file is required for the automatic player musical instrument 20A before the start time.

The audio file shown in FIG. 19 does not set any limit to the technical scope of the present invention. An audio file may contain only music tunes.

Sixteenth Modification

The sixteenth modification of music reproducing system 100A is different from the second embodiment in that another sort of electronic device serves as the sound reproducer 10A. The personal computer may be replaced with a mobile telephone, a PHS (Personal Handy phone System) terminal, a PDA (Personal Digital Assistants) or a portable music player.

The computer programs for the controllers 11A, 21 and 31A may be offered to users independently of the hardware. One or two of the computer programs or all of the computer programs may be stored in a magnetic tape cassette, a magnetic disc, a flexible disc, an optical information storage medium, an opto-magnetic information storage medium, a compact disc, a DVD disc or a RAM stick.

Third Embodiment

In the first and second embodiments, the playback follows the programs already prepared for the sound reproducer 10/10A and automatic player musical instrument 20/20A. A program producer is incorporated in the music reproducing system of the third embodiment, and users prepare programs through the program producer.

Figure 32:
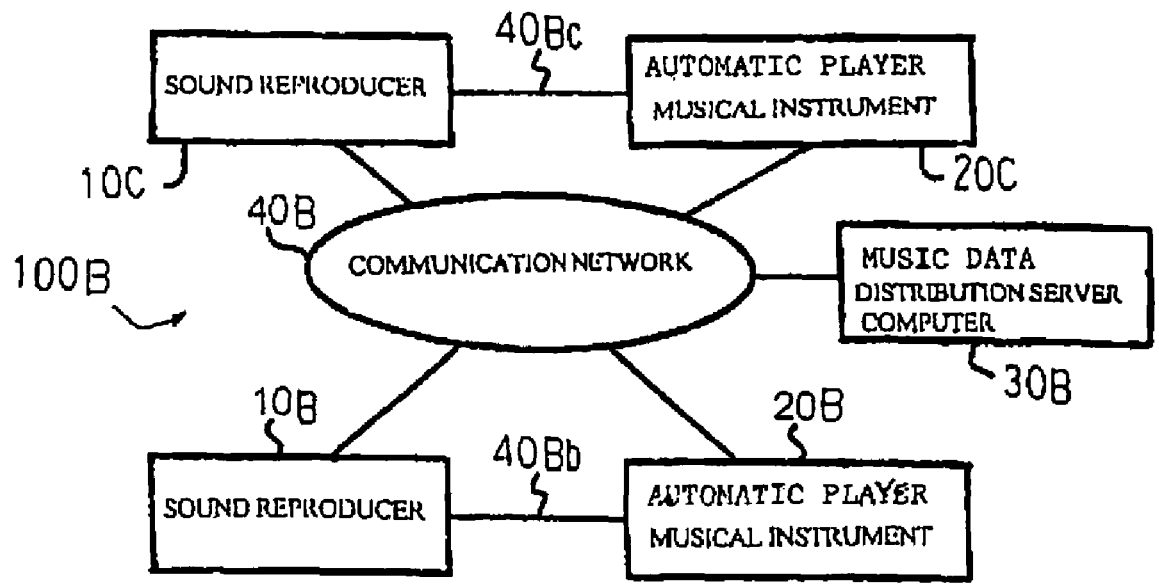
FIG. 32 is a block diagram showing the system configuration of yet another music reproducing system of the present invention.

Referring first to FIG. 32 of the drawings, yet another music reproducing system 100B embodying the present invention largely comprises sound reproducers 10B and 10C, automatic player musical instruments 20B and 20C, a music data distribution server computer 30B and a communication network 40B. Although two sound reproducers 10B/10C and two automatic player musical instruments 20B/20C are shown in FIG. 32, other sound reproducers and other automatic player musical instruments are further incorporated in the music reproducing system 100B.

The sound reproducers 10B and 10C, automatic player musical instruments 20B and 20C and music data distribution server computer 30B are connected to the communication network 40B through wire communication channels or a radio communication channels, and communicate with one another through the communication network 40B. The sound reproducers 10B and 10C are respectively associated with the automatic player musical instruments 20B and 20C, and are further connected to the automatic player musical instruments 20B and 20C through wire communication channel or radio communication channels 40Bb and 40Bc. Thus, the sound reproducers 10B and 10C are directly communicable with the automatic player musical instruments 20B and 20C through the wire communication channel/radio communication channels 40Bb and 40Bc, respectively. In this instance, the sound reproducers 10B/10C collaborate with the associated automatic player musical instruments 20B/20C for reproducing programs.

Each of the sound reproducers 10B and 10C is, by way of example, implemented by a personal computer system, and an audio playback computer program is installed in the personal computer system so as to convert pieces of audio data or audio data codes to electric tones, electric voice and/or electric sound. The audio data codes express discrete values on the waveform of an audio signal representative of the tones, voice and/or sound.

An editorial picture is downloaded from the music data distribution server computer 30B to the sound producer 10B/10C for preparing new programs. While the editorial picture is being reproduced, users prepare new programs such as new music programs as will be hereinlater described in detail. The new programs are uploaded to the music data distribution server computer 30B through the communication network 40B.

Each of the automatic player musical instruments 20B and 20C is a combination between an acoustic piano an automatic playing system, and the automatic playing system performs a music tune on the acoustic piano without any fingering of a human player. As will be described hereinlater, the automatic player musical instrument 20B/20C further includes an electronic tone producer, and electronic tones are produced on the basis of the music data codes by means of the electronic tone producer. Thus, users have a choice between the acoustic piano tones and the electronic tones.

The music data distribution server computer 30B is put on the WWW together with the sound reproducers 10B/10C and automatic player musical instruments 20B/20C. Thus, the music data distribution server computer 30B, sound reproducers 10B/10C and automatic player musical instruments 20B/20C form a client-server system through the communication network 40B.

The communication network 40B includes various sorts of networks such as the internet, telephone networks and so forth. The MIDI files, programs and audio files are distributed from the music data distribution server computer 30B to the sound reproducers 10B/10C and automatic player musical instruments 20B/20C through the communication network 40B.

The programs are prepared for reproduction through the sound reproducer 10B/10C and associated automatic player musical instrument 20B/20C in collaboration with one another. At least one music tune is contained in the program together with narration and/or talk, and is expressed by the audio data codes in an audio file as well as the music data codes in a MIDI file.

Music Data Distribution Server Computer

Figure 33:
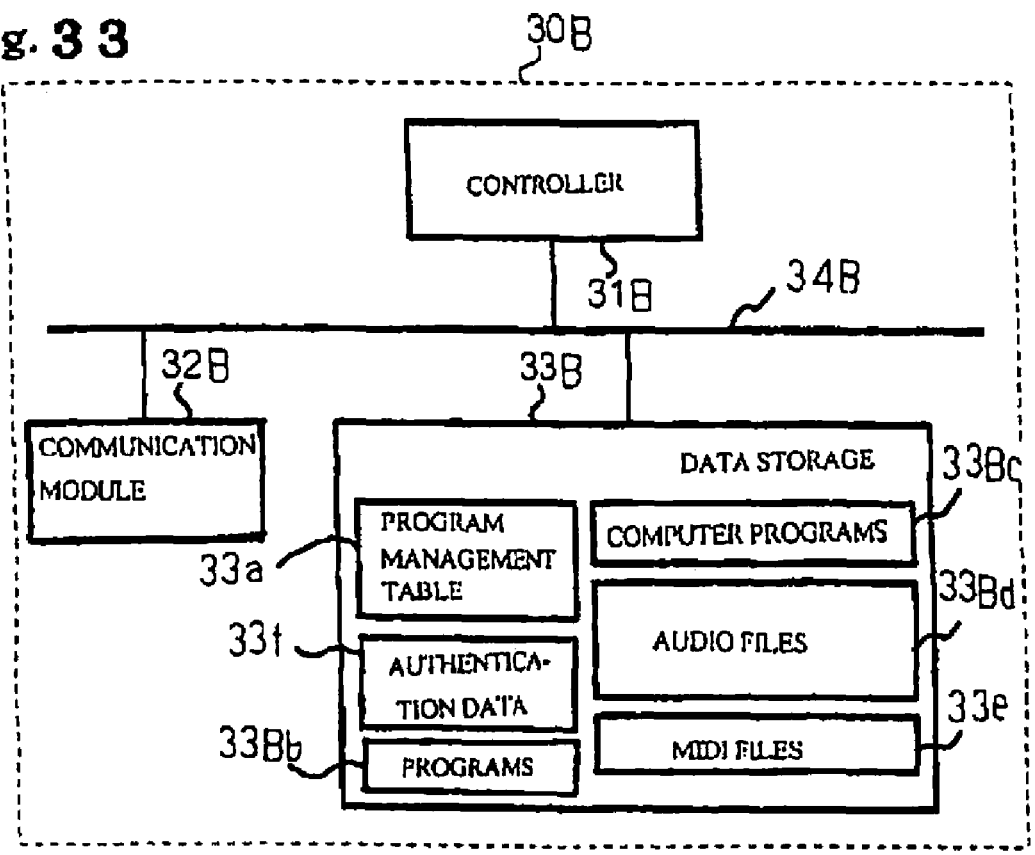
FIG. 33 is a block diagram showing the circuit configuration of a music data distribution server computer incorporated in the music reproducing system.

FIG. 33 illustrates the circuit configuration of the data distribution server computer 30B. The data distribution server computer 30B includes a controller 31B, a communication module 32B and a data storage 33B, and the controller 31B, communication module 32B and data storage 33B are connected to one another through an internal bus system 34B.

Though not shown in the drawings, the controller 31B includes a central processing unit, peripheral processors, a program memory and a working memory, and computer programs 33Bc selectively run on the central processing unit of controller 31B so as to achieve various tasks such as a data management, analysis of requests of clients, a file transmission, completion of new programs and so forth. The communication module 32B is connected to the communication network 40B. The client requests are received at the communication module 32B, and programs, audio files and MIDI files are transmitted from the communication module 32B to the sound reproducers 10B/10C and automatic player musical instruments 20B/20C.

The data storage 33B is, by way of example, implemented by a hard disk unit or hard disk units, and the storage space in the hard disk or disks are assigned to a program management table 33a, programs 33Bb, computer programs 33Bc, audio files 33Bd, MIDI files 33e and authentication data. An editorial computer program and a communication computer program are examples of the computer programs 33Bc, and composite audio files and individual audio files are referred to as "audio files 33Bd". Each of the individual audio files expresses a music tune. On the other hand, each of the composite audio files contains plural parts expressing silence and narration, talk and/or sound as will be described hereinlater in detail. The contents of composite audio file and associated MIDI files are reproduced in collaboration between the sound reproducer 10B/10C and the associated automatic player musical instrument 20B/20C.

Each piece of authentication data expresses a user who has already gotten an onerous contract with the service provider, and the service provider assigns a character string to the user. An identification code and a password may be expressed by the character string, and the user has determined the password. As will be hereinlater described, certain composite audio files and certain MIDI files are copyrighted, and such copyrighted works are distributed to the users under the onerous contract.

Relation between file identifiers and composite audio files is defined in the program management table 33a, and relation between the contents of a composite audio file and playback schedule is defiled in the program.

Figure 34:
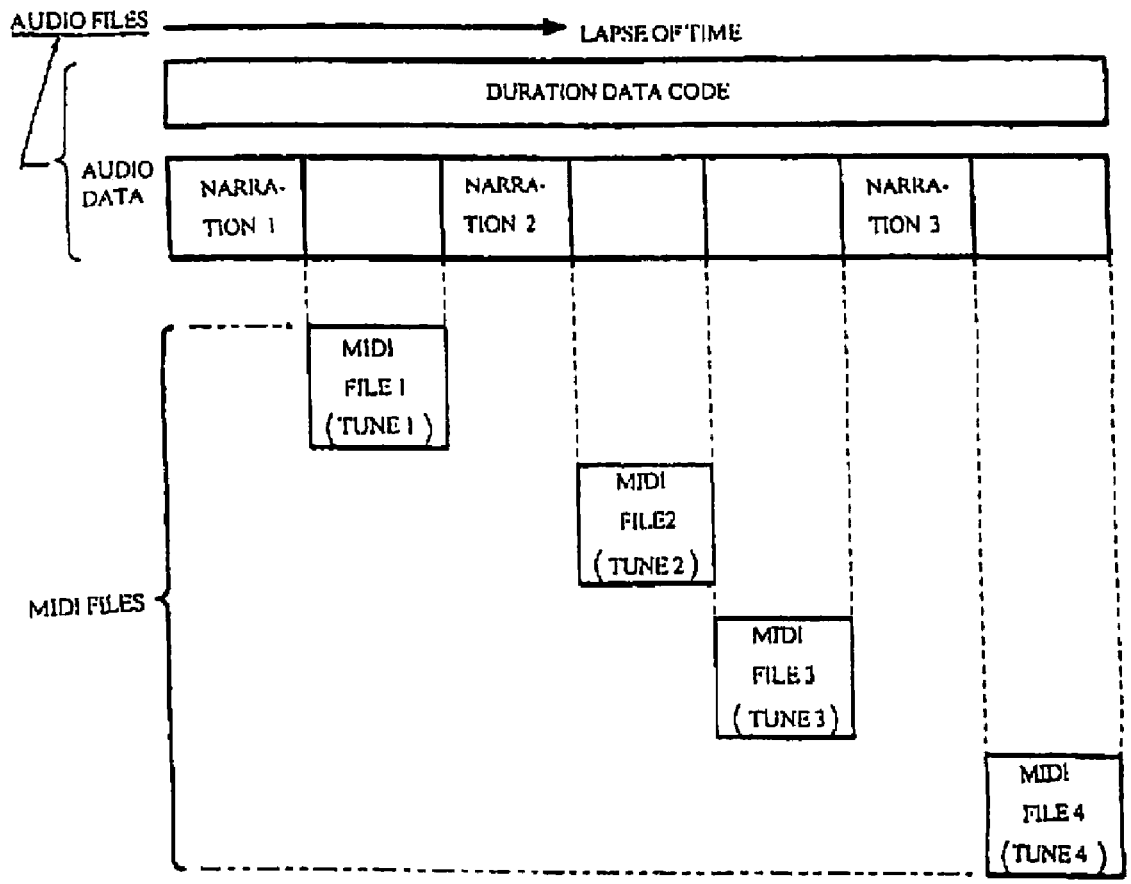
FIG. 34 is a block diagram showing contents of a composite audio file and relation between the composite audio file and MIDI files.

FIG. 34 shows the data structure of a composite audio file and relation between the composite audio file and the MIDI files to be reproduced in a program. The composite audio file contains the audio data codes and duration data codes. The duration data codes express a lapse of time from the first audio data code at the head of the composite audio file. On the other hand, discrete values are sampled from the waveform of an analog audio signal at 44.1 kilo-hertz, and are stored in the audio data codes.

The series of audio data codes in the composite audio file expresses plural contents such as, for example, narration and silence. A narrator may give his or her impression of music tunes 1, 2, 3 and 4 before the playback of music tunes as "narration 1", "narration 2" and "narration 3". The narration is followed by the playback on the basis of MIDI files expressing the music tunes. The narration is split into three parts "narration 1", "narration 2" and "narration 3", and the audio data codes expressing the silence are inserted between the narration 1 and the narration 2, between the narration 2 and the narration 3 and after the narration 3. While the music tunes are being reproduced, the audio data codes express the silence.

A user is assumed to instruct the sound reproducer 10B/10C and associated automatic player musical instrument 20B/20C to reproduce the program shown in FIG. 34. The audio data codes are continuously converted to the audio signal through the sound reproducer 10B/10C, and the music tunes 1, 2, 3 and 4 are reproduced on the basis of the MIDI files 1, 2, 3 and 4 through the automatic player musical instrument 20B/20C between the narration 1 and the narration 2, between the narration 2 and the narration 3 and after the narration 3. As a result, the contents of program are reproduced in the order of the narration 1, music tune 1, narration 2, music tunes 2 and 3, narration 3 and music tune 4.

In order to make the reproduction of narration synchronized with the playback of music tunes 1, 2, 3 and 4, the duration data codes are supplied from the sound reproducer 10B/10C to the associated automatic player musical instrument 20B/20C as will be described hereinlater in detail.

Figure 35:
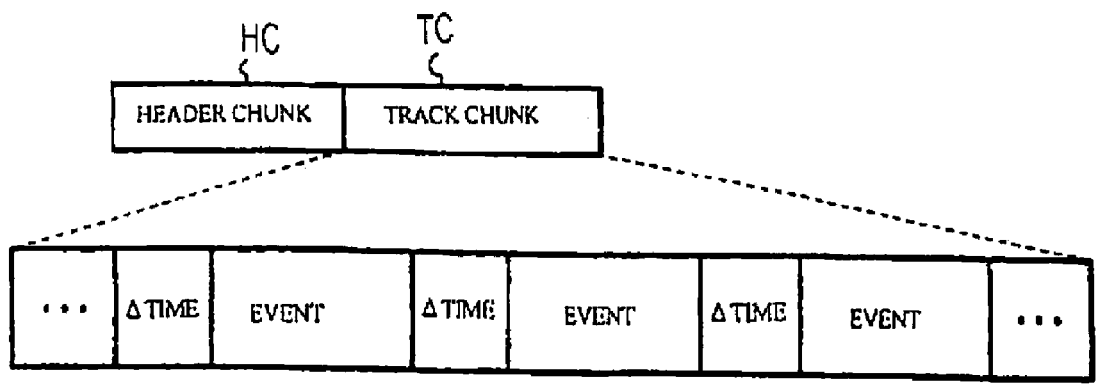
FIG. 35 is a view showing the data structure of a MIDI file.

Turning to FIG. 35, a MIDI file is broken down into a header chunk HC and a track chunk TC. Pieces of attribute data are stored in the header chunk for the MIDI file, and the event data codes and duration data codes are stored in the track chunk TC. Although the duration data codes of audio file express a lapse of time from the audio data code at the head of audio file, each of the duration data codes of MIDI file expresses a lapse of time between a key event and the next key event.

FIG. 36 illustrates the contents of the program management table 33a. The file identifier is broken down into an audio file name, a file size and a creation date. The composite audio file is identified with the audio file name. The file size expresses the number of bytes occupied by the composite audio file, and the creation date is indicative of the year, month and day at which the audio file is created. For example, an audio file is labeled with the audio file name "piano-fan.wab". 41.5 mega-bytes are required for the audio file named as "piano-fan.wab", and the audio file is created in Jan. 25, 2006. The audio file named as "piano-fan.wab" is correlated with the program labeled with the program identifier "CID 001".

FIG. 37 illustrates the contents of the program labeled with the program identifier "CID 001". The program labeled with the program identifier "CID 001" is correlated with a playback schedule, URL addresses of MIDI files and MIDI file names in the program. Start time at which the playback starts and termination time at which the playback is completed are written in the playback schedule for each of the MIDI files. For example, the playback from the MIDI file "piano-fan001.mid" starts at 1 min. and 16 sec, and the playback is completed at 5 min. and 48 sec, and the MIDI file is stored at the memory location assigned the URL address "http://www.abc.Co.jp/CID001/piano-fan001.mid".

Sound Reproducer

Figure 38:
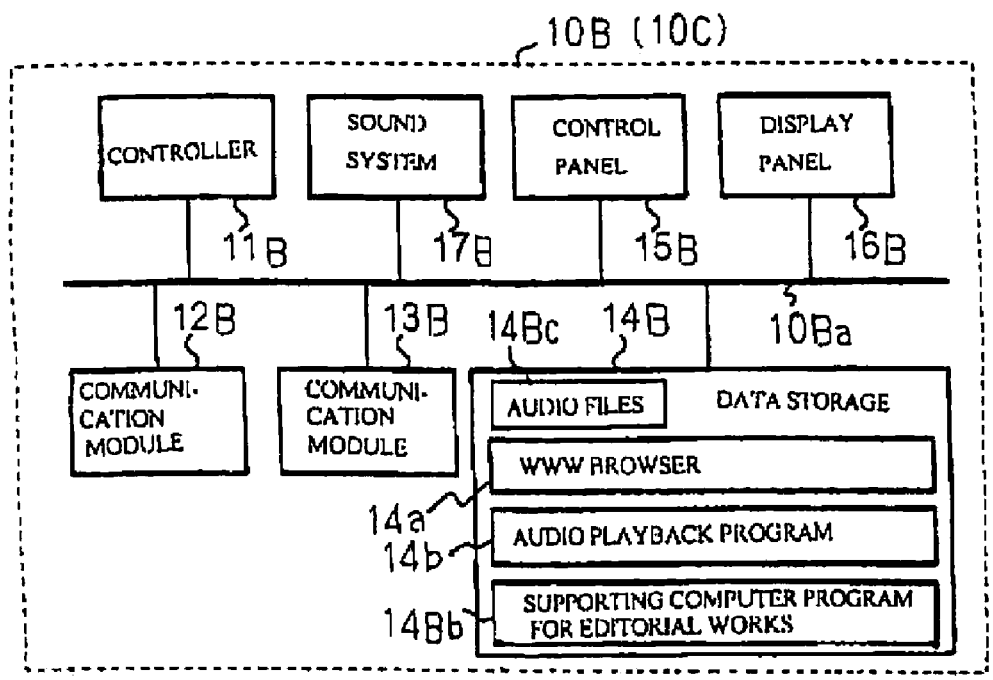
FIG. 38 is a block diagram showing the system configuration of a sound reproducer incorporated in the music reproducing system.

FIG. 38 shows the system configuration of sound reproducer 10B/10C. The sound reproducer 10B/10C includes a controller 11B, communication modules 12B and 13B, a data storage 14B, a control panel 15B, a display panel 16B and a sound system 17B. The controller 11B, communication modules 12B and 13B, data storage 14B, control panel 15B, display panel 16B and sound system 17B are connected to an internal bus system 10Ba so that the controller 11B is communicable with the other system components 12B, 13B, 14B, 15B, 16B and 17B through the internal bus system 10Ba.

The controller 11B is implemented by an information processor, and a central processing unit, peripheral processors, a program memory and a working memory are incorporated in the information processor. Application programs such as www browser 14a, an audio playback program 14b and a supporting computer program for editorial works 14Bb are stored in the data storage 14B together with an FTA and the audio files 14Bc, i.e., the composite audio files and individual audio files. The application programs selectively run on the central processing unit. The user prepares a new program with the assistance of the supporting computer program. The editorial computer program, controller 31B, supporting computer program, www browser and controller 11B as a whole constitute the program producer.

The individual audio files are transferred from a portable information storage medium such as, for example, a magnetic tape cassette, a magnetic disk, a flexible disk, a compact disc or a DVD disc by the user.

The communication module 12B is connected to the communication network 40B. While the www browser is running on the central processing unit, the sound reproducer 10B/10C communicates with the music data distribution server computer 30B. The composite program is uploaded to the music data distribution server computer 30B, and the programs and composite audio files are downloaded to the data storage 14B.

The other communication module 13B is implemented by an USB interface or a radio transmitter and receiver, and is connected to the associated automatic player musical instrument 20B/20C through a wired channel or a radio channel. The controller 11B transfers the audio signal and duration data codes in a composite audio file through the communication module 13B to the associated automatic player musical instrument 20B/20C.

The control panel 15B includes a computer keyboard and a mouse. A user gives his or her instruction to the sound reproducer 10B through the control panel 15B. The display panel 16B is, by way of example, implemented by a liquid crystal display panel, and controller 11B produces visual images on the display panel 16B. The user has dialogues with the controller 11B through the control panel 15B and display panel 16B.

The sound system 17B includes amplifiers, loud speakers and a head-phone. When a user wishes simply to playback a music tune, the audio data codes are transferred from the audio file in the data storage 14B to the sound system 17B, and an audio signal is retrieved from the audio data codes. The audio signal is converted to the electric tones through the amplifiers and loud speakers.

On the other hand, when the user instructs the controller 11B to reproduce music tunes and narration in a program through the associated automatic player musical instrument 20B, the audio signal is transferred through the communication module 13B to the automatic player musical instrument 20B/20C and the duration data codes are further transferred to the automatic player musical instrument 20B/20C for the synchronization between playback and conversion from the audio data codes to the audio signal.

Automatic Player Musical Instrument

Figure 39:
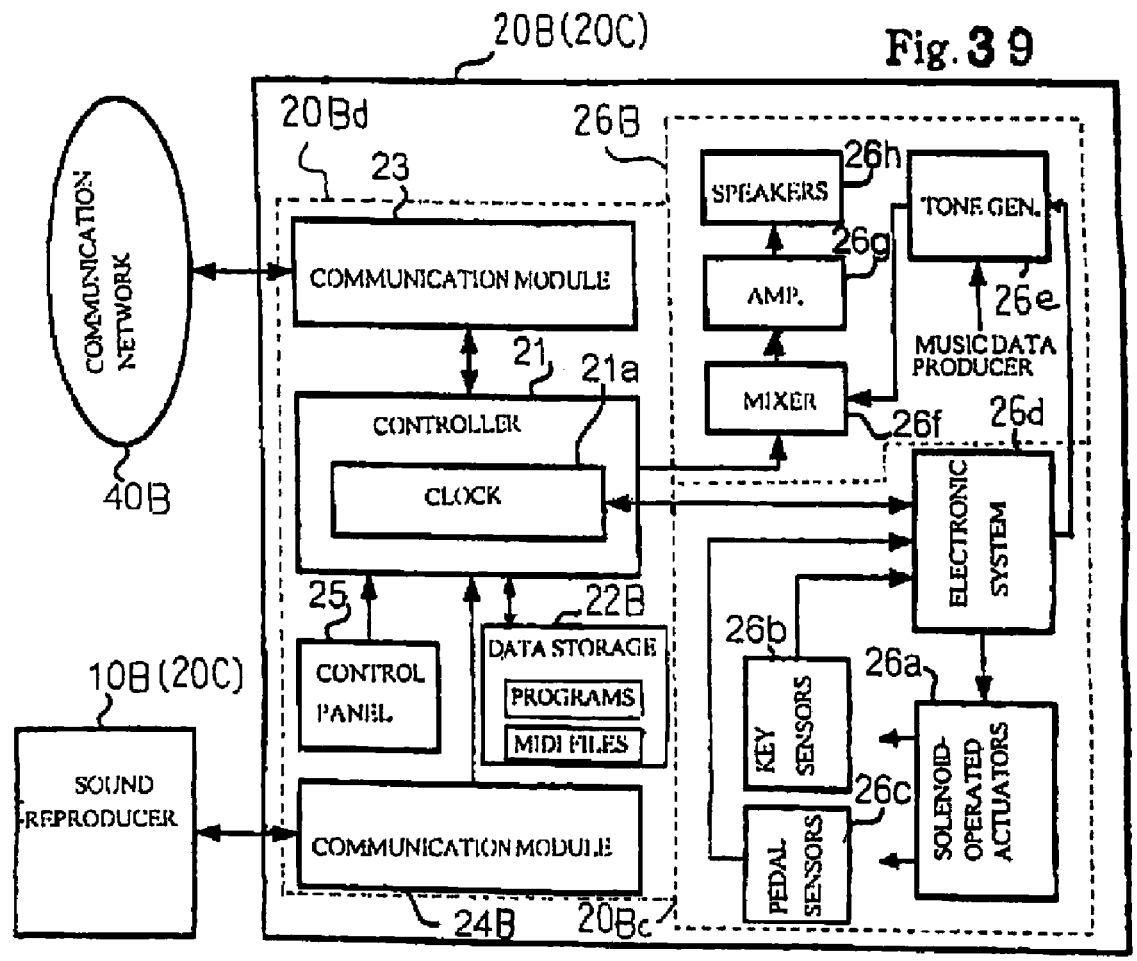
FIG. 39 is a block diagram showing the system configurations of electric and electronic systems incorporated in an automatic player musical instrument of the music reproducing system.

Turning to FIG. 39, the automatic player musical instrument 20B/20C largely comprises an acoustic piano (not shown), a code generating system (not shown), an automatic playing system 20Bc, communication modules 20Bd and an electronic tone producer 26B. Although the acoustic piano and code generating system are omitted from FIG. 39, the structure of acoustic piano and the system configuration of code generating system are similar to those shown in FIG. 2B. The components of automatic playing system 20Bc are similar to those of the automatic playing system 20c. For this reason, the components of automatic playing system 20Bc are labeled with references designating the corresponding components of automatic playing system 20c without detailed description.

Description is hereinafter made on the communication modules 20Bd and electronic tone producer 26B. The communication modules 20Bd include a controller 21, a clock 21a, a data storage 22B, a communication module 23, a communication module 24 and a control panel 25. The communication network 40B is connected to the communication module 23 and the automatic player musical instrument 20B/20C communicates with the music data distribution server computer 30B through the communication module 23 under the supervision of the controller 21. The other communication module 24 is implemented by an USB interface or a radio transmitter and receiver, and is connected to the communication module 13B of sound reproducer 10B/10C.

The controller 21 is implemented by an information processor, and a central processing unit, peripheral processors, a program memory and a working memory are incorporated in the information processing system. The information processor is shared between the controller 21 and the electronic system 26d. A computer program for the communication with external apparatus is stored in the program memory, and runs on the central processing unit so as to achieve the communication with the music data distribution server computer 30B, reception of MIDI files from the music data distribution server computer 30B, communication with the sound reproducer 10B/10C and reception of duration data codes and audio signal from the sound reproducer 10B/10C as will be hereinlater described in detail.

The clock 21a is similar in circuit configuration to that of the communication modules 20d, and a lapse of time is measured with the clock 21a. The controller 21 periodically sets the clock 21a with the duration data codes of an audio file so that the lapse of time on the clock 21a is equal to the lapse of time from the audio data code at the head of the audio file. The duration data codes of audio file are supplied from the communication module 13B of sound reproducer 10B/10C to the communication module 24, and are transferred from the communication module 24 to the controller 21.

The data storage 22B is, by way of example, implemented by a hard disk unit. When the program and MIDI files arrive at the communication module 23, the controller 21 transfers the program and MIDI files to the data storage 22, and the program and MIDI files are stored in the data storage 22B.

While the automatic playing system 20Bc is performing a music tune on the acoustic piano (not shown) on the basis of the MIDI file already stored in the data storage 22B, the controller 21 periodically checks the clock 21a to see whether or not the time period expressed by the duration data code is expired. When the controller 21 finds that the time period is expired, the controller 21 supplies the next event data code or codes to the electronic system 26d, and the electronic system 26d selectively supplies the driving signals to the solenoid-operated actuators 26a so as to depress and release the black keys, white keys and pedal mechanism. Thus, the time intervals are measured with reference to the clock 21a so as to drive the acoustic piano (not shown) well in synchronism with the conversion from the audio data codes in the audio file to the audio signal.

The electronic tone producer 26B includes an electronic tone generator 26e, a mixer 26f, an amplifier 26g and loudspeakers 26h. The electronic tone generator 26e, mixer 26f, amplifier 26g and loudspeakers 26h are same as those of the electronic tone producer 26. For this reason, no further description on those components 26e, 26f, 26g and 26h is not incorporated for the sake of simplicity.

The controller 21a is connected to the mixer 26f, and the audio signal, which is produced from the audio data codes in an audio file, is transferred to the mixer 26f. Thus, the audio signal is converted to electric voice through the electronic tone producer 26B as well as through the sound system 17B.

Behavior of Music Reproducing System

Preparation of New Program

Figure 40:
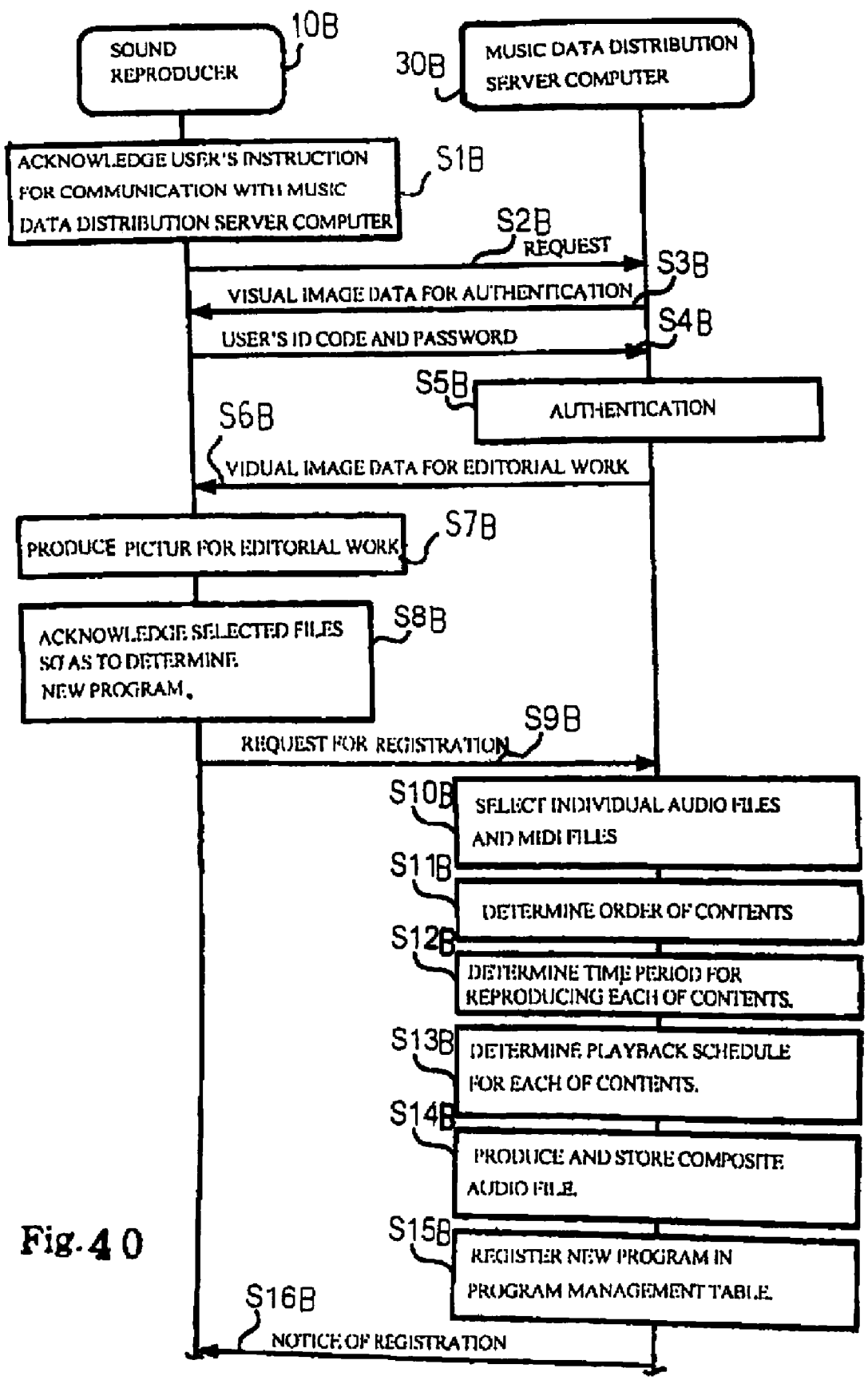
FIG. 40 is a block diagram showing a communication sequence between the sound reproducer and music data distribution server computer for preparation of a new program.

FIG. 40 illustrates a communication sequence for preparation of a new program. A user is assumed to wish to prepare a new program on the sound reproducer 10B. The user gives an instruction to the controller 11B through the computer program and/or mouse 15B. Then, the controller 11B acknowledges user's instruction for communication with the music data distribution server computer 30B as indicated by S1B, and makes the www browser start.

The controller 11B transmits a request, which contains an URL address assigned to the visual image data for producing an authentication picture, to the music data distribution server computer 30B as indicated by S2B. When the request arrives at the communication module 32B, the controller 31B reads out the piece of visual image data from the data storage 33B, and transmits the piece of visual image data from the communication module 32B to the communication module 12B of the sound reproducer 10B as indicated by S3B.

The piece of visual image data arrives at the communication module 12B, and the controller 11B produces the authentication picture on the display panel 16B. The user inputs user's identification code and password into the control panel 15B so that the controller 11B transmits the user's identification code and password from the communication module 12B to the communication module 32B as indicated by S4B.

Upon reception of user's identification code and password, the controller 31B reads out the piece of authentication data 33f of user from the data storage 33B, and compares the received user's identification code and password with the registered user's identification code and registered password to see whether or not the user has been under the onerous contract. If at least one of the user's identification code and password is different from the registered one, the controller 31B transmits the visual image data expressing the inconsistency from the communication module 32B to the communication module 12B. On the other hand, when both of the user's identification code and passwords are consistent with the registered user's identification code and password, the controller 31B admits the right to access, and authenticates the user as indicated by S5B. The controller 31B reads out a piece of visual image data expressing a picture for editorial work from the data storage 33B, and transmits the piece of visual image data from the communication module 32B to the communication module 12B as indicated by S6B.

Upon reception of the piece of visual image data, the controller 11B produces the picture for editorial work on the display panel 15B as indicated by S7B. The user selects an individual audio file or plural individual audio files and MIDI file or MIDI files on the picture for editorial work, and determines the order of contents in a new program with the assistance of supporting program running on the controller 11B as indicated by S8B.

Figure 41:
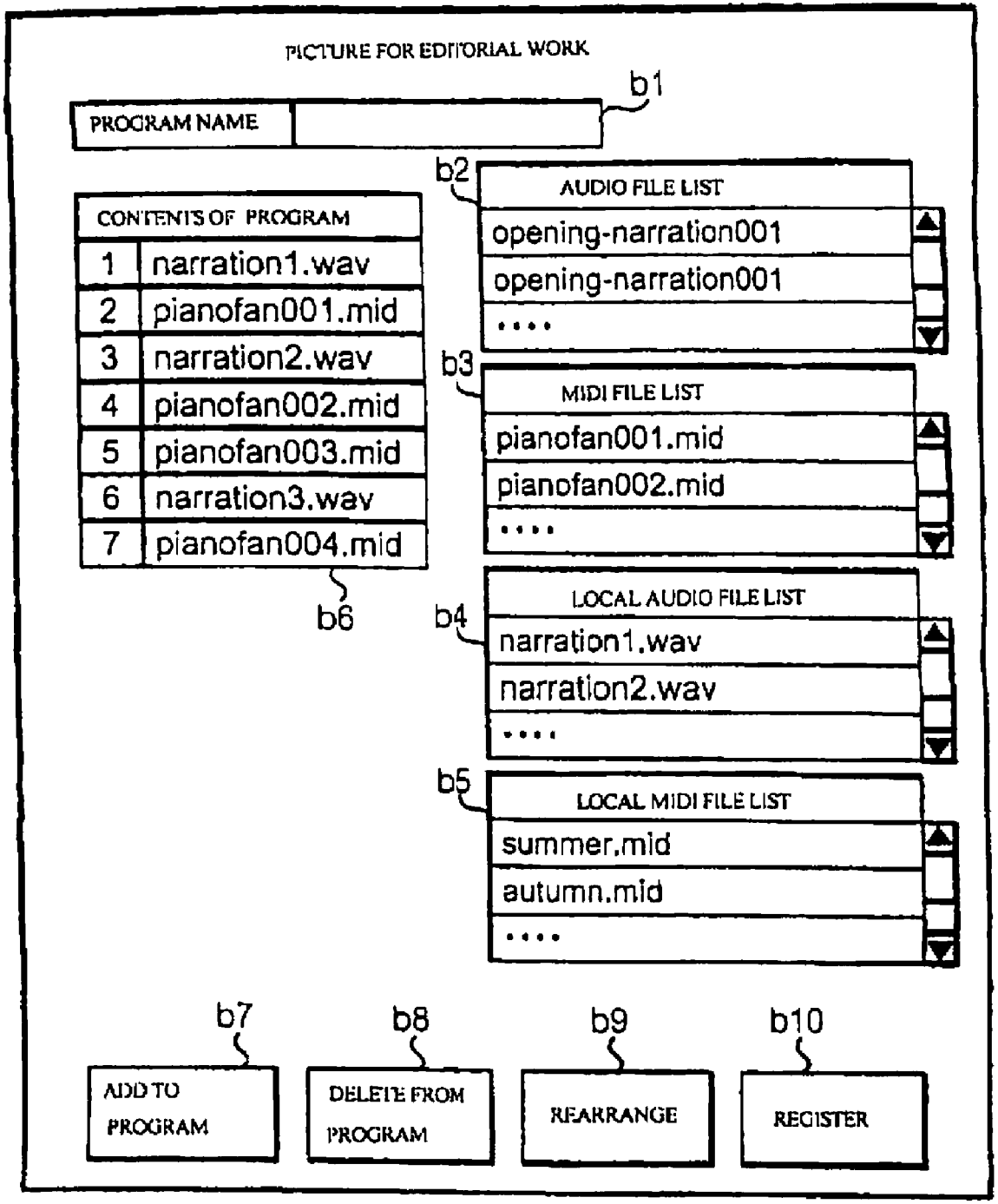
FIG. 41 is a view showing a picture for editorial work produced on a display panel.

FIG. 41 shows the picture for editorial work produced on the panel display 16B. The picture contains several windows "PROGRAM NAME" b1, "AUDIO FILE LIST" b2, "MIDI FILE LIST" b3, "LOCAL AUDIO FILELIST" b4, "LOCAL MIDI FILE LIST" b5 and "CONTENTS OF PROGRAM" b6 and images of boxes b7, b8, b9 and b10. The boxes are labeled with "ADD TO PROGRAM", "DELETE FROM PROGRAM", "REARRANGE" and "REGISTER". The individual audio files, which are stored in the data storage 33B of music data distribution server computer 30B, are listed in the window "AUDIO FILE LIST" b2, and the MIDI files, which are also stored in the data storage 33B, are listed in the window "MIDI FILE LIST" b3. On the other hand, the individual audio files, which are stored in the data storage 14B of sound reproducer 10B, are listed in the window "LOCAL AUDIO FILE LIST" b4, and the MIDI files, which are also stored in the data storage 14B, are listed in the window "LOCAL AUDIO FILE LIST" b5.

The user is assumed to input the file name "piano-fan" through the control panel 15B, and the characters "piano-fan" are produced in the window b1.

Subsequently, the user moves the cursor to an audio file name "narration 1.wav" in the window b4 by sliding the mouse, and clicks the button of mouse for designating the audio file "narration 1.wav". Thereafter, the user moves the cursor into the box "ADD TO PROGRAM" by means of the mouse, and clicks the button. Then, the audio file "narration 1.wav" is selected by the user, and the fine name "narration 1.wav" is written in the first row of the window b6.

The user repeats the above described operations so that the rows in the window b6 are successively filled with the fine names "pianofan001.mid", "narration 2.wav", "pianofan002.mid", "pianofan003.mid", "narration 3.wav" and "pianofan004.mid". If the user wishes to delete an audio file or a MIDI file from the program, the user moves the cursor to the file name in the window b6, clicks the button for designating the audio file or MIDI file to be deleted, moves the cursor into the box "DELETE FROM PROGRAM" for designating the operation, and clicks the button so as to delete the audio file or MIDI file from the program. The user can rearrange the order of contents by using the box "REARRANGE". Though not shown in FIG. 41, another window is provided in the picture, and the user inputs introductory remarks through the control panel 15B, if desired so as to write the introductory remarks in the window.

When the user completes the editorial work, the user moves the cursor into the box "REGISTER", and clicks the button of mouse. Then, the controller 11B determines pieces of program data expressing the program name, contents of program and order of contents to be reproduced, and transmits the pieces of program data and pieces of audio data expressing the audio files selected from the local audio file list from the communication module 12B to the communication module 32B as a request for registration as indicated by S9B. In case where the user selected a MIDI file from the local MIDI file list and wrote the introductory remarks, the pieces of music data expressing the MIDI files and pieces of introductory data expressing the introductory remarks are added to the pieces of program data and pieces of audio data, and form other parts of the request for registration.

Upon reception of the request for registration, the controller 31B transfers the request for registration, i.e., the pieces of program data and pieces of audio data from the communication module 32B to the data storage 33B, and stores the request for registration in the data storage 33B. Of course, if the user selected a MIDI file from the local MIDI file list, and/or if the user wrote the introductory remarks, the pieces of music data and/or pieces of introductory data are further stored in the data storage 33B.

Subsequently, the controller 31B selects the individual audio files and MIDI files from the data storage 33B as indicated by S10B, and determines the order of files to be reproduced as indicated by S11B.

The controller 31B further determines the playback time period for each of the contents of program on the basis of the file size of selected individual audio files and file size of MIDI files, and accumulates the playback time periods so as to determine the start time and termination time of each content of program. In short, the controller 31B determines the playback schedule as indicated by S13B.

Figures 42, 43:
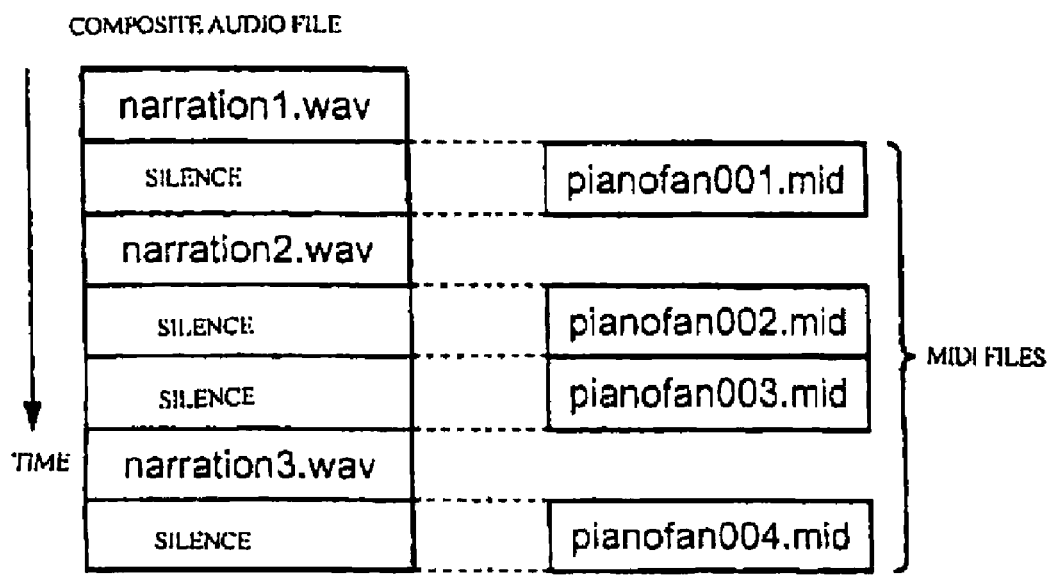
FIG. 42 is a view showing a playback schedule for a program.
FIG. 43 is a block diagram showing the order of the contents of program to be reproduced and MIDI files to be inserted into narration.

FIG. 42 shows the playback schedule of the program. The file names are correlated with the playback schedule. The time periods to be consumed by the contents are 1 minute and 16 seconds, 4 minutes and 32 seconds, 41 seconds, 7 minutes and 31 seconds, 10 minutes and 13 seconds, 1 minute and 7 seconds and 6 minutes and 3 seconds. The controller 31B accumulates the playback time periods so as to determine the start time at 0 minute and 0 second, 1 minute and 16 seconds, 5 minutes and 48 seconds, 6 minutes and 29 seconds, 14 minutes and 0 second, 24 minutes and 13 seconds and 25 minutes and 20 seconds. The termination time is equal to the start time of the next content, and the seventh content of the MIDI file "piano-fan004.mid" is terminated at 31 minutes and 23 seconds. The playback schedule is memorized in the data storage 33B.

The controller 31B spaces the second to seventh contents from the first to sixth contents by the time periods equal to the playback time of the first to sixth contents, and inserts the audio data codes expressing the silence. Thus, the composite audio file for the program "piano-fan.wab" is prepared, and is stored in the data storage 33B as indicated by S14B.

FIG. 43 shows the composite audio file "piano-fan.wab" and MIDI files to be inserted among the narration. The content "narration 2.wab" is spaced from the content "narration 1.wab" by the playback time of music tune recorded in the MIDI file "pianofan001.mid", and the audio codes expressing the silence are inserted between the content "narration 1.wab" and the content "narration 2.wab". The content "narration 2.wab" is spaced from the content "narration 3.wab" by the total playback time of the music tunes recorded in the MIDI files "pianofan002.mid" and "pianofan003.mid", and the audio data codes expressing the silence are inserted between the content "narration 2.wab" and the content "narration 3.wab". The content "narration 3.wab" is followed by the music tune recorded in the MIDI file "piano-fan004.mid", and the time period consumed by the audio data codes expressing the silence is equal to the playback time of music tune recorded in the MIDI file "pianofan004.mid".

The controller 31B issues the program identifier "CID001" on the program "piano-fan.wab", and assigns the URL addresses to the contents of programs, respectively. As a result, the program "piano-fan.wab" is completed as shown in FIG. 37.

Finally, the controller 31B adds the file size and creation date to the composite audio file "piano-fan.wab", and registers the file identifier and program identifier in the program management table (see FIG. 36) as indicated by S15B.

When the registration is completed, the controller 31B transmits a notice of registration from the communication module 32B to the communication module 12B. Upon reception of the notice of registration, the controller 11B reproduces characters expressing the completion of registration on the display panel 16B, and terminates the data processing for the editorial work at the producing the characters.

Acquisition of Composite Audio File

Figure 44:
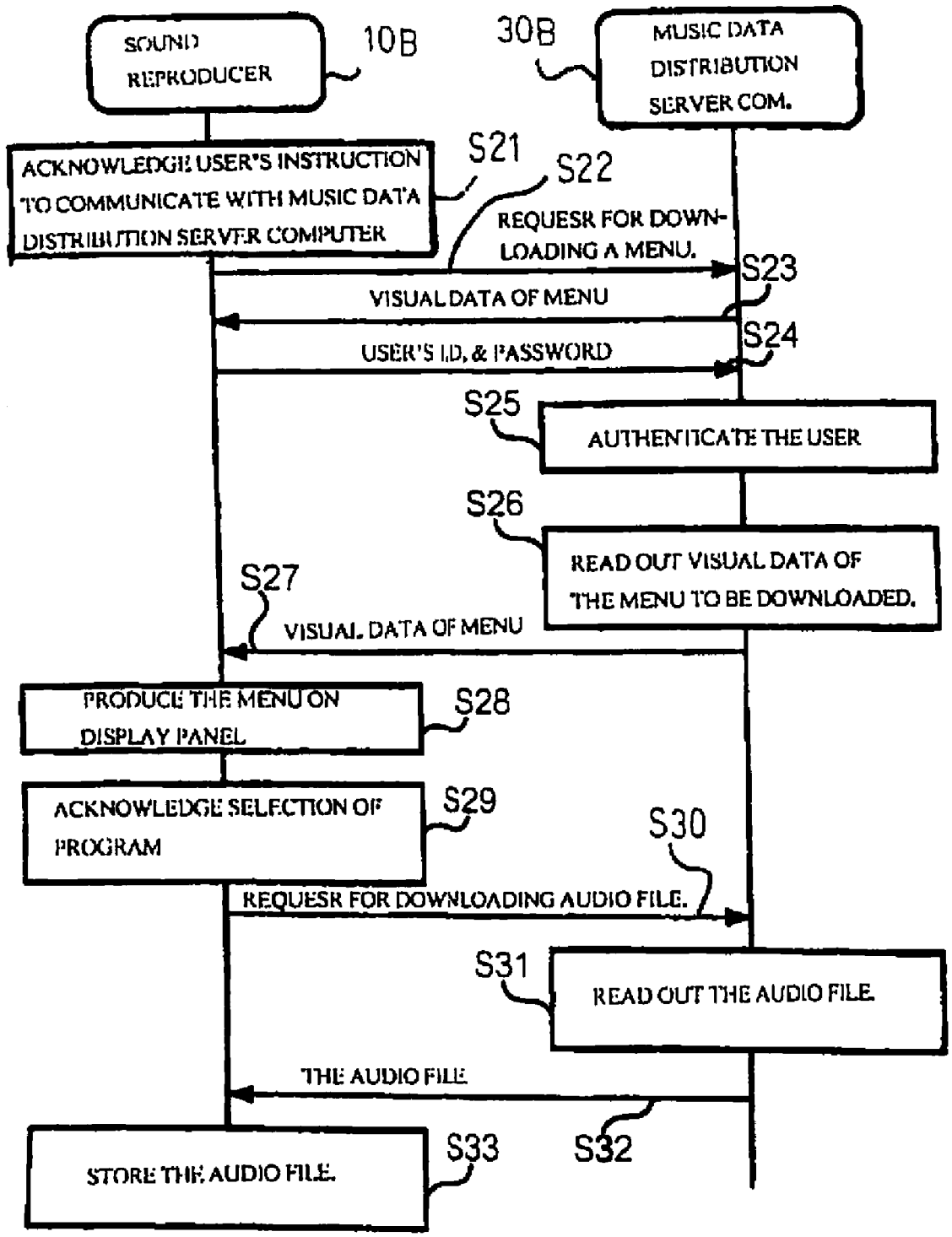
FIG. 44 is a block diagram showing a communication sequence between the sound reproducer and the music data distribution server computer for downloading a program and associated files.

FIG. 44 shows a communication sequence between the sound reproducer 10B and the music data distribution server computer 30B. A user is assumed to wish to download a composite audio for reproducing a program. The user gives an instruction to communicate with the music data distribution server computer 30B to the sound reproducer 10B through the control panel 15B. Then, the controller 11B acknowledges user's instruction as indicated by S21, and makes the www browser to run on the controller 11B. The controller 11B designates the URL address indicative of the memory location assigned a menu, and sends a request for downloading the menu or a list of programs, i.e., an http request from the communication module 12B to the communication module 32B of the data distribution server computer 30B as indicated by S22.

Upon reception of the request, the music data distribution server computer 30 reads out the visual data expressing a picture for authentication, and transmits the visual data from the communication module 32B to the communication module 12B as indicated by S23. The controller 11B produces the picture for authentication on the display panel 16B. Two windows are defined in the picture for authentication, and are respectively assigned to the user's identification code and password. The user inputs the user's identification code and password through the control panel 15B so as to produce the characters expressing the user's identification code and password in the windows. The user confirms the user's identification code and password on the display panel 16B, and instructs the controller 11B to transmit the user's identification code and password from the communication module 12B to the communication module 32B as indicated by S24.

Upon reception of the user's identification code and password, the controller 31B reads out the piece of authentication data expressing the user's identification code and password from the data storage 33B, and compares the received identification code and password with the read-out identification code and password to see whether or not the user is permitted to communicate with the service provider.

If the comparison results in inconsistency, the controller 31B transmits a piece of visual data expressing the inconsistency from the communication module 32B to the communication module 12B. The controller 11B produces the visual image of inconsistency on the display panel 16B. In this situation, the narration 1, 2 and 3 are reproduced from the audio signal converted from the audio data codes in the composite audio file at irregular intervals, because the composite audio file has been stored in the date storage 14B. However, any music tune is not produced. Thus, only the authenticated users can reproduce the narration in the composite audio file together with the music tunes stored in the MIDI files.

On the other hand, if the comparison results in consistency, the controller 31B authenticates the user as indicated by S25, and reads out a piece of visual data expressing a menu or a list of program from the data storage 33B as indicated by S26. The controller 31B transmits the piece of visual data expressing the menu from the communication module 32B to the communication module 12B as indicated by S27.

The piece of visual data expressing the menu arrives at the communication module 12B. Then, the controller 11B produces the visual image of menu on the display panel 16B as indicated by S28.

Figure 45:
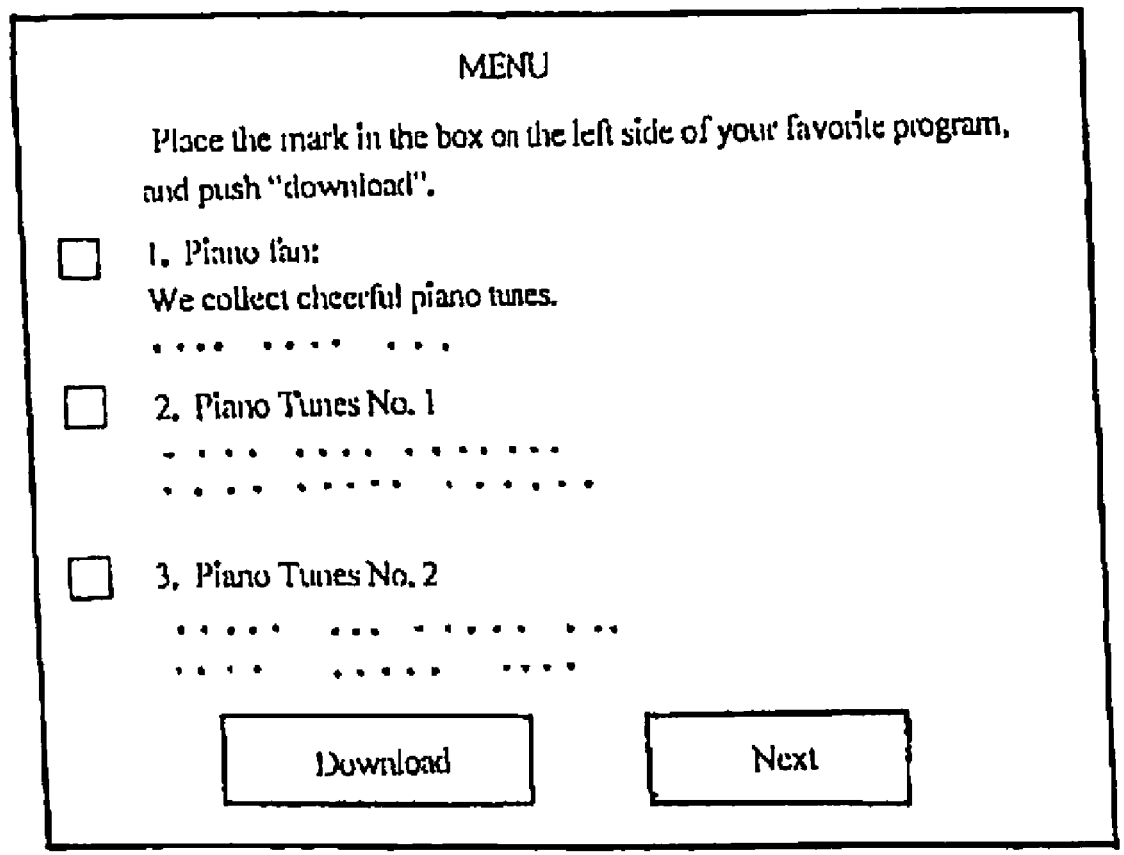
FIG. 45 is a view showing a picture produced on a display of the sound reproducer for downloading the program and associated files.

FIG. 45 shows the visual image of menu produced on the display panel 16B. Program names "Piano fan", "Piano tunes No. 1", "Piano tunes No. 2" take place under a prompt message "Place the mark in the box on the left side of your favorite program, and push "download"". The programs are followed by recommendation to users. Though not shown in the display panel, the URL addresses are added to the program names by means of the anchor tag of HTML.

The user selects a program from the menu, and places the mark in the box on the left side of the program name by means of a pointer. When the user clicks the image of button "Download", the controller 11B acknowledges the user's selection of program as indicated by S29, and transmits the request, which contains the URL address, from the communication module 12B to the communication module 32B of the music data distribution server computer 30B as by S30. When the user does not find any favorite program, he or she clicks the image of button "Next". Then, other programs are displayed.

Upon reception of the request, the controller 31B accesses the composite audio file at the URL address, and reads out the composite audio file corresponding to the program name from the data storage 33B as indicated by S31. The controller 31B transmits the composite audio file from the communication module 32B to the communication module 12B as indicated by S32.

The composite audio file arrives at the communication module 12B. Then, the controller 11B transfers the composite audio file to the data storage 14B, and stores the composite audio file in the data storage 14B as indicated by S33. Thus, the download is accomplished.

Playback of Program in Collaboration

Figure 46:
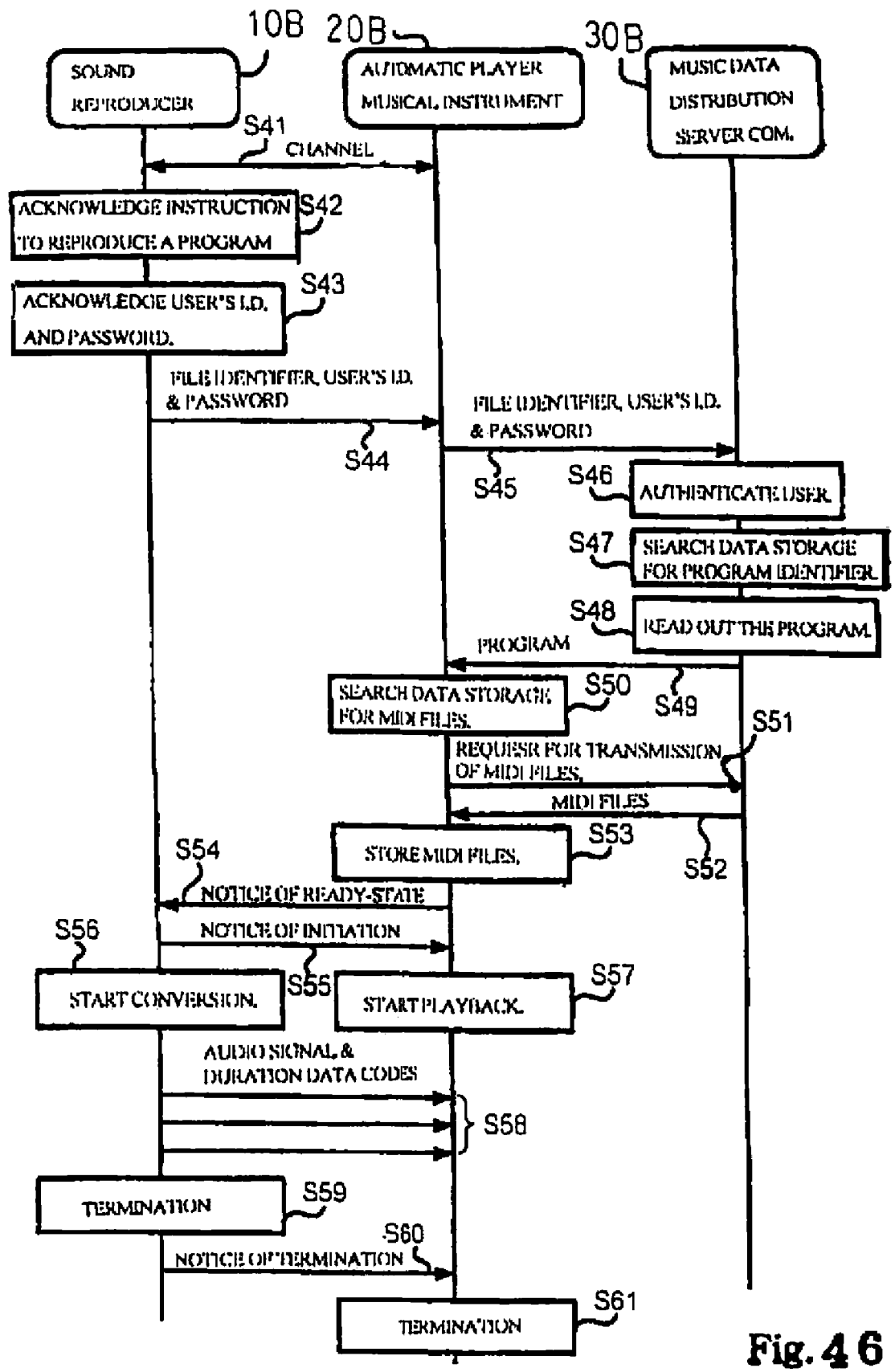
FIG. 46 is a block diagram showing a communication sequence among the sound reproducer, automatic player musical instrument and music data distribution server computer for reproducing a program.
Figure 47:
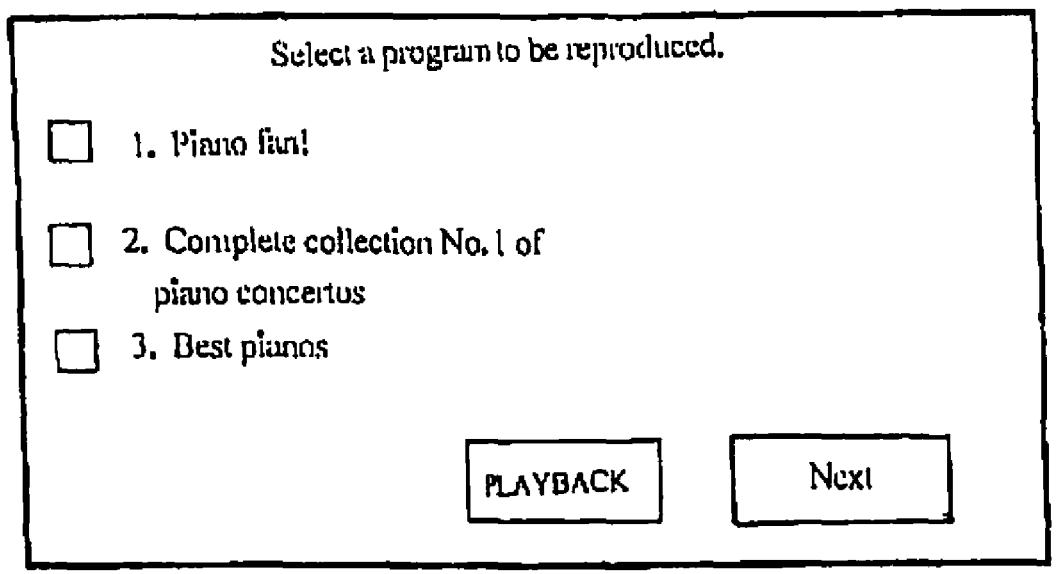
FIG. 47 is a view showing a picture produced on the display panel for playback.

FIG. 46 shows a communication sequence among the sound reproducer 10B, automatic player musical instrument 20B and music data distribution server computer 30B. First, the user establishes a communication channel between the communication module 13B of sound reproducer 10B and the communication module 2413 of automatic player musical instrument 20B as indicated by S41, and gives the sound reproducer 10B an instruction for playback of a program. The audio playback program starts to run on the controller 11B, and produces the picture shown in FIG. 47 on the display panel 16B. The program names "Piano fan?", "Complete collection No. 1 of piano concertos" and "Best pianos" are displayed on the display panel 16B together with the images of boxes respectively labeled with "PLAYBACK" and "Next".

If the user does not find his or her favorite program, he or she moves the cursor to the box "Next", and clicks the button of mouse. Then, other program names are displayed on the display panel 16B. The user is assumed to click the button of mouse at the box on the left side of "Piano fan!". Then, the controller 11B acknowledges the user's instruction for playback as indicated by S42. Then, the controller 11B produces a picture for authentication on the display panel 16B, and prompts the user to input the user identification code and password. The user inputs the user identification code and password through the control panel 15B as indicated by S43. A piece of the visual data expressing the picture for authentication has been already stored in the data storage 14B. Otherwise, the piece of visual data may be downloaded from the music data distribution server computer 30B.

The controller 11B accesses the FAT, and reads out the file identifier, which includes the pieces of data information expressing the file name "piano-fan.wab", file size "41.5 mega-bytes" and creation date "2006/1/25" from the FAT. The controller 11B transmits the file identifier from the communication module 13B to the communication module 24B of the automatic player musical instrument 20B as indicated by S44.

Upon reception of the file identifier, the controller 21 transmits the file identifier, user identification code and password from the communication module 23 to the communication module 32B of the music data distribution sever computer 30B as indicated by S45.

When the file identifier, user identification code and password arrive at the communication module 32B, the controller 31B reads out the piece of authentication data 33f expressing the user's identification code and password from the data storage 33B, and compares the received identification code and password with the read-out identification code and password to see whether or not the user is permitted to communicate with the service provider. If the comparison results in inconsistency, the controller 31B transmits a piece of visual data expressing the inconsistency from the communication module 32B through the communication modules 23 and 24B to the communication module 13B. The controller 11B produces the visual image of inconsistency on the display panel 16B.

On the other hand, if the comparison results in consistency, the controller 31B authenticates the user as indicated by S46, and accesses the program management table 33a shown in FIG. 36 so as to determine the program identifier "CID001" as indicated by S47. The controller 31A searches the data storage 33B for the program labeled with the program identifier "CID001", and reads out the program from the data storage 33B as indicated by S48. The controller 31A transmits the read-out program 33Bb (see FIG. 37) from the communication module 32B to the communication module 23 of the automatic player musical instrument 20B as indicated by S49.

The program 33Bb arrives at the communication module 23. Then, the controller 21 searches the data storage 22B for the program labeled with the program name to see whether or not the MIDI files of the program 33Bb have been already stored in the data storage 22B as indicated by S50. As shown in FIG. 37, the program contains the MIDI files "piano-fan001.mid", "piano-fan002.mid", "piano-fan003.mid" and "piano-fan004.mid". All of the MIDI files "piano-fan001.mid", "piano-fan002.mid", "piano-fan003.mid" and "piano-fan004.mid" are assumed to be not stored in the data storage 22B.

The controller 21 transmits an http request, which contains the URL address "http://www.abc.co.jp/CID001/piano-fan001.mid", from, the communication module 23 to the communication module 32B as indicated by S51. Then, the controller 31B reads out the MIDI file from the URL address, and transmits the MIDI file from the communication module 32B to the communication module 23 as indicated by S52. The controller 21 transfers the received MIDI file from the communication module 23 to the data storage 22B, and stores it in the data storage 22B as indicated by S53. The request and response are repeated for the other MIDI files "piano-fan002.mid", "piano-fan003.mid" and "piano-fan004.mid". As a result, all the MIDI files "piano-fan001.mid", "piano-fan002.mid", "piano-fan003.mid" and "piano-fan004.mid" are prepared in the data storage 22B.

When all of the MIDI files "piano-fan001.mid", "piano-fan002.mid", "piano-fan003.mid" and "piano-fan004.mid" are prepared in the data storage 22B, the controller 21 gets ready to perform the music tunes 1 to 4. The controller 21 sends a notice of ready-state from the communication module 24B to the communication module 13B of sound reproducer 10B as indicated by S54.

Figure 48:
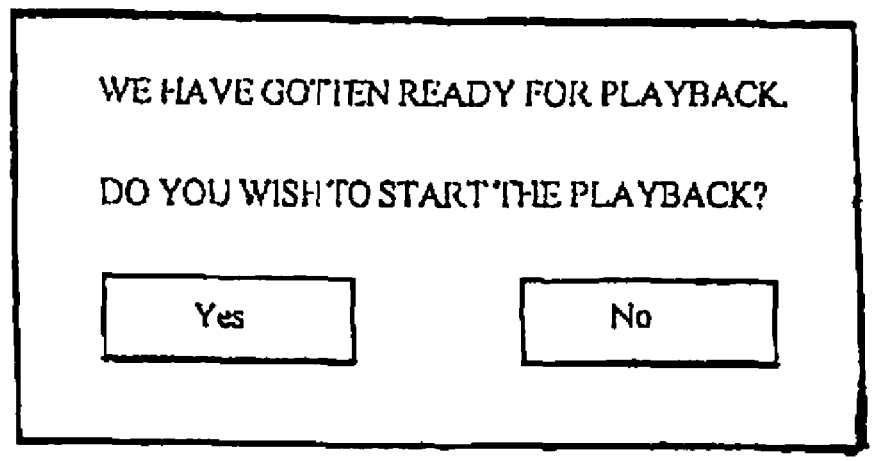
FIG. 48 is a view showing a picture produced on the display panel in order to ask for permission of playback.

Upon reception of the notice of ready-state, the controller 11B produces a picture shown in FIG. 48 on the display panel 16B so as to inform the user of the ready-state, and asks for permission. The user is assumed to click the button of mouse at the box "Yes". Then, the controller 11B sends a notice of initiation from the communication module 13B to the communication module 24B as indicated by S55.

The sound reproducer 10B starts the conversion from the audio data codes of the composite audio file to the audio signal as indicated by S56. The automatic player musical instrument 20B starts the playback on the basis of the music data codes of MIDI file as indicated by S57, and starts to measure the lapse of time with the clock 21a. The audio signal and duration data codes are transmitted from the communication module 13B to the communication module 24B as indicated by S58.

Figure 49:
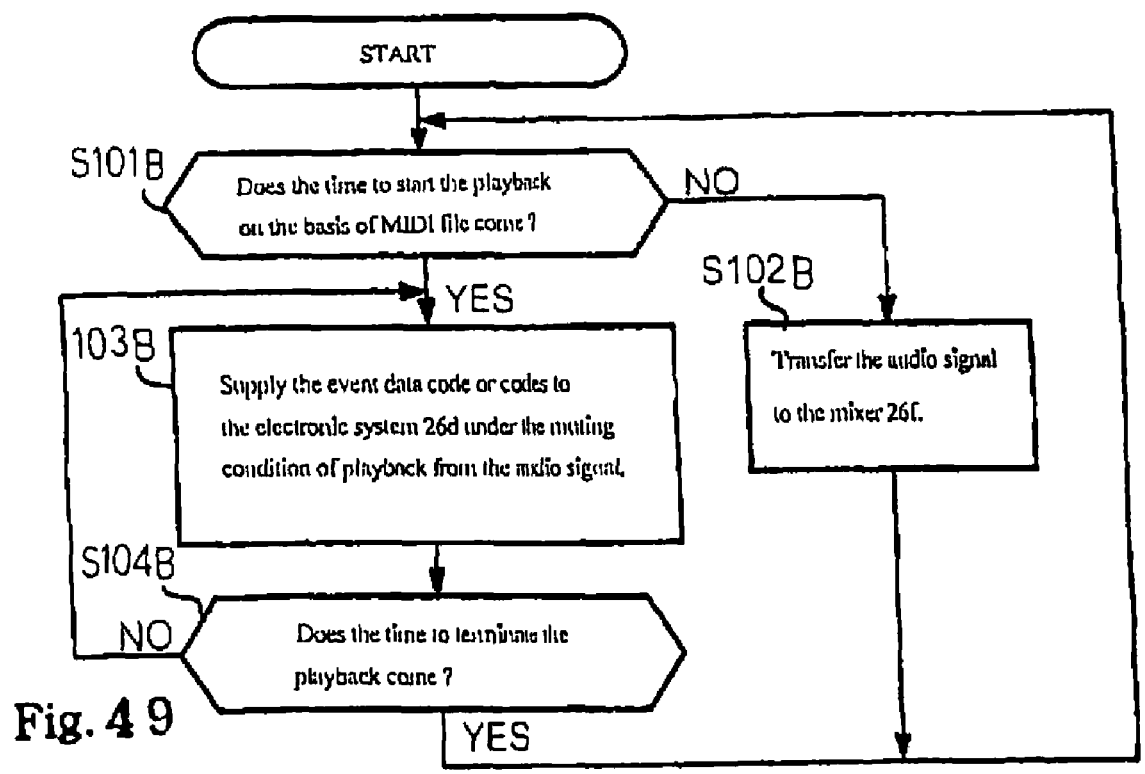
FIG. 49 is a flowchart showing a job sequence for the controller of automatic player musical instrument.

FIG. 49 shows a job sequence realized through execution of the computer program installed in the controller 21 and electronic system 26d of the automatic player musical instrument 20B. As shown in FIG. 37, the program CID001 contains the playback schedule. The first music tune starts at 1' 16", and is terminated at 5' 48". The second music tune starts at 6' 29", and is terminated at 14' 00". "Narration 1" is to be reproduce before the first music tune, and "narration 2" is inserted between the first music tune and the second music tune as shown in FIG. 34. The third music tune starts at 14' 13", and is terminated at 24' 13". The fourth music tune starts at 25' 20", and is terminated at 31' 23". "Narration 3" is inserted between the third music tune and the fourth music tune.

The controller 21 checks the clock 21a to see whether or not the time to playback the first music tune comes as by step S101B. The answer at step S101B is given negative "No" from the initiation of playback to 1' 16", and the controller 21 transfers the audio signal from the communication module 24B to the mixer 26f as by step S102B. For this reason, the narration 1 is reproduced.

The answer at step S101B is changed to affirmative "Yes" at 1' 16". Then, the controller 21 starts to supply the key event data code or codes from the data storage 22B to the electronic system 26d for the playback of the first music tune as by step S103B.

The user has two options, i.e., the automatic playing system 20Bc and electronic tone producer 26B. If the user selects the automatic playing system 20Bc, the black keys, white keys and pedal mechanism are selectively driven by the solenoid-operated actuators 26a, and the acoustic piano tones are produced through the acoustic piano (not shown). On the other hand, when the user selects the electronic tone producer 26B, the music data code or codes are transferred to the electronic tone generator 26e. The audio signal is produced on the basis of the music data code or codes, and is supplied through the mixer 26f and amplifier 26g to the loudspeakers 26h. The audio signal is converted to the electronic tones along the music passage of the first music tune.

Subsequently, the controller 21 checks the clock 21a to see whether or not the time to terminate the playback comes as by step S104B. The answer at step S105B is given negative "No" until 5' 48", and the controller 21 returns to step S103B. The controller 21 checks the clock 21a to see whether or not the time period between the key event and the next key event is expired. While the answer is being given negative "No", the controller 21 continuously sets the clock 21a with the duration data codes of the audio file. When the time period is expired, the controller 21 transfers the next event data code or codes to the electronic system 26d for producing the acoustic piano tone or electronic tone.

The controller 21A reiterates the loop consisting of steps S103B and step S104B until 5' 48". When the answer at step S104B is changed to affirmative "Yes", the controller 21 restarts to supply the audio signal to the mixer 26f, and the narration 2 is reproduced. The audio signal is changed to the supply of event data codes at 6' 29", and the second music tune is reproduced through the automatic player musical instrument 20B until 14' 00". The third music tune starts at 14' 13" without any narration, and is terminated at 24' 13". The third music tune is followed by the narration 3 reproduced from the audio signal. After the narration 3, the fourth music tune is reproduced on the basis of the MIDI file.

When all the contents of program are reproduced, the sound reproducer 10B terminates the data processing as indicated by S59 (see FIG. 46), and sends a notice of termination to the automatic playing musical instrument 20B as indicated by S60. Upon reception of the notice of termination, the automatic playing musical instrument 20B also terminates the data processing as indicated by S61.

As will be understood from the foregoing description, an authenticated user, who is under the onerous contract with the service provider, can prepare a unique program by combining the composite audio files with MIDI files, and deposit the unique program in the data storage 33B of the music distribution server computer 30B. Other authenticated users can download the composite audio file together with the MIDI files from the music data distribution server computer, and reproduce the narration and music tunes along the program.

Moreover, the programs are reproduced in collaboration between the sound reproducer 10B/10C and the associated automatic player musical instrument 20B/20C as similar to those in the description on the first embodiment. The audience feels the reproduction of program in collaboration between the sound reproducer 10B/10C and automatic player musical instrument 20B/20C close to the performance in a live concert.

Modifications of Third Embodiment

First Modification

The first modification of music reproducing system 100B is different from the third embodiment in the communication from S47 to S53. In the third embodiment, only the MIDI files not found in the data storage 22 are downloaded from the music data distribution server computer 30B. This feature is desirable from the viewpoint of reduction of load in downloading work. On the contrary, when the automatic player musical instrument 20B transmits the file identifier to the music data distribution server computer 30B, all of the MIDI music data files and program are concurrently downloaded from the music data distribution server computer 30B to the automatic player musical instrument 20B in the first modification. Thus, the communication is made simplified rather than the communication in the third embodiment.

Second Modification

Figure 50:
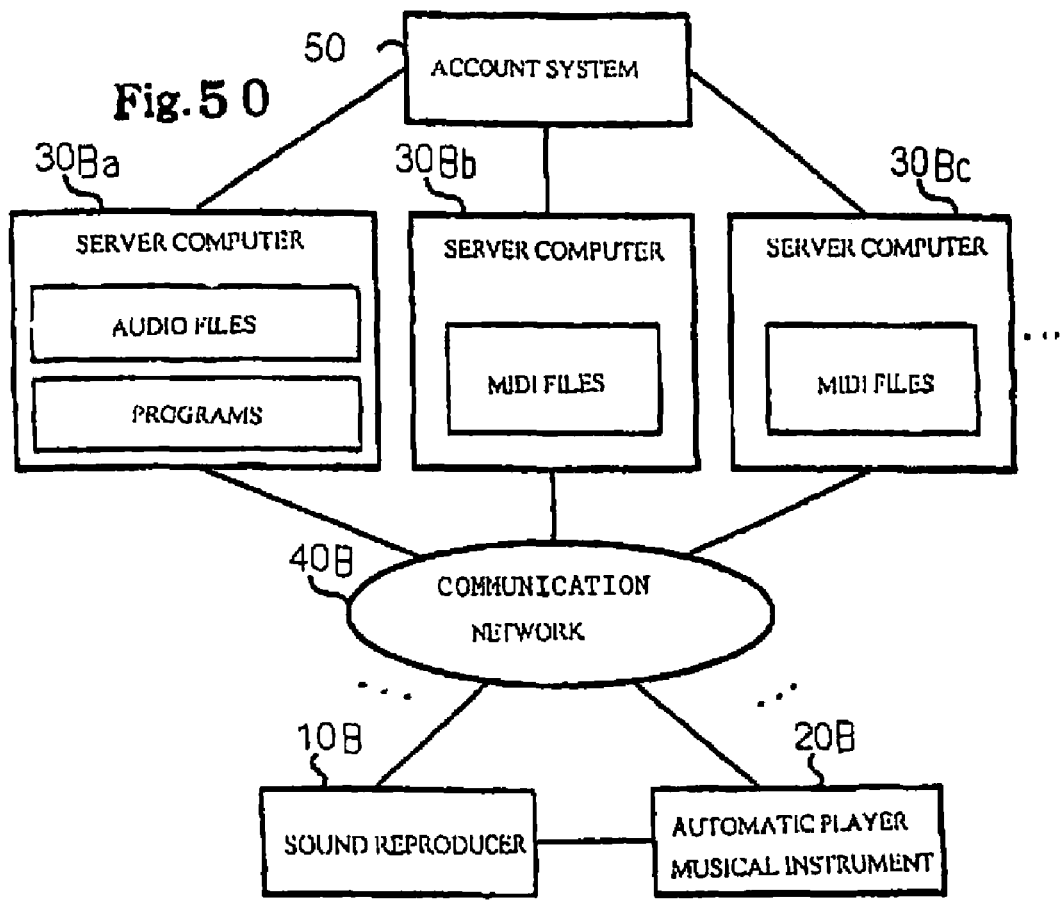
FIG. 50 is a block diagram showing the system configuration of a modification of the music reproducing system of the present invention.

FIG. 50 illustrates the system configuration of the second modification of the third embodiment. Although the audio files, programs and MIDI files are stored in the single music data distribution server computer 30B in the second embodiment, the composite audio files, individual audio files and programs are stored in a server computer 30Ba different from the server computers 30Bb and 30Bc where the MIDI files are stored.

When a user prepare a composite audio file, the user combines an individual audio file with the MIDI files, which have been already stored in the data storage 14B or are stored in the server computer 30Bb and/or 30Bc, and transmits the composite audio file to the server computer 30Ba so as to deposit the composite audio file in the server computer 30Ba.

When another user instructs the sound producer (not shown) to reproduce a program in collaboration with an associated automatic player musical instrument (not shown), the program and composite audio file are firstly downloaded from the server computer 30Ba to the sound reproducer (not shown), and makes the automatic player musical instrument (not shown) to transmit a request for downloading the MIDI files at the URL addresses in the program from the server computer 30Bb and/or 30Bc to the automatic player musical instrument (not shown).

It is not easy for the service provider to prepare a huge number of audio files and a huge number of MIDI file in the server computer. In the second modification, plural service providers bear the huge number of files in the plural server computers 30Ba, 30Bb and 30Bc so that the music reproducing system is easily established in the network. Thus, the service providers can offer a large number of programs to users through the second modification of the music reproducing system.

In case where only one server computer participates in the music reproducing system, the URL addresses may be deleted from the programs, because the controller can search the data storage by the MIDI file names. However, the MIDI files are stored in plural server computers. The URL addresses are desirable.

The sound reproducer 10B and automatic player musical instrument 20B may have a unitary structure.

Third Modification

The third modification of the music reproducing system 100B has an accounting system 50B. The accounting system 50B is, by way of example, implemented by various accounting networks such as the Japan Bank Network and/or CAFIS (Credit And Finance Information System), and is connected to the server computers 30Ba, 30Bb and 30Bc. When a user downloads the programs, audio files and MIDI files, the service providers write out bills, and settle accounts with the users through the accounting system 50B In detail, the composite audio files, individual audio files and MIDI files are priced, and are accompanied with price lists in the data storages of the server computers 30Ba, 30Bb and 30Bc. A user list is further stored in the data storages, and the users have been registered in the user list. The name, address, birthday, user identifier, bank account number and credit card number are written in the user list for each of the registered users.

When a user requests the server computer 30Ba, 30Bb or 30Bc for the download of a composite audio file, an individual audio file, a program or a MIDI file, the controller of the server computer requests the user to send the user identifier to the server computer 30Ba, 30Bb or 30Bc, and transmits the program or file to the sound reproducer 10B and/or automatic player musical instrument 20B after the confirmation of the user.

Upon completion of the download, the controller of server computer accesses the price list so as to write out a bill, and sends the bill to the account system 50B for the settlement. If the user requests the service providers to settle the accounts through the credit card system, the service providers put the bill in the credit account. Thus, the bills are automatically settled at the user's account number through the accounting system 50B. The service provider pays the royalty to the copyright holder after the settlement.

Fourth Modification

The fourth modification of music reproducing system 100B is different from the third embodiment in that the automatic player musical instrument 20B can reproduce music tunes through in-stream playback on the basis of MIDI files. In the in-stream playback, the music data codes are transmitted from the music data distribution server computer 30B through the communication network 40B, and the music tune is reproduced on the basis of the music data codes in a real time fashion. Otherwise, the MIDI file is stored in the random access memory, and is erased after the playback. For this reason, it is difficult to reuse the music data codes after the in-stream playback.

A user can choose the playback method between the standard playback after the download and the in-stream playback. If the user chooses the standard playback, the automatic player musical instrument 20B behaves as similar to that shown in FIG. 46. On the other hand, when the user chooses the in-stream playback, the music data codes are transmitted from the music data distribution server computer 30B to automatic player musical instrument 20B, and are temporarily stored in the random access memory of the controller 21. The music data codes are timely transferred to the electronic system 26d so as to produce the acoustic piano tones or electronic tones on the basis of the event data codes.

In case where the fee-charging download is employed in the fourth modification, the in-stream playback is beneficial to users, because the price of MIDI files for the in-stream playback is lower than the price of MIDI files for the standard playback. Users may choose the standard playback for music tunes out of the copyright, and choose the in-stream playback for the copyrighted music tunes.

In order to respond to user's choice, the MIDI files are broken down into two groups, the copyrighted music tunes, i.e., the first group and the music tunes out of the copyright, i.e., the second group, and a tag indicative of the first group is added to the MIDI files in the first group, and another tag indicative of the second group is added to the MIDI files in the second group.

A user is assumed to reproduce the contents of a program. The program contains copyrighted music tunes and music tunes out of the copyright. In this situation, the MIDI files in the second group are downloaded into the data storage 22. However, the MIDI files in the first groups are not downloaded.

While the automatic player music instrument 20B is collaborating with the sound reproducer 10B, the music tunes out of the copyright are reproduced on the basis of the music data codes in the MIDI files stored in the data storage 22 between the start time and the termination time designated in the program, and the controller 21 requests the music data distribution server computer 30B to transmit the music data codes expressing the copyrighted music tunes to the communication module 23 before the start time so as to permit the electronic system 26d to start the playback at the start time. Upon completion of the reproduction of contents of program, the music data codes in the random access memory are erased.

Thus, the service provider can restrict the reuse of the MIDI file through the in-stream playback, and offer the program contents at low price.

Fifth Modification

The fifth modification of music reproducing system 100B is different from the third embodiment in that only one of the sound reproducer 10B/10C and automatic player musical instrument 20B/20C has the communication capability with the music data distribution server computer 30B.

Only the sound reproducer 10B/10C is assumed to have the communication capability. The automatic player musical instrument 20B/20C acquires a program and MIDI files from the music data distribution server computer 30B through the sound reproducer 10B.

In detail, the automatic player musical instrument 20B/20C requests the sound reproducer 10B/10C for the acquisition of program and MIDI files through the communication channel 40c, and the program and MIDI files are downloaded from the communication module 32B to the communication module 12B. The controller 11B transfers the program and MIDI files from the communication module 13A to the communication module 24 through the communication channel 40c.

Thus, the automatic player musical instrument 20B/20C or sound reproducer 10B/10C of the fifth modification is simpler than that of the music reproducing system 100B.

Sixth Modification

The sixth modification is different from the music reproducing system 100B in that the playback on the basis of the MIDI file is made synchronous with the conversion from the audio data codes to the audio signal through the synchronization technique disclosed in Japan Patent Application laid-open No. 2003-271138 or the synchronization technique disclosed in Japan Patent Application laid-open No. 2006-47761.

The synchronization technique disclosed in the former laid-open is that unique peaks of an audio signal are correlated with music data codes in a table. The controller checks the table to see whether or not the music data codes are processed concurrently with the unique peaks. When the answer is given negative, the controller advances the internal clock or puts the internal clock slow. Since the time intervals between the key events are measured with the internal clock, the two apparatus are synchronized with one another.

The synchronization technique disclosed in the latter laid-open is that the synchronization control is assigned to one of the plural channels between two apparatus. While the audio data codes are being converted to the audio signal, the controller of sound reproducer assigns the pieces of audio data to the channel L and LTC, which is a time code defined in the SMTPE (Society of Motion Picture and Television Engineers) and contains the pieces of time data and file identifier, to the channel R, and transmits the pieces of audio data and LTC to the automatic player musical instrument through the channels L and R. The controller of automatic player musical instrument makes the internal clock set with the pieces of time data contained in the LTC.

Seventh Modification

The seventh modification of music reproducing system 100B is different from the third embodiment in that either file size or creation date is omitted from the file identifier. The data structure of file identifier shown in FIG. 36 does not set any limit to the technical scope of the present invention. A serial number may serve as another file identifier.

Eighth Modification

The eighth modification of music reproducing system 100B is different from the third embodiment in that the electric voice is produced through the sound system 17B. Although the audio signal is not supplied to the automatic player musical instrument 20B, the duration time codes in the audio file are transmitted from the communication module 13A to the communication module 24. The controller 21 makes the data transfer to the electronic system 26d synchronized with the conversion of audio data codes to the audio signal as described hereinbefore.

The audio signal may be converted to the electric tones and electric voice through both of the sound system 17B and electronic tone producer 26B.

Ninth Modification

The ninth modification of music reproducing system 100B is different from the third embodiment in that the MIDI file or files are downloaded after the initiation of reproduction of a program. Of course, each MIDI file is required for the automatic player musical instrument 20B before the start time.

Tenth Modification

The tenth modification of music reproducing system 100B is different from the third embodiment in that certain programs contain only music tunes. In other words, any narration does not form in the certain programs.

Eleventh Modification

The eleventh modification of music reproducing system 100B is different from the third embodiment in that the picture for authentication is produced on a display panel (not shown) of the automatic player musical instrument 20B/20C. In this modification, the piece of visual data expressing the picture for authentication is stored in the data storage 22B, and the controller 21 produces the picture for authentication from the piece of visual data on the display panel.

When the user completes the user identification code and password on the display panel, the controller 21 transmits the user identification code and password together with the file identifier from the communication module 23 to the communication module 32B. Upon reception of the user identification code and password, the controller 31B starts the comparison work between the received identification code and received password and the read-out identification code and read-out password to see whether or not the user has the right to access the data storage 33B.

Twelfth Modification

The twelfth modification of music reproducing system 100B is different from the third embodiment in that another sort of electronic device serves as the sound reproducer 10B/10C. The personal computer may be replaced with a mobile telephone, a PHS (Personal Handy phone System) terminal, a PDA (Personal Digital Assistants) or a portable music player.

The computer programs for the controllers 11B. 21 and 31B may be offered to users independently of the hardware. One or two of the computer programs or all of the computer programs may be stored in a magnetic tape cassette, a magnetic disc, a flexible disc, an optical information storage medium, an opto-magnetic information storage medium, a compact disc, a DVD disc or a RAM stick.

Although particular embodiments of the present invention have been shown and described, it will be apparent to those skilled in the art that various changes and modifications may be made without departing from the spirit and scope of the present invention.

For example, a mute system may be provided inside of the automatic player musical instrument 20, 20A, 20B or 20C. The mute system includes a hammer stopper and a driving system for the hammer stopper. When a human pianist wishes to practice the fingering on the acoustic piano 20a, he or she moves the hammer stopper into the trajectories of hammers. While a human pianist is fingering on the keyboard, the hammers rebound on the hammer stopper before collision with the strings. Thus, the hammer stopper prohibits the strings from vibrations. On the other hand, when the human pianist wishes to perform a music tune by producing acoustic piano tones, he or she moves the hammer stopper outside of the trajectories of hammers. While the human pianist is fingering on the keyboard, the hammers are brought into collision with the strings without any interruption, and give rise to the vibrations of associated strings for producing the acoustic piano tones.

An automatic player musical instrument may be a combination between an automatic player and another sort of keyboard musical instrument such as, for example, an organ or a harpsichord or another combination between an automatic player and another sort of acoustic musical instrument such as, for example, a percussion instrument, a stringed musical instrument or a wind musical instrument.

The electronic tone producer 26, 26A and 26B are not indispensable feature of the present invention. An automatic player musical instrument without any electronic tone producer may be connected to the sound reproducer 10, 10A, 10B or 10C.

The system components circuit components and jobs are correlated with claim languages as follows. The program labeled with the program identifier "CID001" is an example of "music program", and the narration 1, 2 and 3 and music tunes 1, 2, 3 and 4 are corresponding to a "non-musical content" and a "musical content", respectively. The communication network 40, 40A or 40B is corresponding to a "communication network".

The music data distributing server computer 30, 30A or 30B or server computers 30a/30b/30c, 30Aa/30Ab/30Ac or 30Ba/30Bb/30Bc serve as a "music data distributor". The data storage 33, 33A or 33B and communication module 32, 32A or 32B serve as a "first data storage" and a "first communication module", respectively, and the controller 31, 31A or 31B and computer program 33c as a whole constitute a "first information processing apparatus". The lapse of time from the head of audio file is a "first viewpoint, and the time period between an event to the next event is a "second viewpoint".

The sound reproducer 10, 10A, 10B or 10C, automatic player musical instrument 20, 20A, 20B or 20C and communication channel 40c form in combination a "program reproducer". The sound system 17, 17A or 17B and the mixer 26x, amplifier 26g and loudspeakers 26h of electronic tone producer 26, 26A or 26B as a whole constitute a "first data-to-sound converter", and the acoustic piano 20a, automatic playing system 20c and electronic tone producer 26, 26A or 26B as a whole constitute a "second data-to-sound converter". The data storage 14, 14A or 14B and data storage 22 or 22B form in combination a "second data storage", and the communication module 12, 12A or 12B, communication module 13, 13A or 13B, communication module 23, communication module 24 or 24B and communication channel 40c form in combination a "second communication module". The controller 11, 11A, 11B or 11C, computer programs 14a, 14b, controller 21 and computer programs running on the controller 21 as a whole constitute a "second information processing apparatus".

The music tune 4 in the second embodiment serves as "anther musical content", and the account system 50, 50A or 50B serves as an "account system". The loudspeakers 26h serve as a "signal-to-sound converter".

The audio file list in the window b2 and local audio file list in the window b4 form in combination an "audio data list", and the MIDI file list in the window b3 and local MIDI file list in the window b5 serve as a "music data list", and the controller 11, 11A, 11B or 11C, computer program for communication between the music data distribution server computer and sound reproducer, computer program for editorial work 33Bc and computer program 14Bb for supporting editorial work are essential parts of "editor and scheduler".

What is claimed is:

1. A program reproducer for reproducing a music program containing a musical content and a non-musical content, comprising:
    a first data-to-sound converter following said music program for reproducing said non-musical content from pieces of audio data stored in a data file on a schedule defined by pieces of a sort of time data stored in said data file and expressing a time from a first viewpoint;
    a second data-to-sound converter following said music program for reproducing said musical content on the basis of pieces of music data stored in another data file on another schedule defined by pieces of said another sort of time data stored in said another data file and expressing a time from a second viewpoint different from said first viewpoint;
    a data storage storing said music program, said data file and said another data file;
    a communication module connected to a communication network so as to receive at least said music program from a music data distributor; and an information processing apparatus connected to said first data-to-sound converter, said second data-to-sound converter, said data storage and said communication module and having an information processing capability so as to manage said data storage, receive said music program, make said first data-to-sound converter and said second data-to-sound converter synchronized on the basis of said pieces of said sort of time data and said pieces of said another sort of time data and interpret said music program for selectively transferring said pieces of audio data and said pieces of music data to said first data-to-sound converter and said second data-to-sound converter.

2. The program reproducer as set forth in claim 1, in which said first data-to-sound converter restores said pieces of audio data expressing discrete values on an analog waveform to an audio signal.

3. The program reproducer as set forth in claim 2, in which said first data-to-sound converter is formed by an information processing system and a computer program running on a processor of said information processing system.

4. The program reproducer as set forth in claim 1, in which said second data-to-sound converter includes
    an electronic tone generator producing an audio signal on the basis of said pieces of music data expressing at least pitch of tones to be produced, and
    a sound system having an signal-to-sound converter so as to convert said audio signal to electronic tones at said pitch.

5. The program reproducer as set forth in claim 1, in which said second data-to-sound converter includes
    an acoustic musical instrument for producing acoustic tones, and
    an automatic player associated with said acoustic musical instrument and producing said acoustic tones in said acoustic musical instrument without any fingering of a human player.

6. The program reproducer as set forth in claim 5, in which said second data-to-sound converter further includes
    an electronic tone generator producing an audio signal on the basis of said pieces of music data expressing at least pitch of tones to be produced, and
    a sound system having an signal-to-sound converter so as to convert said audio signal to electronic tones at said pitch,
    wherein a user has a choice between said electronic tones and said acoustic tones.

7. The program reproducer as set forth in claim 1, in which said first data-to-sound converter has a data-to-sound sub-converter physically independent of said second data-to-sound converter so that a communication channel is connected between said data-to-sound sub-converter and said second data-to-sound converter.

8. The program reproducer as set forth in claim 1, in which said information processing apparatus has a clock measuring said time from said first viewpoint on the basis of said piece of said sort of time data, and determines said time from said second viewpoint on said clock.

* * * * *